(12) United States Patent
Odani et al.

(10) Patent No.: US 10,991,979 B2
(45) Date of Patent: Apr. 27, 2021

(54) ELECTROLYTIC SOLUTION, BATTERY, BATTERY PACK, ELECTRONIC DEVICE, ELECTRIC VEHICLE, ELECTRICAL STORAGE DEVICE, AND ELECTRIC POWER SYSTEM

(71) Applicant: MURATA MANUFACTURING CO., LTD., Kyoto (JP)

(72) Inventors: Toru Odani, Kyoto (JP); Tadahiko Kubota, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 12 days.

(21) Appl. No.: 16/212,263

(22) Filed: Dec. 6, 2018

(65) Prior Publication Data

US 2019/0109346 A1 Apr. 11, 2019

Related U.S. Application Data

(63) Continuation of application No. PCT/JP2017/019746, filed on May 26, 2017.

(30) Foreign Application Priority Data

Jun. 22, 2016 (JP) .............................. JP2016-123760

(51) Int. Cl.
*H01M 10/0565* (2010.01)
*H01M 10/0525* (2010.01)
(Continued)

(52) U.S. Cl.
CPC ......... *H01M 10/0567* (2013.01); *H01M 4/38* (2013.01); *H01M 10/052* (2013.01); *H01M 10/0525* (2013.01); *H01M 10/0565* (2013.01); *H01M 10/0587* (2013.01); *H01M 10/44* (2013.01); *H01M 50/20* (2021.01); *H01M 50/409* (2021.01); *H01M 50/538* (2021.01); *H01M 50/543* (2021.01);
(Continued)

(58) Field of Classification Search
CPC ......... H01M 10/0567; H01M 10/0525; H01M 10/0587; H01M 2/30; H01M 2/26; H01M 10/44
See application file for complete search history.

(56) References Cited

U.S. PATENT DOCUMENTS

2004/0076872 A1* 4/2004 Kinoshita ............... B60L 58/12
429/61
2008/0292968 A1* 11/2008 Lee ..................... H01M 10/052
429/247
2009/0197167 A1 8/2009 Olschimke

FOREIGN PATENT DOCUMENTS

CN 1224130 10/2005
CN 101326658 12/2008
(Continued)

OTHER PUBLICATIONS

Machine Translation of: JP 2004/172101, Hibara et al., Jun. 17, 2004.*
(Continued)

*Primary Examiner* — Kenneth J Douyette
(74) *Attorney, Agent, or Firm* — K&L Gates LLP

(57) ABSTRACT

A battery is provided with a positive electrode, a negative electrode and an electrolyte. In the battery, a first compound that is an unsaturated fluorine compound and a second compound that is a nitrile compound are contained.

27 Claims, 11 Drawing Sheets

(51) Int. Cl.
   *H01M 2/30*      (2006.01)
   *H01M 2/26*      (2006.01)
   *H01M 10/0567*   (2010.01)
   *H01M 10/44*     (2006.01)
   *H01M 4/38*      (2006.01)
   *H01M 10/052*    (2010.01)
   *H01M 50/20*     (2021.01)
   *H01M 50/409*    (2021.01)
   *H01M 50/538*    (2021.01)
   *H01M 50/543*    (2021.01)
   *H01M 10/0587*   (2010.01)

(52) U.S. Cl.
   CPC .......... *H01M 2220/20* (2013.01); *Y02E 60/10* (2013.01); *Y02T 10/70* (2013.01)

(56) References Cited

FOREIGN PATENT DOCUMENTS

| CN | 103401020    | 11/2013 |
|----|--------------|---------|
| JP | 2004172101 A | 6/2004  |
| JP | 2009512148 A | 3/2009  |
| JP | 2011181284 A | 9/2011  |
| JP | 2012123989 A | 6/2012  |

OTHER PUBLICATIONS

Machine Translation of: JP 2011/181284, Kaizuka et al., Sep. 15, 2011.*
Extended European Search Report dated Dec. 2, 2019 in corresponding European Application No. 17815103.1.
Barrelet, et al., Surface Characterization and Electrochemical Properties of Alkyl, Fluorinated Alkyl, and Alkoxy Monolayers on Silicon, Langmuir 2001, 17, 3460-3465.
International Search Report for Application No. PCT/JP2017/019746, dated Jun. 27, 2017.
Chinese Office Action dated Jan. 28, 2021 in corresponding Chinese Application No. 201780038509.7.
Chinese Search Report dated Jan. 4, 2021 in corresponding Chinese Application No. 201780038509.7.

* cited by examiner

ELECTROLYTIC SOLUTION, BATTERY, BATTERY PACK, ELECTRONIC DEVICE, ELECTRIC VEHICLE, ELECTRICAL STORAGE DEVICE, AND ELECTRIC POWER SYSTEM

CROSS REFERENCE TO RELATED APPLICATIONS

The present application is a continuation of PCT patent application no. PCT/JP2017/019746, filed on May 26, 2017, which claims priority to Japanese patent application no. JP2016-123760 filed on Jun. 22, 2016, the entire contents of which are being incorporated herein by reference.

BACKGROUND

The present technology generally relates to an electrolytic solution, a battery, a battery pack, an electronic device, an electric vehicle, an electrical storage device and an electric power system.

A lithium ion secondary battery is light-weight and has a high energy density, and therefore has been widely used as a power supply for a mobile phone, a note-type personal computer, an electric power tool, an electric automobile and the like. The properties of a lithium ion secondary battery greatly vary depending on the type of a non-aqueous electrolytic solution used in the lithium secondary battery. Therefore, various additives that can be added to a non-aqueous electrolytic solution have been proposed.

SUMMARY

The present technology generally relates to an electrolytic solution, a battery, a battery pack, an electronic device, an electric vehicle, an electrical storage device and an electric power system.

One object of the present technology is to provide an electrolytic solution that can improve cycle properties, a battery, a battery pack, an electronic device, an electric vehicle, an electrical storage device and an electric power system.

The present inventors have a surprising finding that cycle properties can be improved by using an unsaturated fluorine compound in combination with a nitrile compound.

According to an embodiment of the present disclosure, a battery is provided. The battery includes a positive electrode, a negative electrode and an electrolyte, wherein the electrolyte includes a first compound represented by formula (1) and a second compound represented by formula (2).

According to an embodiment of the present disclosure, an electrolytic solution is provided. The electrolytic solution includes a first compound represented by formula (1) and a second compound represented by formula (2).

[formula 1]

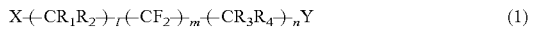
$$X(-CR_1R_2-)_l(-CF_2-)_m(-CR_3R_4-)_nY \quad (1)$$

In formula (1), X represents a hydrogen group, a fluorine group, a vinyl group, an ethynyl group, combinations thereof; Y represents a vinyl group or an ethynyl group; $R_1$, $R_2$, $R_3$ and $R_4$ independently represent a hydrogen group, an alkyl group having 1 to 4 carbon atoms, an alkenyl group having 1 to 4 carbon atoms, an alkynyl group having 1 to 4 carbon atoms, or combinations thereof, and wherein each of the alkyl group, the alkenyl group and the alkynyl group includes a first substituent; and wherein l represents an integer of 0 to 16; m represents an integer of 1 to 18; and n represents an integer of 0 to 16.

[formula 2]

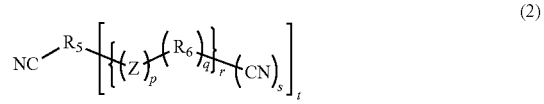

In formula (2), $R_5$ an $R_6$ independently represent an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms, an alkynylene group having 2 to 18 carbon atoms, or combinations thereof, wherein each of the alkyl group, the alkenyl group, the alkynyl group, the alkylene group, the alkenylene group and the alkynylene group includes a substituent, a cyclic structure, a branched structure, or combinations thereof; and wherein Z represents a linking group selected from oxygen (O), sulfur (S), nitrogen (N), phosphorus (P), $SO_2$, and combinations thereof; p represents an integer of 0 to 2; q represents a numerical value obtained by subtracting 1 from the numerical value of the valency of Z; r represents an integer of 0 or more; s represents a numerical value obtained by subtracting 1 from the numerical value of the valency of $R_6$; and t represents a numerical value obtained by subtracting 1 from the numerical value of the valency of $R_5$.

According to an embodiment of the present disclosure, Each of the battery pack, the electronic device, the electric vehicle, the electrical storage device and the electric power system is provided with the battery as described herein.

As described above, according to the present technology, the cycle properties of a battery can be improved.

The effects described herein are non-limiting, and may be any one of effects described in the present technology and the present technology should not be interpreted as being limited by the exemplified effects and other suitable properties relating to the present technology may be realized and as further described.

DETAILED DESCRIPTION

Figure 1:
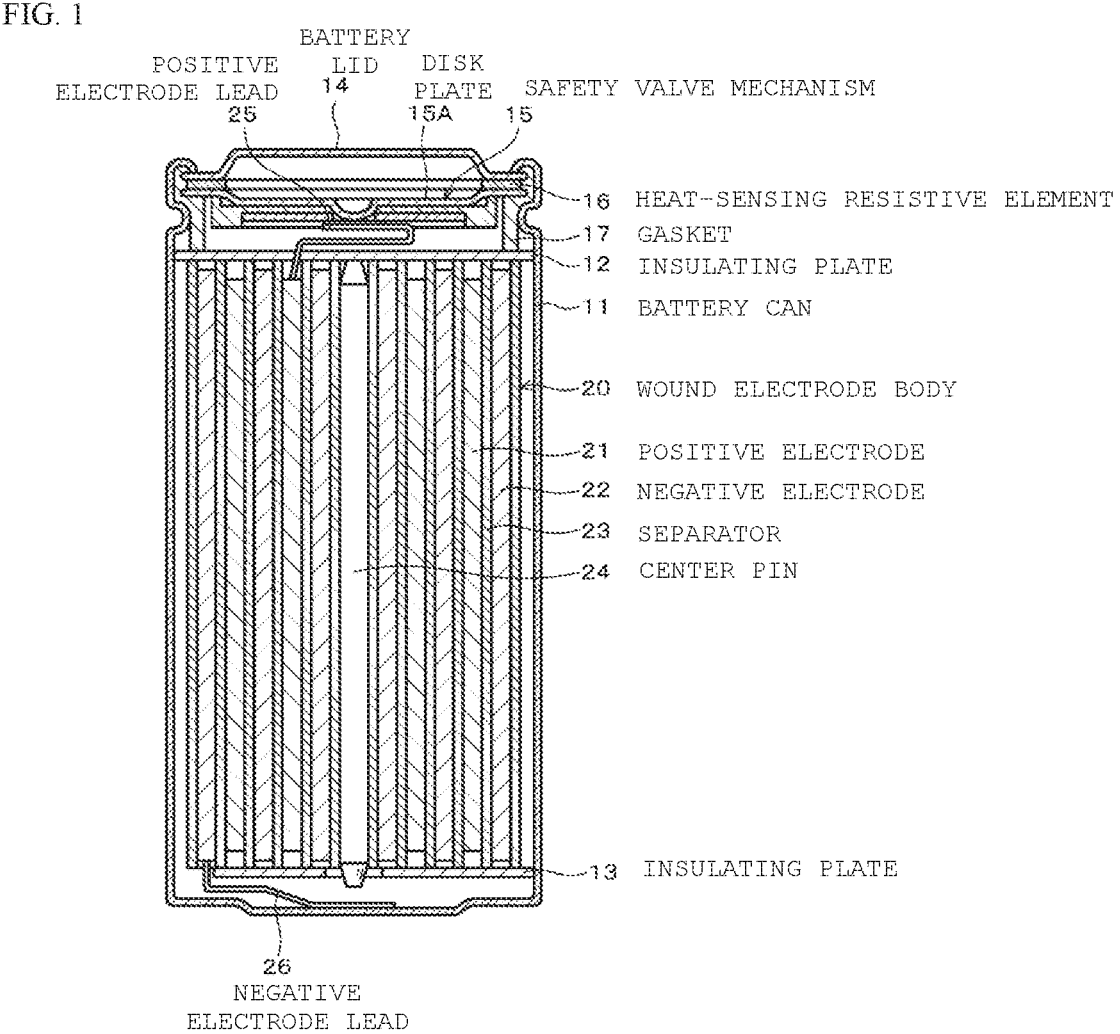
FIG. 1 is a cross-sectional view showing one configuration example of a non-aqueous electrolyte secondary battery according to an embodiment of the present technology.

As described herein, the present disclosure will be described based on examples with reference to the drawings, but the present disclosure is not to be considered limited to the examples, and various numerical values and materials in the examples are considered by way of example.

An electrolytic solution according to a first embodiment of the present technology is a so-called non-aqueous electrolytic solution, and contains a non-aqueous solvent, an electrolyte salt, at least one first compound and at least one second compound, wherein the electrolyte salt, the first compound and the second compound are dissolved in the non-aqueous solvent. For the purpose of improving battery properties, the electrolytic solution may further contain a known additive other than the first compound and the second compound. The electrolytic solution can be used suitably in a non-aqueous electrolyte secondary battery (also simply referred to as a "secondary battery", hereinafter) such as a lithium ion secondary battery.

The non-aqueous solvent is at least one solvent selected from, for example, ethylene carbonate (EC), propylene carbonate (PC), butylene carbonate, dimethyl carbonate (DMC), ethyl methyl carbonate (EMC), γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethyl sulfoxide.

The electrolyte salt is at least one lithium salt selected from, for example, lithium hexafluorophosphate (LiPF$_6$), lithium tetrafluoroborate (LiBF$_4$), lithium perchlorate (LiClO$_4$), lithium hexafluoroarsenat (LiAsF$_6$), lithium tetraphenylborate (LiB(C$_6$H$_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl) and lithium bromide (LiBr). The electrolyte salt may further contain a salt other than a lithium salt (e.g., a light metal salt other than a lithium salt).

According to an embodiment of the present disclosure, the first compound is an unsaturated fluorine compound and is represented by formula (1).

[Chemical formula 3]

$$X\text{--}(CR_1R_2)_l\text{--}(CF_2)_m\text{--}(CR_3R_4)_n\text{--}Y \quad (1)$$

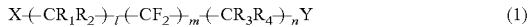

In formula (1), X represents a hydrogen group, a fluorine group, a vinyl group or an ethynyl group; Y represents a vinyl group or an ethynyl group; $R_1$, $R_2$, $R_3$ and $R_4$ independently represent a hydrogen group, an alkyl group having 1 to 4 carbon atoms, an alkenyl group having 1 to 4 carbon atoms or an alkynyl group having 1 to 4 carbon atoms, wherein each of the alkyl group, the alkenyl group and the alkynyl group may have a substituent; l represents an integer of 0 to 16; m represents an integer of 1 to 18, and n represents an integer of 0 to 16.

Y in formula (1) is a vinyl group or an ethynyl group each containing an unsaturated bond, and therefore the first compound has high chemical reactivity. As a result, a good ability to form a coating film on an electrode can be imparted. X in formula (1) is preferably a vinyl group or an ethynyl group. In this case, since each of X and Y contains an unsaturated bond, the chemical reactivity of the first compound can be further improved. As a result, a further improved coating film formability can be imparted and the cycle properties can be further improved. It is particularly preferred that each of X and Y in formula (1) represents a vinyl group. This is because the cycle properties can be particularly improved. When l, m and n in formula (1) respectively fall within the above-mentioned numerical value ranges, a liquid first compound having good solubility in a base electrolytic solution can be obtained. The term "base electrolytic solution" as used herein refers to an electrolytic solution composed of a non-aqueous solvent and an electrolyte salt.

Specific examples of the first compound include compounds respectively represented by formulae (1-1-1) to (1-1-6), (1-2-1) to (1-2-6), (1-3-1) to (1-3-6), (1-4-1) to (1-4-21), (1-5-1) to (1-5-6), (1-6-1) to (1-6-11), (1-7-1) to (1-7-5), (1-8-1) to (1-8-6), (1-9-1) to (1-9-13), (1-10-1) to (1-10-4), (1-11-1) to (1-11-4), (1-12-1) to (1-12-11) and (1-13-1) to (1-13-12). These compounds may be used singly, or two or more of them may be used in the form of a mixture.

[X=a hydrogen group, Y=a vinyl group, l=0, m=2 to 18, n=1]

[Chemical formula 4]

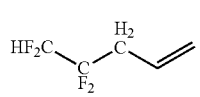
(1-1-1)

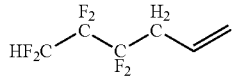
(1-1-2)

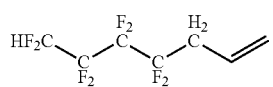
(1-1-3)

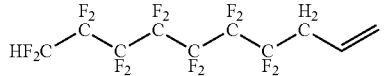
(1-1-4)

-continued
(1-1-5)
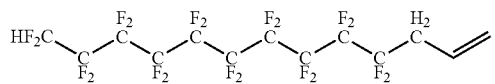
(1-1-6)
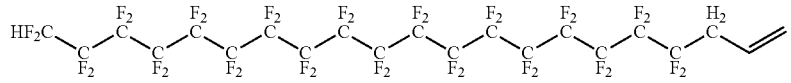
[X=a fluorine group, Y=a vinyl group, l=0, m=2 to 18, n=1]
[Chemical formula 5]
(1-2-1)
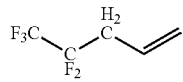
(1-2-2)
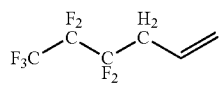
(1-2-3)
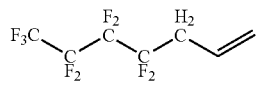
(1-2-4)
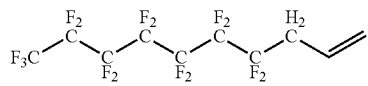
(1-2-5)
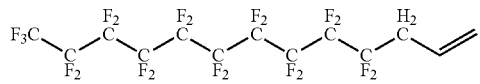
(1-2-6)
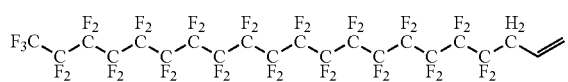
[X=a hydrogen group, Y=a vinyl group, l=0, m=2 to 17, n=2]
[Chemical formula 6]
(1-3-1)
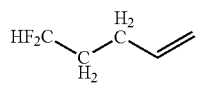
(1-3-2)
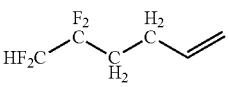
(1-3-3)
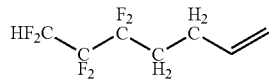
(1-3-4)
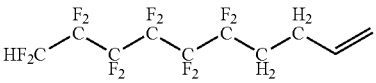
(1-3-5)
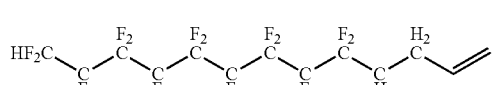
(1-3-6)
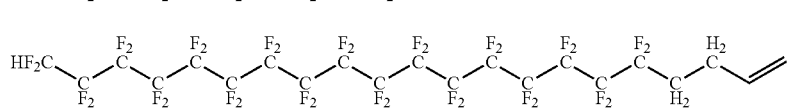

[X=a fluorine group, Y=a vinyl group, l=0, m=1 to 18, n=2]
[Chemical formula 7a]
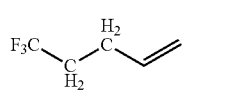 (1-4-1)  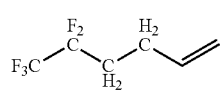 (1-4-2)
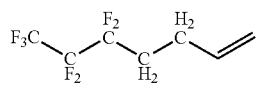 (1-4-3)  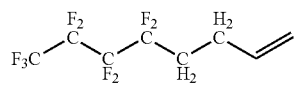 (1-4-4)
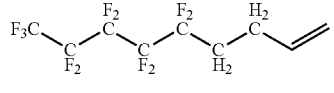 (1-4-5)  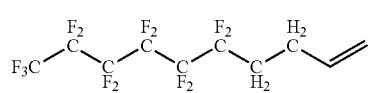 (1-4-6)
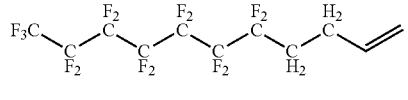 (1-4-7)  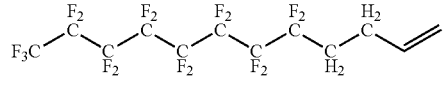 (1-4-8)
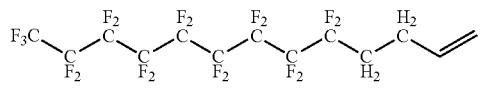 (1-4-9)  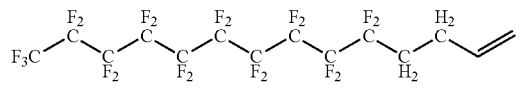 (1-4-10)
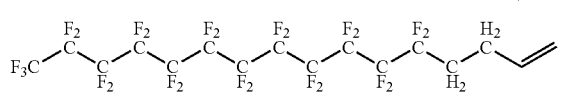 (1-4-11)  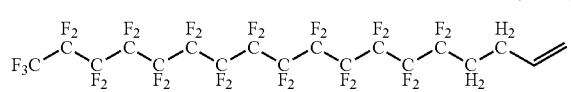 (1-4-12)
[Chemical formula 7b]
 (1-4-13)
 (1-4-14)
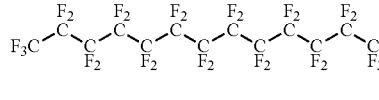 (1-4-15)   (1-4-16)
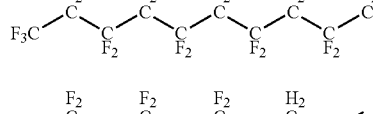 (1-4-17)  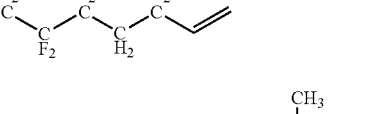 (1-4-18)
(1-4-18)
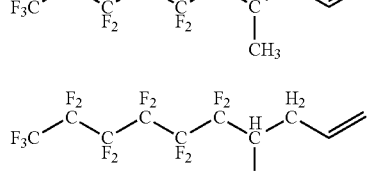 (1-4-19)  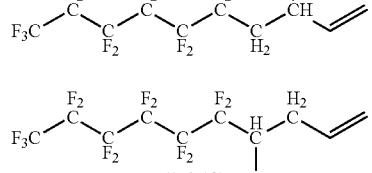 (1-4-20)
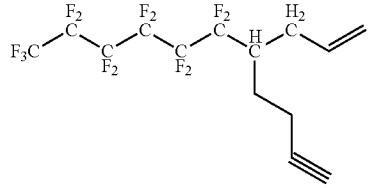 (1-4-21)

[X=a hydrogen group, fluorine group, Y=a vinyl group, l=0, m=1 to 18, n=3]
[Chemical formula 8]
(1-5-1) 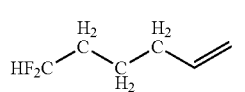
(1-5-2) 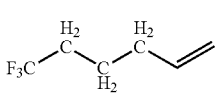
(1-5-3) 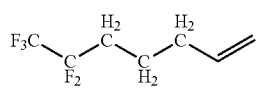
(1-5-4) 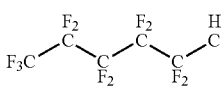
(1-5-5) 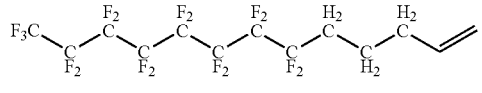
(1-5-6) 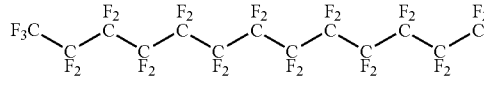
[X=a fluorine group, Y=a vinyl group, l=0, m=1 to 18, n=4]
[Chemical formula 9]
(1-6-1) 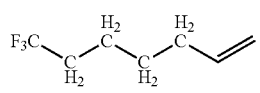
(1-6-2) 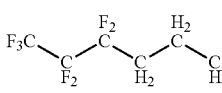
(1-6-3) 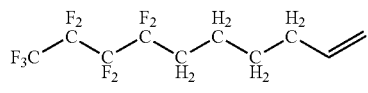
(1-6-4) 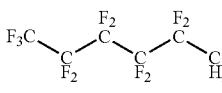
(1-6-5) 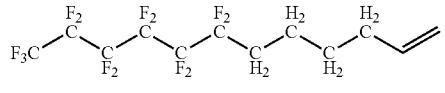
(1-6-6) 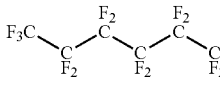
(1-6-7) 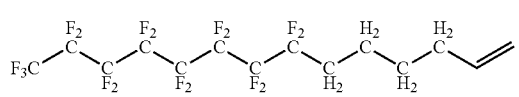
(1-6-8) 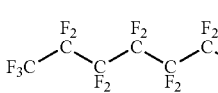
(1-6-9) 
(1-6-10) 
(1-6-11) 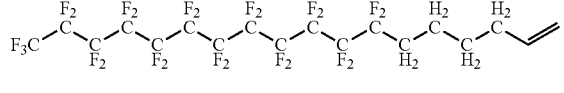
[X=a fluorine group, Y=a vinyl group, l=0, m=1 to 18, n=8, 16]
[Chemical Formula 10]
(1-7-1) 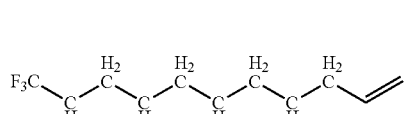
(1-7-2) 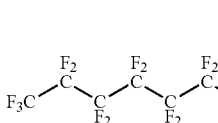

-continued (1-7-3)
(1-7-4)
(1-7-5)

[X=a fluorine group, Y=an ethynyl group, l=0, m=1 to 17, n=2]

[Chemical formula 11]

(1-8-1)
(1-8-2)
(1-8-3)
(1-8-4)
(1-8-5)
(1-8-6)

[X=a vinyl group, Y=a vinyl group, l=0, m=1 to 18, n=0]

[Chemical formula 12]

(1-9-1)
(1-9-2)
(1-9-3)
(1-9-4)
(1-9-5)
(1-9-6)
(1-9-7)
(1-9-8)
(1-9-9)
(1-9-10)
(1-9-11)
(1-9-12)
(1-9-13)

[X=a vinyl group, Y=an ethynyl group, l=0, m=1 to 18, n=0]
[Chemical formula 13]
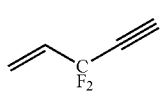 (1-10-1)
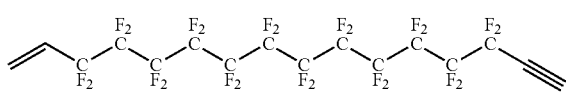 (1-10-2)
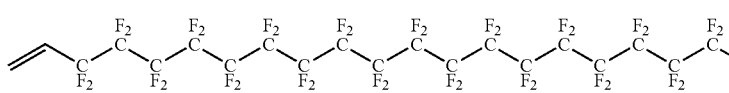 (1-10-3)
 (1-10-4)
[X=an ethynyl group, Y=an ethynyl group, l=0, m=1 to 18, n=0]
[Chemical formula 14]
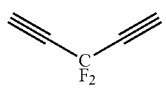 (1-11-1)
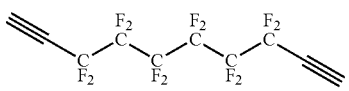 (1-11-2)
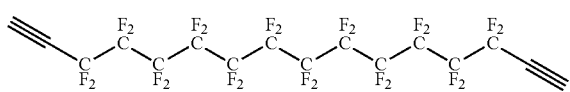 (1-11-3)
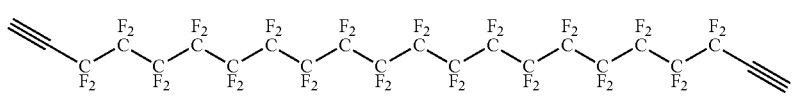 (1-11-4)
[X=a vinyl group, an ethynyl group, Y=a vinyl group, an ethynyl group, l=0, m=1 to 18, n=1 to 16]
[Chemical formula 15]
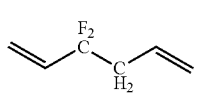 (1-12-1)
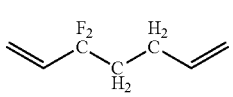 (1-12-2)
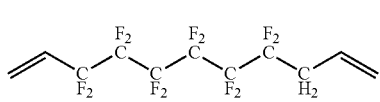 (1-12-3)
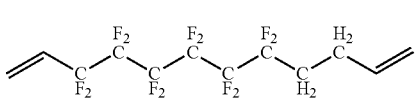 (1-12-4)
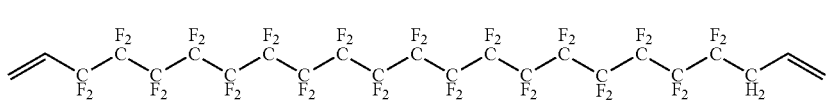 (1-12-5)
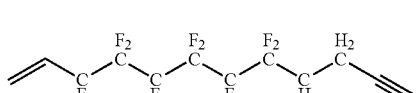 (1-12-6)
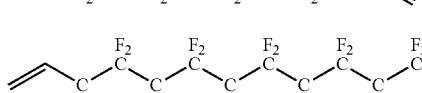 (1-12-7)
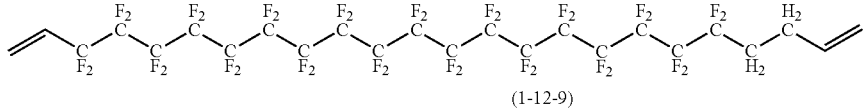 (1-12-5)
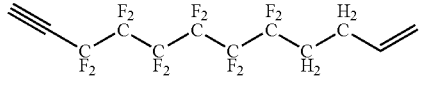 (1-12-9)
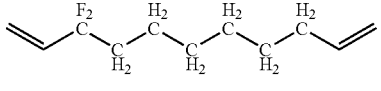 (1-12-8)

-continued
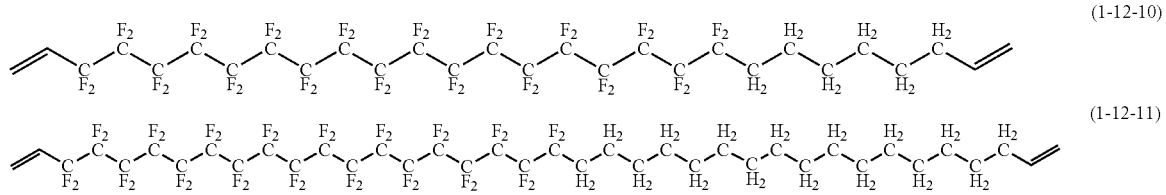
(1-12-10)
(1-12-11)
[X=a vinyl group, an ethynyl group, Y=a vinyl group, ethynyl group, l=1 to 16, m=1 to 18, n=1 to 16]
[Chemical formula 16a]
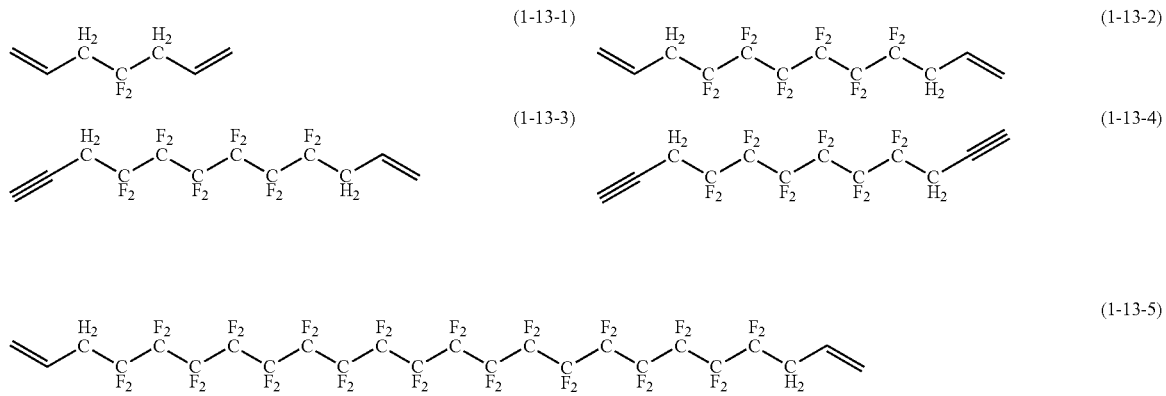
(1-13-1) (1-13-2) (1-13-3) (1-13-4)
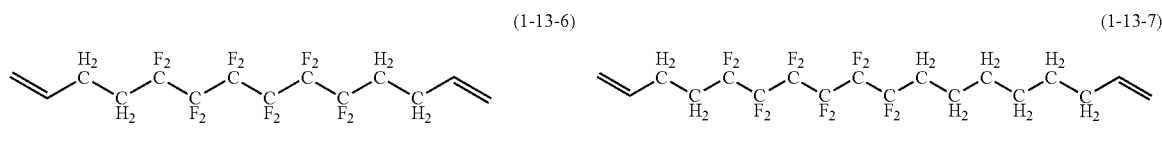
(1-13-5)
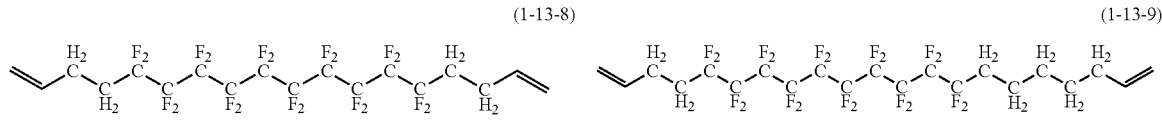
(1-13-6) (1-13-7)
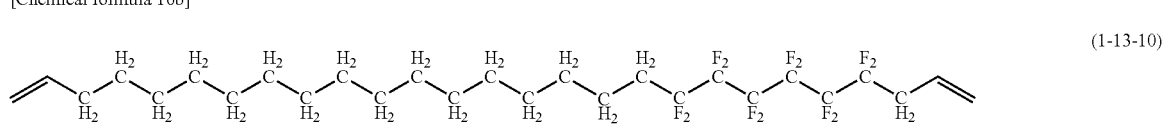
(1-13-8) (1-13-9)
[Chemical formula 16b]
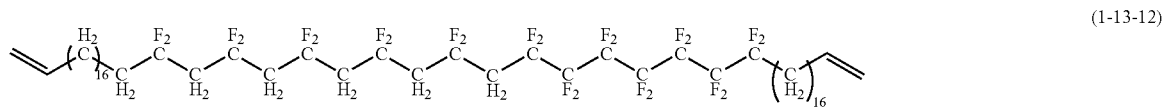
(1-13-10)
(1-13-11)
(1-13-12)

The content of the first compound in the electrolytic solution is preferably 0.01 to 5% by mass inclusive, more preferably 0.1 to 3% by mass inclusive. When the content of the first compound falls within the above-mentioned range, it is possible to achieve especially satisfactory cycle properties. The term "content of the first compound in the electrolytic solution" refers to a percent by mass of the first compound relative to the whole mass of the electrolytic solution.

The content of the first compound in the electrolytic solution can be determined, for example, in the following manner. Firstly, the battery is decomposed under an inert atmosphere such as a glove box and then the electrolytic solution component is extracted with DMC, a deuterated solvent or the like. Subsequently, the resultant extract is subjected to a GC-MS (Gas Chromatograph-Mass Spectrometric) measurement, a NMR (Nuclear Magnetic Resonance) measurement or the like to determine the content of the first compound in the electrolytic solution.

According to an embodiment of the present disclosure, the second compound may be any compound, as long as the compound has a nitrile group in the molecule thereof, and a specific example of the second compound is a nitrile compound represented by formula (2).

[Chemical formula 17]

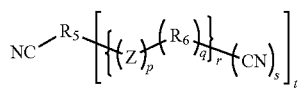

(2)

In formula (2), $R_5$ an $R_6$ independently represent an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms or an alkynylene group having 2 to 18 carbon atoms, wherein each of the alkyl group, the alkenyl group, the alkynyl group, the alkylene group, the alkenylene group and the alkynylene group may have a substituent, or may have a cyclic structure, or may have a branched structure, or may have a substituent and a cyclic structure, or may have a substituent and a branched structure; Z represents a linking group selected from oxygen (O), sulfur (S), nitrogen (N), phosphorus (P) and $SO_2$; p represents an integer of 0 to 2; q represents a numerical value obtained by subtracting 1 from the numerical value of the valency of Z; r represents an integer of 0 or more; s represents a numerical value obtained by subtracting 1 from the numerical value of the valency of $R_6$; and t represents a numerical value obtained by subtracting 1 from the numerical value of the valency of $R_5$.

When $R_5$ in formula (2) represents an alkyl group, an alkenyl group or an alkynyl group, t is 0. When $R_5$ in formula (2) represents an alkylene group, an alkenylene group or an alkynylene group, t is 1.

When $R_6$ in formula (2) represents an alkyl group, an alkenyl group or an alkynyl group, s is 0. When $R_6$ in formula (2) represents an alkylene group, an alkenylene group or an alkynylene group, s is 1.

When each of the alkyl group, the alkenyl group, the alkynyl group, the alkylene group, the alkenylene group and the alkynylene group which correspond to $R^5$ in formula (2) has a substituent, the substituent may have a cyano group, an alkyl group having a cyano group, a substituent represented by formula (3) or the like. When each of the alkyl group, the alkenyl group, the alkynyl group, the alkylene group, the alkenylene group and the alkynylene group which correspond to R6 has a substituent, the substituent may have a cyano group, an alkyl group having a cyano group or the like.

[Chemical formula 18]

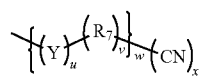

(3)

In formula (3), $R_7$ represents an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms or an alkynylene group having 2 to 18 carbon atoms, wherein each of the alkyl group, the alkenyl group, the alkynyl group, the alkylene group, the alkenylene group and the alkynylene group may have a substituent, or may have a cyclic structure, or may have a branched structure, or may have a substituent and a cyclic structure, or may have a substituent and a branched structure; Y represents a linking group selected from oxygen (O), sulfur (S), nitrogen (N), phosphorus (P) and $SO_2$; u represents an integer of 0 to 2; v represents a numerical value obtained by subtracting 1 from the numerical value of the valency of Y; w represents an integer of 0 or more; and x represents a numerical value obtained by subtracting 1 from the valency of $R_7$.

In formula (2), r preferably represents an integer of 0 to 6 inclusive. This is because, when r falls within the above-mentioned range, a second compound having good solubility in the base electrolytic solution can be obtained. In formula (3), w preferably represents an integer of 0 to 6 inclusive. This is because, when w falls within the above-mentioned range, a second compound having good solubility in the base electrolytic solution can be obtained.

Since the nitrile group in formula (2) contains an unsaturated bond, the chemical reactivity of the second compound can be improved. As a result, a good ability to form a coating film on the electrode can be achieved. In formula (2), it is preferred that $R_5$ and $R_6$ independently represent an alkyl group or an alkylene group. This is because, if $R_5$ and $R_6$ independently represent an alkenyl group, an alkynyl group, an alkenylene group or an alkynylene group, the nitrile group as well as an unsaturated bond contained in each of $R_5$ and $R_6$ may chemically react and consequently the coating film forming ability may become too high. When q in formula (2) falls within the above-mentioned numerical value range, a liquid second compound having good solubility in the base electrolytic solution can be obtained.

Specific examples of the nitrile compound having one nitrile group in the molecule thereof include acetonitrile, propionitrile, butyronitril, isobutyronitrile, valeronitrile, isovaleronitrile, caprylonitrile, lauronitrile, stearonitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, pentafluoropropionitrile, methoxypropionitrile, 3-(methylsulfonyl)propiononitrile, 3,3-dimethylaminopropionitrile, diphenyl(3-cyanopropyl)phosphine, benzonitrile, 2-cyanopyridine, 3-cyanopyridine, 4-cyanopyridine, 2-cyanothiophene, 3-cyanothiophene, 2-cyanofuran and 3-cyanofuran.

Specific examples of the nitrile compound having two nitrile groups in the molecule thereof include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanopentane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile, 3,3'-oxydipropionitrile, 3,3'-thiodipropionitrile, 3,3'-sulfodipropionitrile, ethylene glycol bis(propionitrile) ether, phthalonitrile, terephthalonitrile, 2,3-dicyanopyridin, 2,4-dicyanopyridin, 2,5-dicyanopyridin, 2,6-dicyanopyridin, 3,5-dicyanopyridin, 2,3-dicyanothiophene, 2,4-dicyanothiophene, 2,5-dicyanothiophene, 2,3-dicyanofuran, 2,4-dicyanofuran and 2,5-dicyanofuran.

Specific examples of the nitrile compound having three nitrile groups in the molecule thereof include 1,2,3-propanetricarbonitrile, 1,3,5-pentanetricarbonitrile, 1,3,6-hexanetricarbonitrile, 1,2,3-tris(2-cyanoethoxy)propane, tris(2-cyanoethyl)amine, 1,3,5-cyclohexanetricarbonitrile, 1,3,5-cyclohexanetricyanobenzene, tris(2-cyanoethyl)amine, tris(2-cyanoethyl)phosphine, 7,7,8,8-tetracyanoquinodimethane, 2,5-dimethyl-7,7,7,8-tetracyanoquinodimethane, 2,5-difluoro-7,7,8,8-tetracyanoquinodimethane, 1,2,3,4-butanetetracarbonitrile and polyacrylonitrile.

These exemplified nitrile compounds may be used singly, or two or more of them may be used in the form of a mixture.

The content of the second compound in the electrolytic solution is preferably 0.1 to 10% by mass inclusive, more preferably 0.1 to 5% by mass inclusive. When the content of the second compound falls within the above-mentioned range, it is possible to achieve especially satisfactory cycle properties. The term "content of the second compound in the electrolytic solution" as used herein refers to a percent by mass of the second compound relative to the whole mass of the electrolytic solution.

The content of the second compound in the electrolytic solution can be determined in the same manner as the method for determining the content of the first compound.

The electrolytic solution according to the first embodiment contains a first compound that is an unsaturated fluorine compound and a second compound that is a nitrile compound. When the electrolytic solution is applied to a secondary battery, a coating film derived from the first compound and the second compound is formed on an electrode during charging/discharging and therefore the cycle properties of the secondary battery can be improved.

In this regard, the term "electrode" refers to at least one of a positive electrode and a negative electrode. Furthermore, because the electrolytic solution contains the first compound, the generation of a gas caused by the decomposition of the electrolytic solution can be prevented.

In a second embodiment, a secondary battery provided with the electrolytic solution according to the first embodiment will be described.

Hereinbelow, one configuration example of a secondary battery according to a second embodiment of the present technology will be described with reference to FIG. 1. The secondary battery is a so-called lithium ion secondary battery in which the capacity of a negative electrode is expressed by a capacity component based on the occlusion and release of lithium (Li) that is an electrode reaction substance. The secondary battery is called "a cylindrical secondary battery", and is provided with a wound electrode body 20 in which a pair composed of a strip-like positive electrode 21 and a strip-like negative electrode 22 are laminated and wound with a separator 23 interposed therebetween in an almost hollow columnar battery can 11. The battery can 11 is made from iron (Fe) plated with nickel (Ni), in which one end is closed and the other end is opened. In the inside of the battery can 11, an electrolytic solution that serves as a liquid electrolyte is injected so that the positive electrode 21, the negative electrode 22 and the separator 23 can be impregnated with the electrolytic solution. A pair of insulating plates 12 and 13 are arranged vertically relative to the wound periphery of the wound electrode body 20 so that the wound electrode body 20 can be sandwiched by the insulating plates 12 and 13.

A battery lid 14 and a safety valve mechanism 15 and a heat-sensing resistive element (a positive temperature coefficient (PTC) element) 16 both arranged in the inside of the battery lid 14 are attached to the open end of the battery can 11 by crimping these components together through a sealing gasket 17. In this manner, the inside of the battery can 11 is hermetically sealed. The battery lid 14 is made from, for example, the same material as that for the battery can 11. The safety valve mechanism 15 is electrically connected to the battery lid 14, and is so configured that a disk plate 15A can be inverted so as to terminate the electrical connection between the battery lid 14 and the wound electrode body 20 when the internal pressure of the battery becomes equal to or larger than a predetermined value by the occurrence of internal short circuit or heating from the outside. The sealing gasket 17 is made from, for example, an insulating material, and asphalt is applied on the surface of the sealing gasket 17.

At the center of the wound electrode body 20, a center pin 24, for example, is inserted. In the wound electrode body 20, a positive electrode lead 25 made from aluminum (Al) or the like is connected to the positive electrode 21 and a negative electrode lead 26 made from nickel or the like is connected to the negative electrode 22. The positive electrode lead 25 is welded to the safety valve mechanism 15 so as to be electrically connected to the battery lid 14, and the negative electrode lead 26 is welded to the battery can 11 so as to be electrically connected to the battery can 11.

Figure 2:
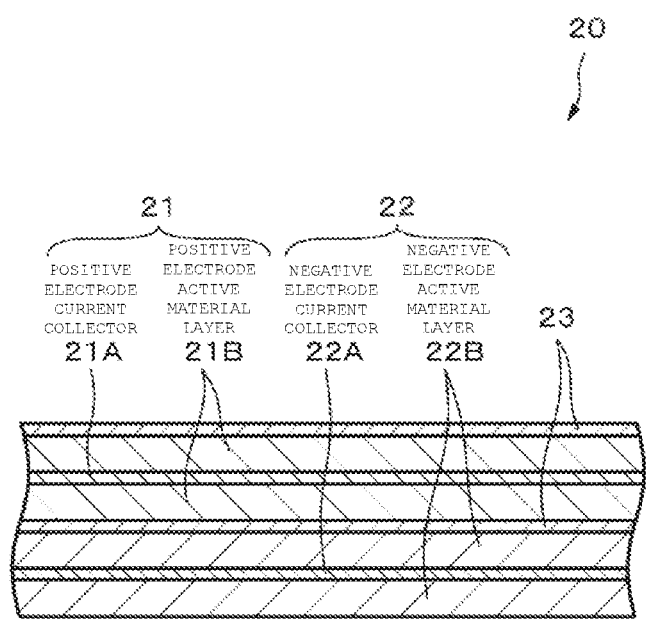
FIG. 2 is a cross-sectional view showing an enlarged view of a part of a wound electrode body shown in FIG. 1 according to an embodiment of the present technology.

Hereinbelow, the positive electrode 21, the negative electrode 22, the separator 23 and the electrolytic solution which constitute the secondary battery will be described in turn with reference to FIG. 2.

The positive electrode 21 has, for example, such a structure that a positive electrode active material layer 21B is arranged on both surfaces of a positive electrode current collector 21A. Alternatively, it is also possible to arrange the positive electrode active material layer 21B on only one surface of the positive electrode current collector 21A, which is not shown in the figure. The positive electrode current collector 21A is made from a metal foil such as an aluminum foil, a nickel foil or a stainless steel foil. The positive electrode active material layer 21B contains, for example, a positive electrode active material that can occlude and release lithium that is an electrode reaction substance. If necessary, the positive electrode active material layer 21B may further contain an additive. As the additive, at least one of a conductive agent and a binder or the like can be used.

As the positive electrode material capable of occluding and releasing lithium, a lithium-containing compound such as lithium oxide, lithium phosphorus oxide, lithium sulfide and a lithium-containing interlayer compound is suitable. It is possible to use a mixture of two or more of the lithium-containing compounds. In order to increase an energy density, a lithium-containing compound that contains lithium, a transition metal element and oxygen (O) is preferred. Examples of the lithium-containing compound of this type include a lithium composite oxide having a layered-rock-salt-type structure represented by formula (A) and a lithium composite phosphate salt having an olivine-type structure represented by formula (B). The lithium-containing compound is more preferably one containing at least one metal selected from the group consisting of cobalt (Co), nickel, manganese (Mn) and iron as the transition metal element. Examples of the lithium-containing compound of this type include a lithium composite oxide having a layered-rock-salt-type structure represented by formula (C), formula (D) or formula (E), a lithium composite oxide having a spinel-type structure represented by formula (F), and a lithium composite phosphate salt having an olivine-type structure represented by formula (G), such as $LiNi_{0.50}Co_{0.20}Mn_{0.30}O_2$, $Li_aCoO_2 (a\approx1)$, $Li_bNiO_2$ ($b\approx1$), $Li_{c1}Ni_{c2}Co_{1-c2}O_2$ ($c1\approx1$, $0<c2<1$), $Li_dMn_2O_4$ ($d\approx1$) and $Li_eFePO_4$ ($e\approx1$).

$$Li_pNi_{(1-q-r)}Mn_qM1_rO_{(2-y)}X_z \qquad (A)$$

In formula (A), M1 represents at least one element selected from Group-2 to Group-15 elements excluding nickel and manganese; X represents at least one element selected from Group-16 and Group-17 elements excluding oxygen; and p, q, y and z represent numerical values respectively falling within the following ranges: $0\leq p\leq1.5$, $0\leq q\leq1.0$, $0\leq r\leq1.0$, $-0.10\leq y\leq0.20$ and $0\leq z\leq0.2$.

$$Li_aM2_bPO_4 \qquad (B)$$

In formula (B), M2 represents at least one element selected from Group-2 to Group-15 elements; and a and b represent numerical values respectively falling within the following ranges: $0\leq a\leq2.0$ and $0.5\leq b\leq2.0$.

$$Li_jMn_{(1-g-h)}Ni_gM3_hO_{(2-j)}F_k \qquad (C)$$

In formula (C), M3 represents at least one element selected from the group consisting of cobalt, magnesium (Mg), aluminum, boron (B), titanium (Ti), vanadium (V), chromium (Cr), iron, copper (Cu), zinc (Zn), zirconium (Zr), molybdenum (Mo), tin (Sn), calcium (Ca), strontium (Sr) and tungsten (W); and f, g, h, j and k represent numerical values falling within the following ranges: $0.8\leq f\leq1.2$, $0<g<0.5$, $0\leq h\leq0.5$, $g+h<1$, $-0.1\leq j\leq0.2$ and $0\leq k\leq0.1$; wherein the content of lithium varies depending on the charged/discharged state and the numerical value f represents a value in a completely discharged state.

$$Li_mNi_{(1-n)}M4_nO_{(2-p)}F_q \qquad (D)$$

In formula (D), M4 represents at least one element selected from the group consisting of cobalt, manganese, magnesium, aluminum, boron, titanium, vanadium, chromium, iron, copper, zinc, molybdenum, tin, calcium, strontium and tungsten; and m, n, p and q represent numerical values respectively falling within the following ranges: $0.8\leq m\leq1.2$, $0.005\leq n\leq0.5$, $-0.1\leq p\leq0.2$ and $0\leq q\leq0.1$; wherein the content of lithium varies depending on the charged/discharged state, and the numerical value m represents a value in a completely discharged state.

$$Li_rCo_{(1-s)}M5_sO_{(2-t)}F_u \qquad (E)$$

In formula (E), M5 represents at least one element selected from the group consisting of nickel, manganese, magnesium, aluminum, boron, titanium, vanadium, chromium, iron, copper, zinc, molybdenum, tin, calcium, strontium and tungsten; and r, s, t and u represent numerical values respectively falling within the following ranges: $0.8\leq r\leq1.2$, $0\leq s<0.5$, $-0.1\leq t\leq0.2$ and $0\leq u\leq0.1$; wherein the content of lithium varies depending on the charged/discharged state, and the numerical value r represents a value in a completely discharged state.

$$Li_vMn_{2-w}M6_wO_xF_y \qquad (F)$$

In formula (F), M6 represents at least one element selected from the group consisting of cobalt, nickel, magnesium, aluminum, boron, titanium, vanadium, chromium, iron, copper, zinc, molybdenum, tin, calcium, strontium and tungsten; and v, w, x and y represent numerical values respectively falling within the following ranges: $0.9\leq v\leq1.1$, $0\leq w\leq0.6$, $3.7\leq x\leq4.1$ and $0\leq y\leq0.1$; wherein the content of lithium varies depending on the charged/discharged state, and the numerical value v represents a value in a completely discharged state.

$$Li_zM7PO_4 \qquad (G)$$

In formula (G), M7 represents at least one element selected from the group consisting of cobalt, manganese, iron, nickel, magnesium, aluminum, boron, titanium, vanadium, niobium (Nb), copper, zinc, molybdenum, calcium, strontium, tungsten and zirconium; and z represents a numerical value falling within the range $0.9\leq z\leq1.1$; wherein the content of lithium varies depending on the charged/discharged state and the numerical value z represents a value in a completely discharged state.

As the Ni-containing lithium composite oxide, a lithium composite oxide containing lithium, nickel, cobalt, manganese and oxygen (NCM), a lithium composite oxide containing lithium, nickel, cobalt, aluminum and oxygen (NCA) or the like may be used. More specifically, as the Ni-containing lithium composite oxide, one represented by formula (H) or formula (I) may be used.

$$Li_{v1}Ni_{w1}M1'_{x1}O_{z1} \qquad (H)$$

In formula (H), $0<v1<2$, $w1+x1\leq1$, $0.2\leq w1\leq1$, $0\leq x1\leq0.7$ and $0<z<3$; and M1' represents at least one element selected from transition metals such as cobalt, iron, manganese, copper, zinc, aluminum, chromium, vanadium, titanium, magnesium and zirconium.

$$Li_{v2}Ni_{w2}M2'_{x2}O_{z2} \qquad (I)$$

In formula (I), $0<v2<2$, $w2+x2\leq1$, $0.65\leq w2\leq1$, $0\leq x2\leq0.35$ and $0<z2<3$; and M2' represents at least one element selected from transition metals such as cobalt, iron, manganese, copper, zinc, aluminum, chromium, vanadium, titanium, magnesium and zirconium.

In addition to the above-mentioned materials, examples of the positive electrode material capable of occluding and releasing lithium also include lithium-free inorganic compounds such as $MnO_2$, $V_2O_5$, $V_6O_{13}$, NiS and MoS.

Alternatively, the positive electrode material capable of occluding and releasing lithium may also be a material other than the above-mentioned materials. The above-exemplified positive electrode materials may be a mixture of any combination of two or more of the above-exemplified positive electrode materials.

As the binder, at least one material selected from a resin material such as polyvinylidene fluoride (PVdF), polytetrafluoroethylene (PTFE), polyacrylonitrile (PAN), a styrene butadiene rubber (SBR) and carboxy methyl cellulose (CMC), a copolymer mainly composed of the resin material and others can be used.

Examples of the conductive agent include carbon materials such as graphite, carbon black and Ketjen black, and one of the carbon materials or a mixture of two or more of the carbon materials may be used. In addition to the carbon materials, any material having electrical conductivity such as a metal material or an electrically conductive polymer material may be used.

The negative electrode 22 has, for example, such a structure that a negative electrode active material layer 22B is arranged on both surfaces of a negative electrode current collector 22A. Alternatively, the negative electrode active material layer 22B may be arranged on only one surface of the negative electrode current collector 22A, which is not shown in the figure. The negative electrode current collector 22A is composed of, for example, a metal foil such as a copper foil, a nickel foil and a stainless steel foil.

The negative electrode active material layer 22B contains one or two or more negative electrode active materials capable of occluding and release lithium. If necessary, the negative electrode active material layer 22B may further contain an additive such as a binder and a conductive agent.

In the secondary battery of this type, it is preferred that the electrochemical equivalent of the negative electrode 22 or the negative electrode active material is larger than that of the positive electrode 21 so that theoretically metal lithium cannot be precipitated on the negative electrode 22 in the middle of charging.

Specific examples of the negative electrode active material include carbon materials such as non-graphitizable carbon, graphitizable carbon, graphite, pyrolyzed carbon, coke, glassy carbon, an organic polymeric compound fired body, carbon fibers and activated carbon. Specific examples of the coke include pitch coke, needle coke and petroleum coke. The organic polymeric compound fired body is a material produced by firing a polymeric material, e.g., a phenolic resin and a furan resin, at an appropriate temperature to carbonize the polymeric material. Some of the organic polymeric compound fired bodies are classified into non-graphitizable carbon materials or graphitizable carbon materials. These materials are preferred, because little change occurs in crystal structures thereof during charging/discharging and therefore high charge/discharge capacities can be achieved and good cycle properties can also be achieved. Graphite is particularly preferred, because the electrochemical equivalent thereof is high and therefore a high energy density can be achieved. The non-graphitizable carbon is also preferred, because excellent cycle properties can be achieved. In addition, a material having a low charge/discharge potential, specifically having a charge/discharge potential close to that of metal lithium, is preferred, because a high energy density of the battery can be achieved easily.

An example of another negative electrode active material that can have an increased capacity is a material containing at least one element selected from a metal element and a metalloid element as a constituent element (e.g., an alloy, a compound or a mixture). When this material is used, a high energy density can be achieved. Particularly, it is more preferred to use the material together with a carbon material, because a high energy density can be achieved and excellent cycle properties can also be achieved. In the present technology, the alloy includes, within its scope, an alloy composed of at least two metal elements and an alloy composed of at least one metal element and at least one metalloid element. The alloy may also contain a non-metal element. In the texture of the alloy, a solid solution, an eutectic crystal (an eutectic mixture), an intermetallic compound or two or more of these substances may coexist.

As the negative electrode active material of this type, a metal element or a metalloid element which can form an alloy in conjunction with lithium can be mentioned. Specific examples of the metal element or the metalloid element include magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd) and platinum (Pt). Each of these substances may be in a crystalline or amorphous form.

The negative electrode active material preferably contains a Group-4B metal element or metalloid element on the short period periodic table as a constituent element, and more preferably contains at least one of silicon and tin as a constituent element. Silicon and tin are highly capable of occluding and releasing lithium and therefore can make it possible to achieve a large energy density. Examples of the negative electrode active material of this type include metal silicon, a silicon alloy, a silicon compound, metal tin, a tin alloy, a tin compound, and a material containing, as a portion thereof, at least one phase made from any one of these materials.

Examples of the silicon alloy include materials each containing at least one element selected from the group consisting of tin, nickel, copper, iron, cobalt, manganese, zinc, indium, silver, titanium, germanium, bismuth, antimony (Sb) and chromium as a second constituent element other than silicon. Examples of the tin alloy include materials each containing at last one element selected from the group consisting of silicon, nickel, copper, iron, cobalt, manganese, zinc, indium, silver, titanium, germanium, bismuth, antimony and chromium as a second constituent element other than tin.

The tin compound or the silicon compound contains, for example, oxygen or carbon, and may further contain the above-mentioned second constituent element in addition to tin or silicon.

As the Sn-containing negative electrode active material, a Sn—Co—C-containing material is particularly preferred, which contains cobalt, tin and carbon as constituent elements, wherein the content of carbon is 9.9 to 29.7% by mass inclusive and the ratio of the amount of cobalt to the total amount of the tin and cobalt is 30 to 70% by mass inclusive. This is because, when the constituent elements are contained in this compositional range, a high energy density can be achieved and excellent cycle properties can also be achieved.

If necessary, the Sn—Co—C-containing material may further contain other constituent element. As the "other constituent element", silicon, iron, nickel, chromium, indium, niobium, germanium, titanium, molybdenum, aluminum, phosphorus (P), gallium or bismuth is preferred, and two or more of these elements may be contained. This is because the capacity or the cycle properties can be further improved.

The Sn—Co—C-containing material has a phase containing tin, cobalt and carbon, and it is preferred that this phase has a poorly crystalline or amorphous structure. In the Sn—Co—C-containing material, it is preferred that at least a portion of the carbon, which is a constituent element, is bonded to a metal element or a metalloid element that is the "other constituent element". It has been believed that the decrease in cycle properties can be caused as the result of the coagulation or crystallization of tin or the like. When carbon is bonded to other element, this coagulation or crystallization can be prevented.

As one example of the method for examining the binding state of an element, an X-ray photoelectron spectroscopy (XPS) can be mentioned. In XPS of graphite, in a device of which the energy correction is made in such a manner that a peak of a gold 4f orbital (Au4f) appears at 84.0 eV, a peak of a carbon 1s core orbital (C1s) appears at 284.5 eV. With respect to surface contaminant carbon, the peak thereof appears at 284.8 eV. In contrast, in the case where the charge density of element carbon is increased, such as the case where carbon is bonded to a metal element or a metalloid element, the peak of C1s appears in a region smaller than 284.5 eV. That is, in the case where the peak of a composite wave of C1s obtained for the Sn—Co—C-containing material appears in a region smaller than 284.5 eV, at least a portion of the carbon contained in the Sn—Co—C-containing material is bonded to a metal element or a metalloid element that is the "other constituent element".

In the XPS measurement, the peak of C1s, for example, is used for the correction of the energy axis of spectra. In general, surface contaminant carbon exists on the surface. In this case, the peak of C1s of the surface contaminant carbon is defined as 284.8 eV and is employed as an energy standard. In the XPS measurement, the waveform of the peak of C1s is obtained as a form including both of a peak of the surface contaminant carbon and a peak of carbon in the Sn—Co—C-containing material. Therefore, the waveform is analyzed using, for example, commercially available software to separate the peak of the surface contaminant carbon from the peak of carbon in the Sn—Co—C-containing material. In the analysis of the waveform, the position of the main peak appearing on the lowest binding energy side is employed as an energy standard (284.8 eV).

Another example of the negative electrode active material is a metal oxide or a polymeric compound which can occlude and release lithium. Specific examples of the metal oxide include a lithium titanium oxide containing titanium and lithium, e.g., lithium titanate ($Li_4Ti_5O_{12}$), iron oxide, ruthenium oxide and molybdenum oxide. Specific examples of the polymeric compound include polyacethylene, polyaniline and polypyrrole.

As the binder, at least one material selected from a resin material such as polyvinylidene fluoride, polytetrafluoroethylene, polyacrylonitrile, a styrene-butadiene rubber and carboxymethyl cellulose and a copolymer mainly composed of the resin material and the like can be used. As the conductive agent, the same carbon material as that used in the positive electrode active material layer 21B or the like can be used.

The separator 23 can separate the positive electrode 21 and the negative electrode 22 from each other so that lithium ions can be allowed to pass while preventing the occurrence of current short circuit resulting from the contact between the electrodes. The separator 23 is composed of, for example, a porous membrane made from a resin such as polytetrafluoroethylene, polypropylene and polyethylene, and may have a structure composed of a laminate of two or more of the porous membranes. A polyolefin-made porous membrane is particularly preferred, because the short circuit prevention effect is excellent and the safety of the battery can be improved due to the shout-down effect of the porous membrane. Particularly, polyethylene is preferred as a material constituting the separator 23, because polyethylene can exhibit a shut-down effect in a range from 100° C. to 160° C. inclusive, and also has excellent electrochemical stability. In addition, a material prepared by copolymerizing or blending a resin having chemical stability with polyethylene or polypropylene may also be used. Alternatively, the porous membrane may have a tri-layered structure composed of a polypropylene layer, a polyethylene layer and a polypropylene layer laminated in this order.

The separator 23 may have a configuration composed of a substrate and a surface layer arranged on one surface or both surfaces of the substrate. The surface layer contains inorganic particles that have electrical insulation properties and a resin material that can bind the inorganic particles to the surface of the substrate and can also bind the inorganic particles to each other. The resin material may also be fibrillated into fibrils and have a three-dimensional network structure in which the fibrils are connected to each other continuously. The inorganic particles are supported on the resin material having the three-dimensional network structure so as to keep a dispersed state while avoiding the mutual connection. Alternatively, the resin material may bind the inorganic particles to the surface or the inorganic particles to each other without being fibrillated. In this case, higher bindability can be achieved. When the surface layer is formed on one surface or both surfaces as mentioned above, it is possible to impart oxidation resistance, heat resistance and mechanical strength to the substrate.

The substrate is a porous layer having porous properties. More specifically, the substrate is a porous membrane composed of an insulating membrane having high ion permeability and specified mechanical strength, and the electrolytic solution is retained in voids in the substrate. It is preferred that the substrate has specified mechanical strength and acts as the main part of the separator and, on the other hand, has high resistance to the electrolytic solution and poor reactivity and cannot be expanded easily.

As the resin material constituting the substrate, a polyolefin resin such as polypropylene and polyethylene, an acrylic resin, a styrene resin, a polyester resin or a nylon resin can be used preferably. Particularly a polyethylene such as low-density polyethylene, high-density polyethylene and linear polyethylene or a low-molecular-weight wax fraction thereof, or a polyolefin resin such as polypropylene has a proper melting temperature and is easily available and therefore can be used preferably. Alternatively, a porous membrane having a structure composed of a laminate of two or more of these porous membranes or a porous membrane produced by melt-kneading at least two resin materials may be used. A battery having a porous membrane made from a polyolefin resin is excellent in the separability between the positive electrode 21 and the negative electrode 22 and is further reduced in the deterioration in internal short circuit.

As the substrate, a non-woven fabric may also be used. As a fiber constituting the non-woven fabric, an aramid fiber, a glass fiber, a polyolefin fiber, a polyethylene terephthalate (PET) fiber, or a nylon fiber can be used. Alternatively, the non-woven fabric may be composed of a mixture of two or more of these fibers.

The inorganic particles contain at least one component selected from a metal oxide, a metal nitride, a metal carbide, a metal sulfide and the like. As the metal oxide, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$) or the like can be used preferably. As the metal nitride, silicon nitride ($Si_3N_4$), aluminum nitride (AlN), boron nitride (BN), titanium nitride (TiN) or the like can be used preferably. As the metal carbide, silicon carbide (SiC), boron carbide (B4C) or the like can be used preferably. As the metal sulfide, barium sulfate ($BaSO_4$) or the like can be used preferably. A porous aluminosilicate salt such as zeolite ($M_{2/n}O$—$Al_2O_3$-$xSiO_2$-$yH_2O$, wherein M represents a metal element, x≥2, y≥0), a layered silicate salt, and a mineral such as barium titanate ($BaTiO_3$) or strontium titanate ($SrTiO_3$) may also be used. Particularly, alumina, titania (particularly one having a rutile-type structure), silica or magnesia can be used preferably, and alumina can be used more preferably. The inorganic particles have oxidation resistance and heat resistance, and therefore a positive-electrode-facing-side surface layer containing the inorganic particles have high resistance to an oxidative environment in the vicinity of the positive electrode during charging. The shape of each of the inorganic particles is not particularly limited, and inorganic particles each having any shape, such as a spherical shape, a plate-like shape, a fiber-like shape, a cubic shape and a random shape can be used.

Examples of the resin material constituting the surface layer include highly heat-resistant resins in each of which at least one of the melting point and the glass transition temperature is 180° C. or higher, such as a fluorine-containing resin, e.g., polyvinylidene fluoride and polytetrafluoroethylene, a fluorine-containing rubber such as a (vinylidene fluoride)-(tetrafluoroethylene) copolymer and an ethylene-tetrafluoroethylene copolymer, a styrene-butadiene copolymer or a hydride thereof, an acrylonitrile-butadiene copolymer or a hydride thereof, an acrylonitrile-butadiene-styrene copolymer or a hydride thereof, a methacrylate-acrylate copolymer, a styrene-acrylate copolymer, an acrylonitrile-acrylate copolymer, a rubber such as an ethylene propylene rubber, polyvinyl alcohol and polyvinyl acetate, a cellulose derivative such as ethyl cellulose, methyl cellulose, hydroxyethyl cellulose and carboxymethyl cellulose, polyphenylene ether, polysulfone, polyether sulfone, polyphenylene sulfide, polyether imide, polyimide, a polyamide such as all aromatic polyamides (aramid), polyamide-imide, polyacrylonitrile, polyvinyl alcohol, polyether, an acrylic acid resin, and polyester. These resin materials may be used singly, or two or more of them may be used in the form of a mixture. Among these resin materials, a fluororesin such as polyvinylidene fluoride is preferred from the viewpoint of oxidation resistance and flexibility, and aramid or polyamide-imide is preferably contained from the viewpoint of heat resistance.

The particle diameter of each of the inorganic particles preferably falls within the range from 1 nm to 10 μm. Inorganic particles having a particle diameter smaller than 1 nm cannot be obtained easily and, even if available, such inorganic particles are not cost effective. If the particle diameter is larger than 10 μm, the distance between the electrodes becomes long, therefore a sufficient active material charge amount cannot be achieved in a limited space, resulting in the decrease in a battery capacity.

As an example of the method for forming the surface layer, a method can be employed, which includes; applying a slurry composed of a matrix resin, a solvent and an inorganic material onto a substrate (a porous membrane); allowing the resultant product to pass through a poor solvent for the matrix resin and a bath of a solvent having affinity for the above-mentioned solvent to cause phase separation; and then drying the product.

The inorganic particles may be contained in the porous membrane that serves as the substrate. Alternatively, the surface layer may be composed only of the resin material without the inorganic particles.

The electrolytic solution is the same as the electrolytic solution according to the above-mentioned first embodiment.

At least one of the positive electrode 21 and the negative electrode 22 has a coating film derived from the first compound and the second compound and formed on the surface of the active material layer.

In the secondary battery according to the second embodiment, the open circuit voltage (i.e., battery voltage) per a pair composed of the positive electrode 21 and the negative electrode 22 in a completely charged state may be 4.2 V or less. However, the secondary battery may be designed in such a manner that the open circuit voltage can become higher than 4.2 V, preferably 4.4 to 6.0 V inclusive, more preferably 4.4 to 5.0 V inclusive. A high energy density can be achieved by increasing the battery voltage.

In the secondary battery having the above-mentioned configuration, when charged, lithium ions are released from the positive electrode active material layer 21B and are occluded in the negative electrode active material layer 22B through the electrolytic solution, for example. When discharged, lithium ions are released from the negative electrode active material layer 22B and are occluded in the positive electrode active material layer 21B through the electrolytic solution, for example.

Subsequently, one example of the method for producing the secondary battery according to the second embodiment of the present technology will be described.

Firstly, for example, a positive electrode active material, a conductive agent and a binder are mixed together to prepare a positive electrode mix, and then the positive electrode mix is dispersed in a solvent such as N-methyl-2-pyrrolidone (NMP) to produce a paste-like positive electrode mix slurry. Subsequently, the positive electrode mix slurry is applied onto a positive electrode current collector 21A, then the solvent is dried, then the resultant product is compression-molded using a roll press machine or the like to form a positive electrode active material layer 21B. In this manner, a positive electrode 21 is formed.

Then, for example, a negative electrode active material is mixed with a binder to prepare a negative electrode mix, and then the negative electrode mix is dispersed in a solvent such as N-methyl-2-pyrrolidone to produce a paste-like negative electrode mix slurry. Subsequently, the negative electrode mix slurry is applied onto a negative electrode current collector 22A, then the solvent is dried, and the resultant product is compression-molded using a roll press machine or the like to form a negative electrode active material layer 22B. In this manner, a negative electrode 22 is produced.

Subsequently, a positive electrode lead 25 is attached to the positive electrode current collector 21A by welding of the like, and a negative electrode lead 26 is attached to the negative electrode current collector 22A by welding or the like. Subsequently, the positive electrode 21 and the negative tive electrode 22 are wound with a separator 23 interposed therebetween. Subsequently, the tip of the positive electrode lead 25 is welded to a safety valve mechanism 15, and the tip of the negative electrode lead 26 is welded to a battery can 11, and then the wound positive electrode 21 and negative electrode 22 are sandwiched by a pair of insulating plates 12 and 13 and are housed in the inside of the battery can 11. Subsequently, after the positive electrode 21 and the negative electrode 22 are housed in the inside of the battery can 11, an electrolytic solution is injected into the battery can 11 to impregnate the separator 23 with the electrolytic solution. Subsequently, a battery lid 14, a safety valve mechanism 15 and a heat-sensing resistive element 16 are crimped together through a sealing gasket 17 to fix these components to an open end of the battery can 11. In this manner, a secondary battery shown in FIG. 2 is produced.

In the secondary battery according to the second embodiment, the first compound and the second compound are contained in the electrolytic solution. Therefore, a coating film derived from the first compound and the second compound is formed on the electrode during charging/discharging. As a result, the cycle properties of the secondary battery can be improved and the generation of a gas resulting from the decomposition of the electrolytic solution can be prevented.

Figure 3:
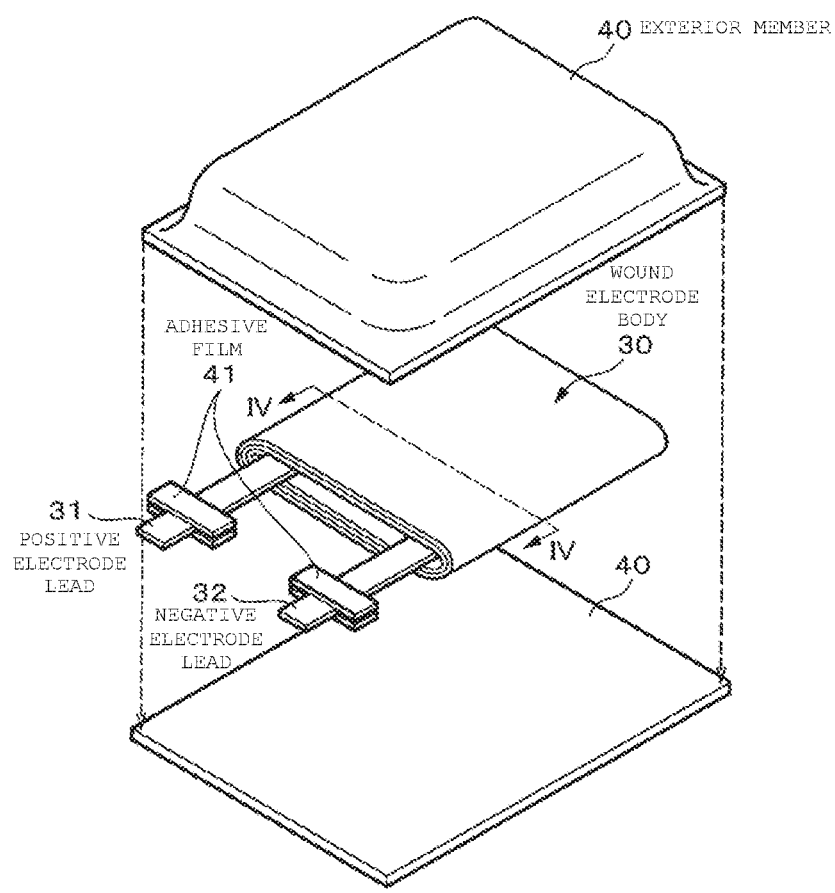
FIG. 3 is an exploded perspective view showing one configuration example of a non-aqueous electrolyte secondary battery according to an embodiment of the present technology.

FIG. 3 is an exploded perspective view showing one configuration example of the secondary battery according to a third embodiment of the present technology. The secondary battery is of a so-called flat or square type, wherein a wound electrode body 30 having a positive electrode lead 31 and a negative electrode lead 32 attached thereto is housed in the inside of a film-like exterior member 40. The secondary battery of this type can be reduced in size, weight and thickness.

The positive electrode lead 31 and the negative electrode lead 32 are led, for example, in a single direction from the inside of an exterior member 40 toward the outside of the exterior member 40. Each of the positive electrode lead 31 and the negative electrode lead 32 is made from a metal material such as aluminum, copper, nickel and stainless steel, and is formed in a thin-film-like or network-like shape.

The exterior member 40 is composed of, for example, a rectangular aluminum laminate film in which a nylon film, an aluminum foil and a polyethylene film are laminated in this order. The exterior member 40 is arranged, for example, in such a manner that the polyethylene film side of the exterior member 40 and the wound electrode body 30 can face each other and the outer peripheral parts of these components are caused to adhere to each other by fusion bonding or with an adhesive agent. An adhesive film 41 for preventing the invasion of outside air is inserted between the exterior member 40 and each of the positive electrode lead 31 and the negative electrode lead 32. The adhesive film 41 is made from a material having adhesiveness to the positive electrode lead 31 and the negative electrode lead 32, such as a polyolefin resin including polyethylene, polypropylene, modified polyethylene and modified polypropylene.

The exterior member 40 may also be composed of a laminate film having another structure, a polymer film such as a polypropylene film or a metal film in place of the above-mentioned aluminum laminate film. Alternatively, a laminate film in which a polymer film is laminated on one side or both sides of an aluminum-made film that serves as a core material may be used.

Figure 4:
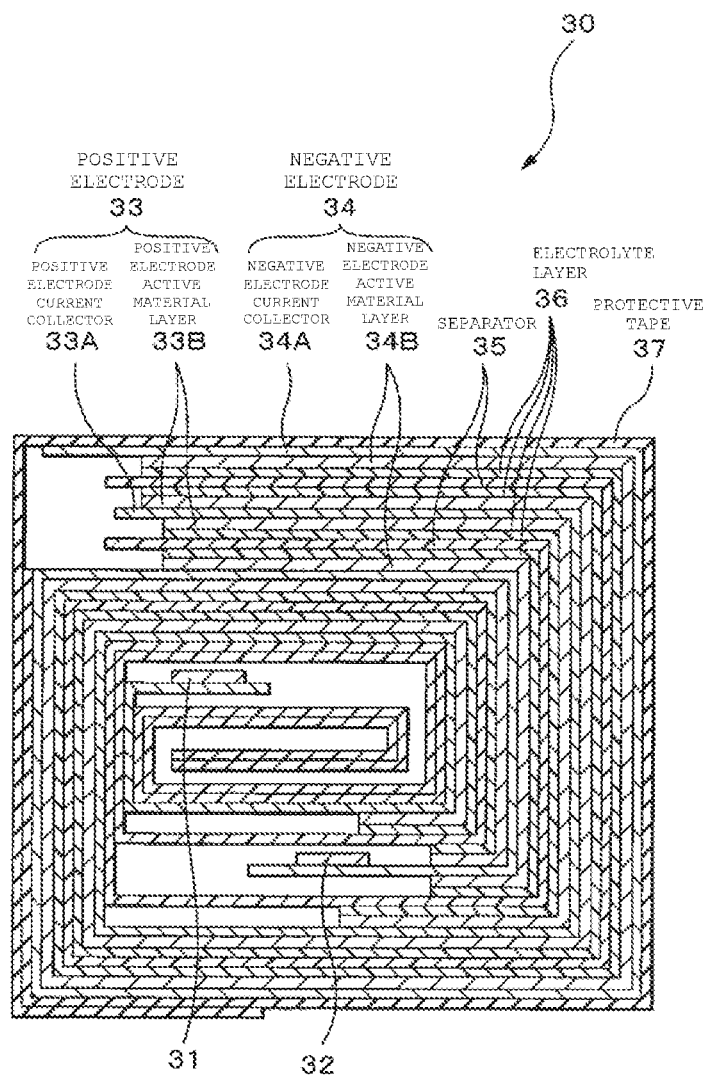
FIG. 4 is a cross-sectional view of a wound electrode body which is taken along line IV-IV shown in FIG. 3 according to an embodiment of the present technology.

FIG. 4 is a cross-sectional view of the wound electrode body 30 shown in FIG. 3, which is taken along line IV-IV. The wound electrode body 30 is produced by laminating the positive electrode 33 and the negative electrode 34 with the separator 35 and the electrolyte layer 36 interposed therebetween and then winding the resultant laminate, and the outermost periphery is protected by a protective tape 37.

The positive electrode 33 has such a structure that a positive electrode active material layer 33B is arranged on one surface or both surfaces of a positive electrode current collector 33A. The negative electrode 34 has such a structure that a negative electrode active material layer 34B is arranged on one surface or both surfaces of a negative electrode current collector 34A, and is arranged in such a manner that the negative electrode active material layer 34B can face the positive electrode active material layer 33B. The configurations of the positive electrode current collector 33A, the positive electrode active material layer 33B, the negative electrode current collector 34A, the negative electrode active material layer 34B and the separator 35 are the same as those of the positive electrode current collector 21A, the positive electrode active material layer 21B, the negative electrode current collector 22A, the negative electrode active material layer 22B and the separator 23 in the second embodiment.

The electrolyte layer 36 contains an electrolytic solution and a polymeric compound that serves as a carrier for retaining the electrolytic solution therein and has a so-called gel-like form. The gel-like electrolyte layer 36 is preferred, because a high ion conductivity can be achieved and the liquid leakage from the battery can be prevented. The electrolytic solution is the same as the electrolytic solution according to the first embodiment. Specific examples of the polymeric compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. From the viewpoint of electrochemical stability, polyacrylonitrile, polyvinylidene fluoride, polyhexafluoropropylene or polyethylene oxide is preferred.

An inorganic material that is the same as the inorganic material mentioned in the description about the resin layer in the separator 23 in the second embodiment may be contained in the gel-like electrolyte layer 36. This is because the heat resistance can be further improved. Alternatively, an electrolytic solution may be used in place of the electrolyte layer 36.

Next, one example of the method for producing the secondary battery according to the third embodiment of the present technology will be described.

Firstly, a precursor solution containing a solvent, an electrolyte salt, a polymeric compound and a mixed solvent is applied onto the positive electrode 33 and the negative electrode 34, and then the mixed solvent is vaporized to form an electrolyte layer 36. Subsequently, a positive electrode lead 31 is attached to an end part of a positive electrode current collector 33A by welding, and a negative electrode lead 32 is attached to an end part of a negative electrode current collector 34A by welding. Subsequently, the positive electrode 33 and the negative electrode 34 each having the electrolyte layer 36 formed thereon are laminated together with a separator 35 interposed therebetween to produce a laminate. The laminate is wound in the length direction, and a protective tape 37 is caused to adhere to the outermost periphery to form a wound electrode body 30. Finally, for example, the wound electrode body 30 is intercalated between the exterior members 40, and then the outer peripheries of the exterior members 40 are sealed by causing the outer peripherals to adhere to each other by thermal fusion bonding or the like. In this instance, an adhesive film 41 is inserted between each of the positive electrode lead 31 and the negative electrode lead 32 and the exterior member 40. In this manner, a secondary battery represented by FIG. 4 and FIG. 4 can be produced.

Alternatively, the secondary battery may also be produced in the following manner. Firstly, a positive electrode 33 and a negative electrode 34 are produced in the above-mentioned manner, and then a positive electrode lead 31 and a negative electrode lead 32 are attached to the positive electrode 33 and the negative electrode 34, respectively. Subsequently, the positive electrode 33 and the negative electrode 34 are laminated and wound with a separator 35 interposed therebetween, and then a protective tape 37 is attached to the outermost periphery of the resultant product to form a wound body. Subsequently, the wound body is intercalated between exterior members 40, then the outer peripheral parts excluding those on one side are thermally fusion-bonded to make a bag-like product, so that the wound body is housed in the inside of the exterior members 40. Subsequently, an electrolyte composition containing a solvent, an electrolyte salt, a monomer that is a raw material for a polymeric compound, a polymerization initiator and optionally other materials such as a polymerization inhibitor is prepared and is injected into the inside of the exterior members 40.

After the electrolyte composition is injected into the exterior members 40, an opening of the exterior members 40 is sealed by thermal fusion bonding under a vacuum atmosphere. Subsequently, the monomer is polymerized by applying heat to produce a polymeric compound. In this manner, a gel-like electrolyte layer 36 can be formed. In this manner, a secondary battery shown FIG. 4 is produced.

Figure 5:
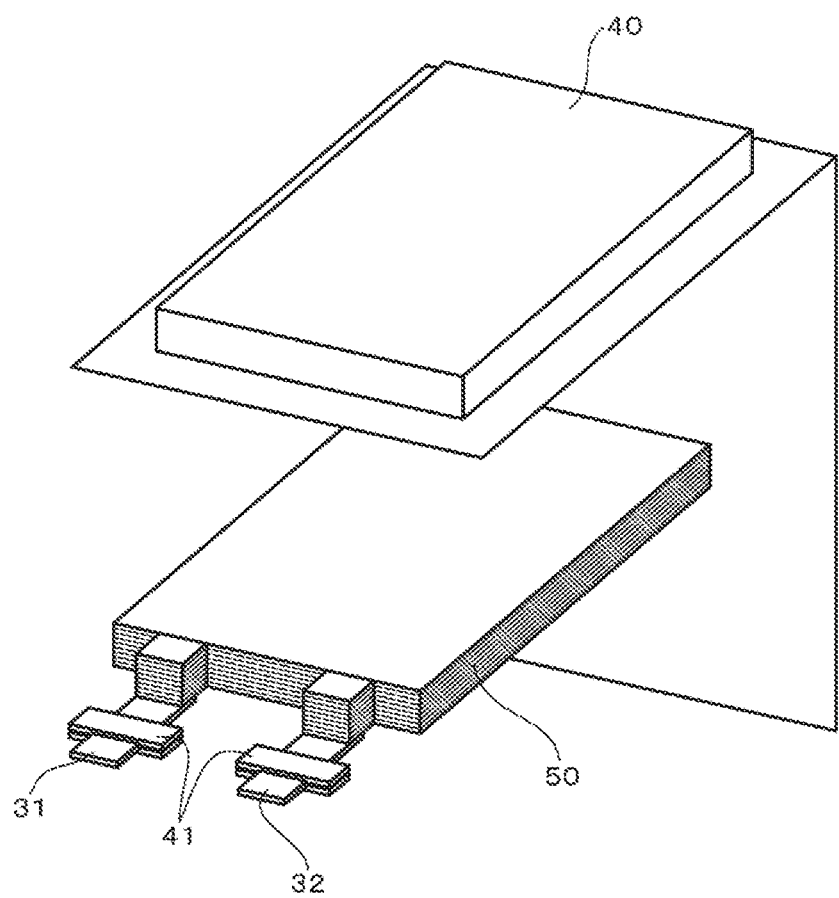
FIG. 5 is an exploded perspective view showing one configuration example of a non-aqueous electrolyte secondary battery according to an embodiment of the present technology.

As shown in FIG. 5, a secondary battery according to a fourth embodiment of the present technology is different from the secondary battery according to the third embodiment in the fact that a stacked electrode body 50 is provided in place of the wound electrode body 30. In the fourth embodiment, the same reference numbers are assigned to parts that are the same as in the third embodiment and the description about the parts is omitted.

Figure 6:
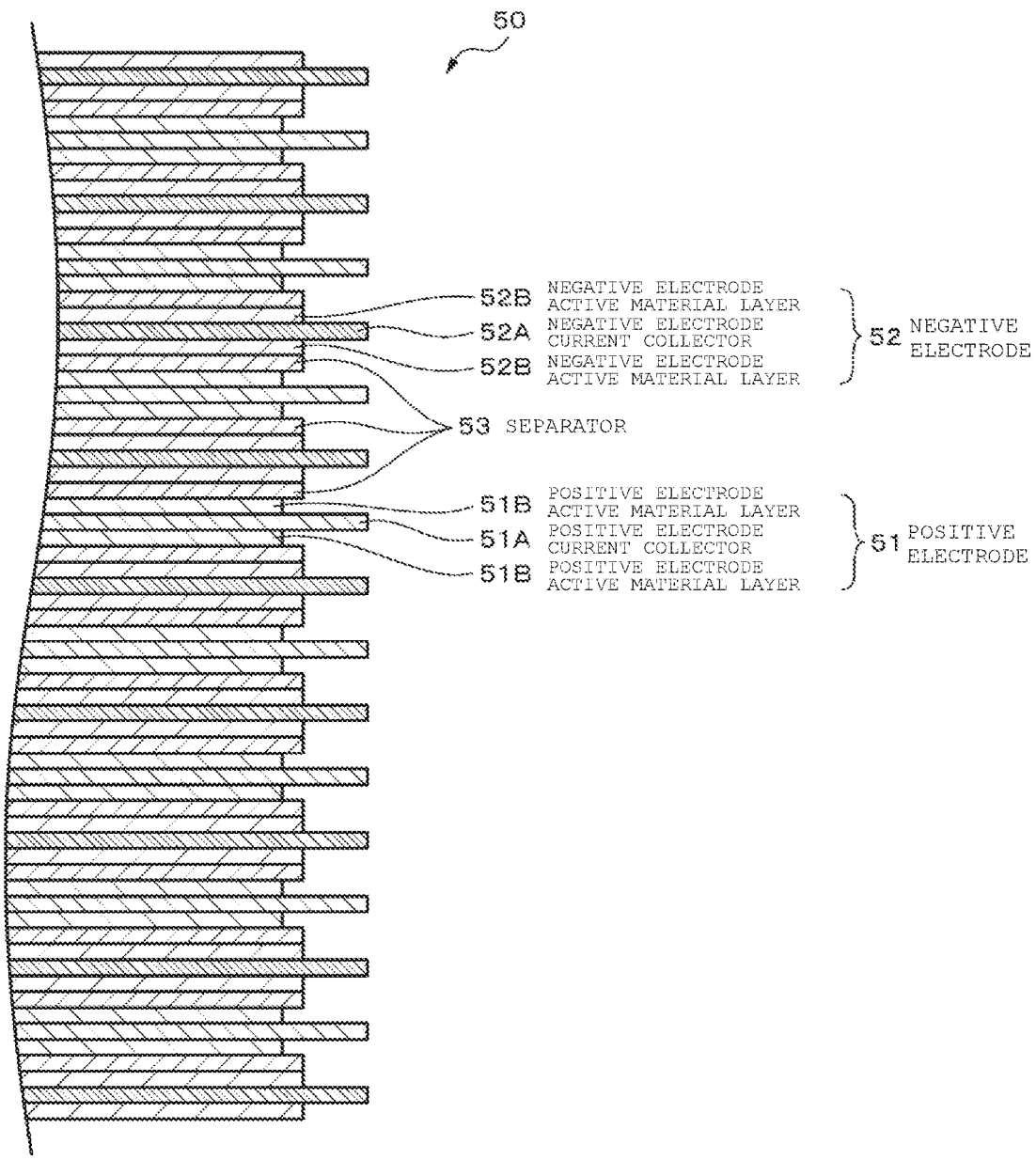
FIG. 6 is a cross-sectional view showing one configuration example of a stacked electrode body shown in FIG. 5 according to an embodiment of the present technology.

As shown in FIG. 6, the electrode body 50 is provided with a positive electrode 51, a negative electrode 52, a separator 53 and an electrolytic solution that serves as an electrolyte, and has such a structure that the positive electrode 51 and the negative electrode 52 are laminated with the separator 53 interposed therebetween. The positive electrode 51, the negative electrode 52 and the separator 53 are impregnated with the electrolytic solution.

The positive electrode 51 has such a structure that a positive electrode active material layer 51B is arranged on both surfaces of a positive electrode current collector 51A. It is also possible to provide the positive electrode active material layer 51B only on one surface of the positive electrode current collector 51A, which is not shown in the figure.

Figure 7A:
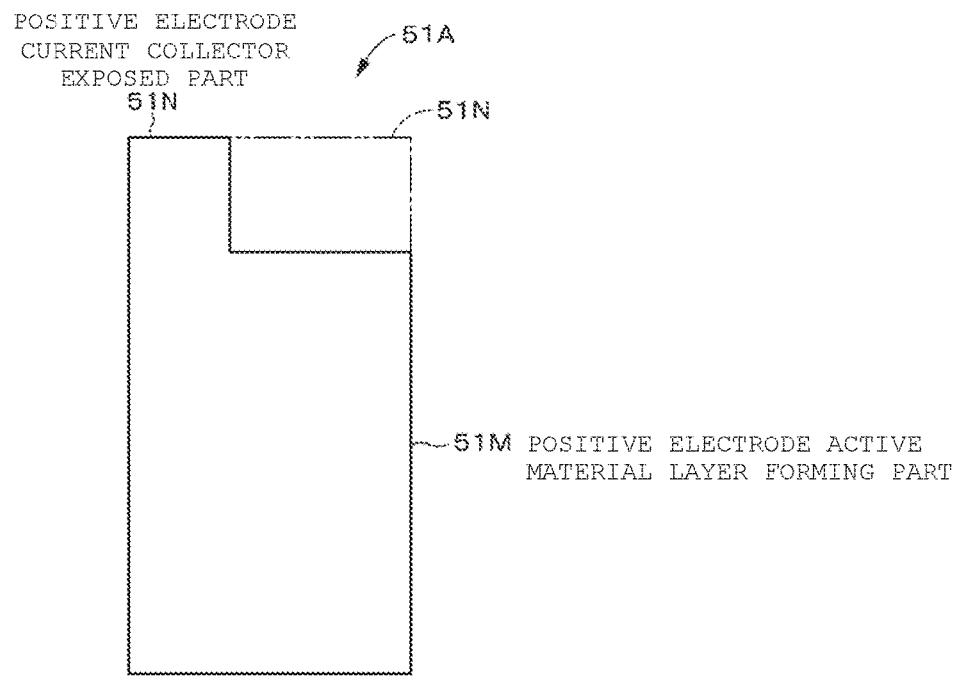
FIG. 7A is a plan view showing one configuration example of a positive electrode current collector.

As shown in FIG. 7A, the positive electrode current collector 51A is provided with a positive electrode active material layer formed part 51M and a positive electrode current collector exposed part 51N. In a planar view of the positive electrode active material layer formed part 51M as observed in a direction vertical to the main surface of the positive electrode current collector 51A, the positive electrode active material layer formed part 51M has a rectangular shape. The positive electrode active material layer 51B is arranged on both surfaces of the positive electrode active material layer formed part 51M. The positive electrode current collector exposed part 51N extends from a portion of one side of the positive electrode active material layer formed part 51M. As shown by a two-dot chain line in FIG. 7A, the positive electrode current collector exposed part 51N may also extend from the entire portion of one side of the positive electrode active material layer formed part 51M. In the state where the positive electrode 51, the negative electrode 52 and the separator 53 are laminated together, a plurality of the positive electrode current collector exposed parts 51N are bonded to each other, and the bonded positive electrode current collector exposed parts 51N are electrically connected to the positive electrode lead 31. The materials for the positive electrode current collector 51A and the positive electrode active material layer 51B are the same as those used for the positive electrode current collector 21A and the positive electrode active material layer 21B in the second embodiment, respectively.

The negative electrode 52 has such a structure that a negative electrode active material layer 52B is arranged on both surfaces of a negative electrode current collector 52A, wherein the negative electrode active material layer 52B and the positive electrode active material layer 51B are arranged so as to face each other. The negative electrode active material layer 52B may be arranged on only one surface of the negative electrode current collector 52A, which is not shown in the figure.

Figure 7B:
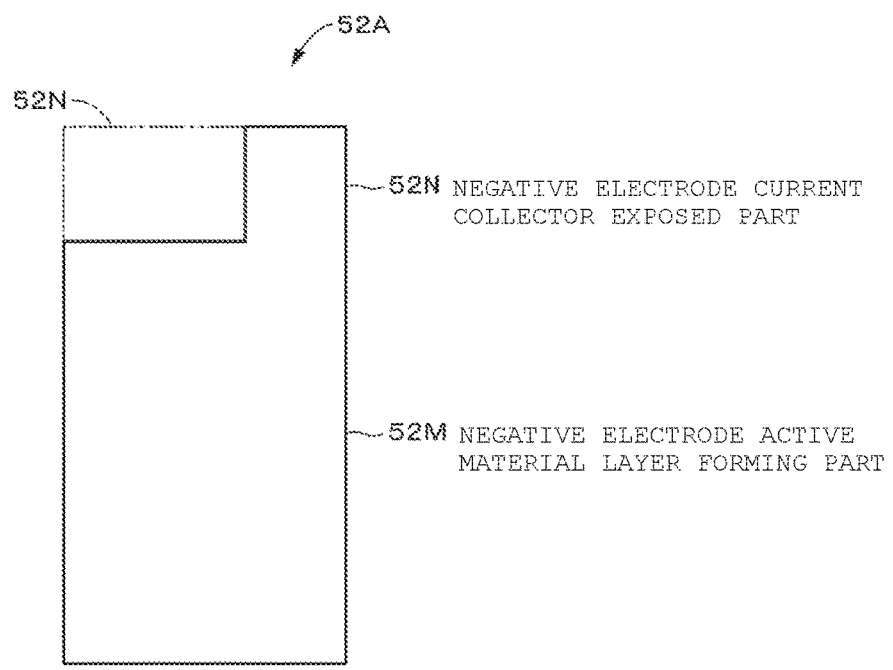
FIG. 7B is a plan view showing one configuration example of a negative electrode current collector according to an embodiment of the present technology.
Figure 8:
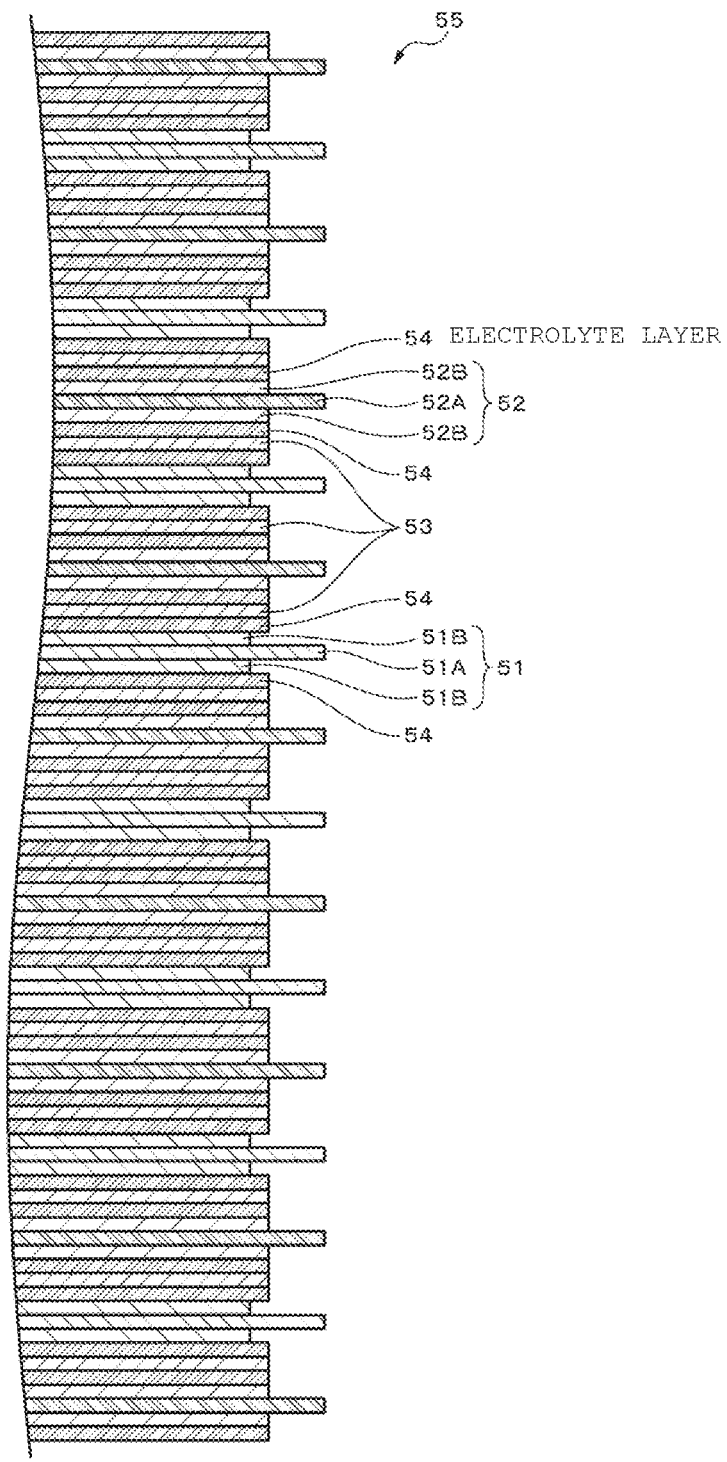
FIG. 8 is a cross-sectional view showing one configuration example of a stacked electrode body used in a non-aqueous electrolyte secondary battery according to according to an embodiment of the present technology.

As shown in FIG. 7B, the negative electrode current collector 52A is provided with a negative electrode active material layer formed part 52M and a negative electrode current collector exposed part 52N. In a planar view of the negative electrode active material layer formed part 52M as observed in a direction vertical to the main surface of the negative electrode current collector 52A, the negative electrode active material layer formed part 52M has a rectangular shape. The negative electrode active material layer 52B is arranged on both surfaces or one surface of the negative electrode active material layer formed part 52M. The negative electrode current collector exposed part 52N extends from a portion of one side of the negative electrode active material layer formed part 52M. As shown by a two-dot chain line in FIG. 7B, the negative electrode current collector exposed part 52N may also extend from the entire portion of one side of the negative electrode active material layer formed part 52M. In the state where the positive electrode 51, the negative electrode 52 and the separator 53 are laminated together, a plurality of the negative electrode current collector exposed parts 52N are bonded to each other, and the bonded negative electrode current collector exposed parts 52N are electrically connected to the negative electrode lead 32. The materials for the negative electrode current collector 52A and the negative electrode active material layer 52B are the same as those used for the negative electrode current collector 22A and the negative electrode active material layer 22B in the second embodiment, respectively.

The separator 53 is the same as the separator 23 in the above-mentioned first embodiment, except that the separator 53 has a rectangular shape.

The electrolytic solution is the same as that used in the above-mentioned first embodiment.

Next, one example of the method for producing the secondary battery according to the fourth embodiment of the present technology will be described.

Firstly, a positive electrode 51 and a negative electrode 52 are produced in the same manner as in the second embodiment. Subsequently, the positive electrode 51 and the negative electrode 52 are cut. Subsequently, a polypropylene-made microporous film or the like is cut into a rectangular shape to produce a separator 53. Subsequently, as shown in FIG. 6, a plurality of the positive electrodes 51 and a plurality of the negative electrodes 52 and a plurality of the separators 53 which are produced in the same manner as mentioned above are laminated in the following order: the separator 53, the positive electrode 51, the separator 53, the negative electrode 52, the separator 53, . . . , the separator 53, the negative electrode 52, the separator, the positive electrode 51, the separator 53. In this manner, a stacked electrode body 50 is produced.

Subsequently, positive electrode current collector exposed parts 51N in the plurality of laminated positive electrodes 51 are bonded to each other, and a positive electrode lead 31 is electrically connected to the bonded positive electrode current collector exposed parts 51N. Negative electrode current collector exposed parts 52N in the plurality of laminated negative electrodes 52 are bonded to each other, and a negative electrode lead 32 is electrically connected to the bonded negative electrode current collector exposed parts 52N. Preferred examples of the method for the connection include ultrasonic welding, resistance welding and soldering. From the viewpoint of avoiding the damage to a connected part by heat, a method that is little-affected by heat, such as ultrasonic welding and resistance welding, can be used preferably.

Subsequently, the stacked electrode body 50 is impregnated, then the stacked electrode body 50 is intercalated between the exterior members 40, and the outer peripheries of the exterior members 40 are brought into close contact and sealed by thermal fusion bonding, for example. In this instance, the positive electrode lead 31 and the negative electrode lead 32 are arranged outside of the exterior members 40 through the thermal-fusion-bonded part, and the outside parts are employed as positive and negative electrode terminals. In this manner, a desired secondary battery can be produced.

Next, a modification example of the fourth embodiment of the present technology will be described. A secondary battery according to this modification example is different from that according to the fourth embodiment in the fact that an electrolyte layer 54 is provided in place of the electrolytic solution. In this modification example, the same reference numbers are assigned to parts that are the same as in the fifth embodiment and the description about the parts is omitted.

An electrode body 50 is a laminate of a positive electrode 51 and a negative electrode 52 with a separator 53 and an electrolyte layer 54 interposed therebetween. The electrolyte layer 54 contains the electrolytic solution according to the first embodiment and a polymeric compound that serves as a carrier for retaining the electrolytic solution therein, and has a so-called gel-like form. The gel-like electrolyte layer 54 is preferred, because a high ion conductivity can be achieved and the liquid leakage from the battery can be prevented. The composition of the polymeric compound is the same as that in the secondary battery according to the fourth embodiment.

The secondary battery that is configured as mentioned above can be produced, for example, in the following manner. Firstly, a precursor solution containing a solvent, an electrolyte salt, a polymeric compound and a mixed solvent is applied onto each of a positive electrode 51 and a negative electrode 52, and then the mixed solvent is vaporized to form an electrolyte layer 54. Subsequently, the same procedure as in the fourth embodiment is carried out, except that the positive electrode 51 and the negative electrode 52 each having the electrolyte layer 54 formed thereon are used. In this manner, a secondary battery can be produced.

In a fifth embodiment, a battery pack and an electronic device each equipped with the secondary battery according to the second embodiment, the third embodiment, or the fourth embodiment or the modification example thereof will be described.

Figure 9:
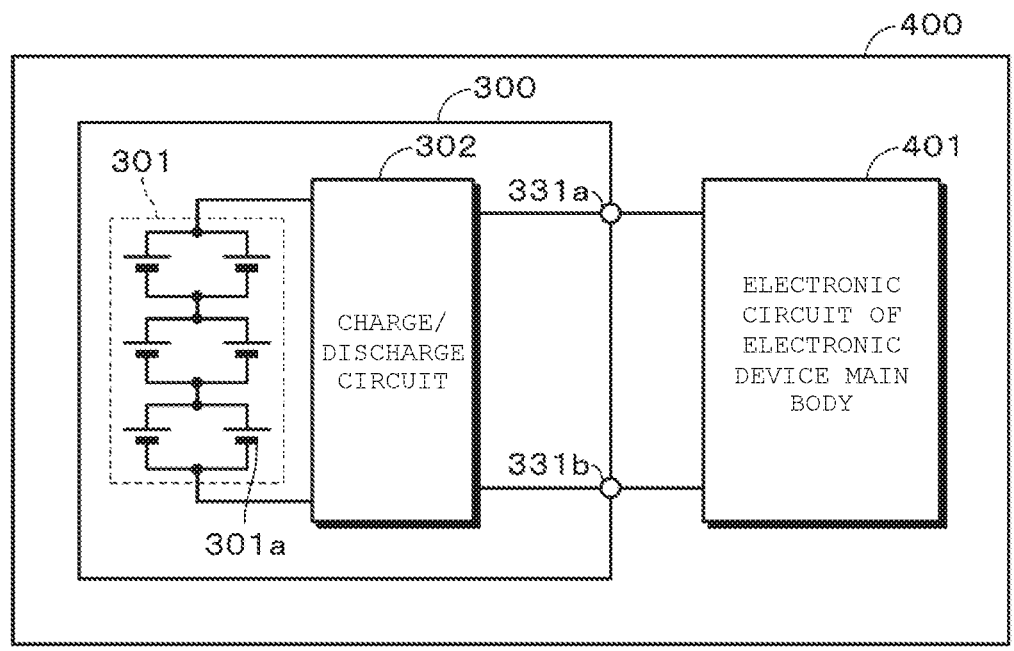
FIG. 9 is a block diagram showing one configuration example of a battery pack and an electronic device according to an embodiment of the present technology.

Hereinbelow, one configuration example of a battery pack 300 and one configuration example of an electronic device 400 according to the fifth embodiment of the present technology will be described with reference to FIG. 9. The electronic device 400 is provided with an electronic circuit 401 that is an electronic device main body and a battery pack 300. The battery pack 300 is electrically connected to an electronic circuit 401 through a positive electrode terminal 331a and a negative electrode terminal 331b. The electronic device 400 has, for example, such a configuration that the battery pack 300 can be removed by a user. The configuration of the electronic device 400 is not limited to this configuration, and may have such a configuration that the battery pack 300 is housed in the electronic device 400 so that the battery pack 300 cannot be detached from the electronic device 400 by a user.

During the charging of the battery pack 300, the positive electrode terminal 331a and the negative electrode terminal 331b in the battery pack 300 are connected to the positive electrode terminal and the negative electrode terminal of a battery charger (not shown), respectively. On the other hand, during the discharging of the battery pack 300 (i.e., during the use of the electronic device 400), the positive electrode terminal 331a and the negative electrode terminal 331b in the battery pack 300 are connected to a positive electrode terminal and a negative electrode terminal of the electronic circuit 401, respectively.

Examples of the electronic device 400 include, but are not limited to, a note-type personal computers, a tablet-type computer, a mobile phone (e.g., a smart phone), a mobile information terminal (a Personal Digital Assistant: PDA), a display device (e.g., a LCD, an EL display, electronic paper), an imaging device (e.g., a digital still camera, a digital video camera), an audio device (e.g., a portable audio player), a game device, a codeless handset, an electronic book, an electronic dictionary, a radio, a headphone, a navigation system, a memory card, a pacemaker, a hearing aid, an electric power tool, an electric shaver, a refrigerator, an air conditioner, a television, a stereo, a water heater, a microwave oven, a dish washer, a laundry machine, a dryer, a lighting device, a toy, a medical device, a robot, a road conditioner and a traffic light.

The electronic circuit 401 is provided with, for example, a CPU, a peripheral logic unit, an interface unit and a storage unit, and can control the whole system of the electronic device 400.

The battery pack 300 is provided with an assembled battery 301 and a charge/discharge circuit 302. The assembled battery 301 is composed of a plurality of secondary batteries 301a that are connected in series and/or in parallel. The plurality of secondary batteries 301a can be connected in, for example, a n parallel x m series configuration (wherein n and m independently represent a positive integer). In FIG. 9, an example in which six secondary batteries 301a are connected in a 2 parallel×3 series (2P3S) configuration is shown. As the secondary batteries 301a, the secondary batteries according to the second embodiment, the third embodiment, or the fourth embodiment or the modification example thereof can be used.

The charge/discharge circuit 302 is a control unit (controller including a processor) for controlling the charging and discharging of the assembled battery 301. Specifically, the charge/discharge circuit 302 controls the charging of the assembled battery 301 during charging, while the charge/discharge circuit 302 controls the discharge to the electronic device 400 during discharging (i.e., during the use of the electronic device 400).

In the above-mentioned fifth embodiment, an example in which the battery pack 300 is provided with an assembled battery 301 composed of a plurality of secondary batteries 301a is described. However, the battery pack 300 may be provided with a single secondary battery 301a in place of the assembled battery 301.

In a sixth embodiment, an electrical storage system in which an electrical storage device is provided with the secondary battery according to the second embodiment, the third embodiment, or the fourth embodiment or the modification example thereof is described. The electrical storage system may be any one, as long as an electric power is utilized. The electrical storage system includes a simple electric power unit within the scope thereof. The electric power system includes, for example, a smart grid, a home energy management system (HEMS) and a vehicle, and can store an electric power.

Figure 10:
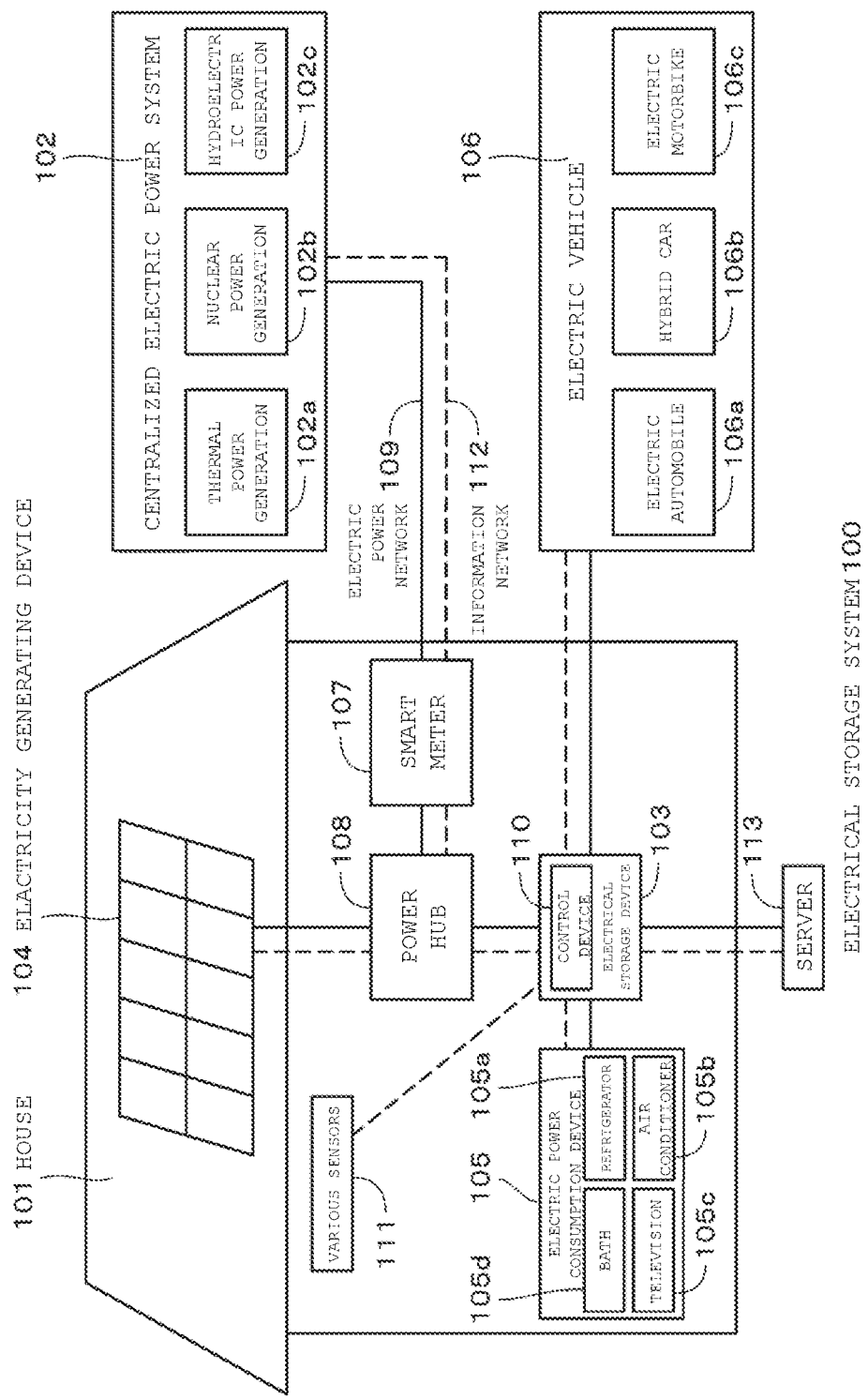
FIG. 10 is a schematic view showing one configuration example of an electrical storage system according to an embodiment of the present technology.

Hereinbelow, a configuration example of an electrical storage system (an electric power system) 100 according to a sixth embodiment will be described with reference to FIG. 10. The electrical storage system 100 is a residential electrical storage system, and an electric power is supplied to the electrical storage device 103 from a centralized electric power system 102 such as a thermal power generation 102a, a nuclear power generation 102b and a hydroelectric power generation 102c through an electric power network 109, an information network 112, a smart meter 107, a power hub 108 and the like. Simultaneously, an electric power is supplied from an independent power supply such as an in-house electricity generating device 104 to the electrical storage device 103. The electric power supplied to the electrical storage device 103 is electrically stored. An electric power to be used in a house 101 can be supplied using the electrical storage device 103. The same electrical storage system can be used in a building as well as the house 101.

In the house 101, an in-house electricity generating device 104, an electric power consumption device 105, an electrical storage device 103, a control device (controller) 110 for controlling these devices, a smart meter 107, a power hub 108, and a sensor 111 for obtaining various types of information are provided. The devices are connected to each other through an electric power network 109 and an information network 112. As the in-house electricity generating device 104, a solar cell, a fuel cell or the like can be used, a generated electric power is supplied to the electric power consumption device 105 and/or the electrical storage device 103. Examples of the electric power consumption device 105 include a refrigerator 105a, an air conditioning device 105b, a television receiver 105c and a bath 105d. In addition, an electric vehicle 106 is also included in the electric power consumption device 105. Examples of the electric vehicle 106 include an electric automobile 106a, a hybrid car 106b and an electric motorbike 106c.

The electrical storage device 103 is provided with the secondary battery according to the second embodiment, the third embodiment, or the fourth embodiment or the modification example thereof. The smart meter 107 has a function to measure the usage amount of a commercial electric power and transmit the measured usage amount to an electric power company. The electric power network 109 may be any one of a direct current power supply, an alternate current power supply and a non-contact power supply or a combination of two or more of them.

Examples of the various sensors 111 include a human sensor, an illuminance sensor, an object detection sensor, a consumed electric power sensor, a vibration sensor, a contact sensor, a temperature sensor and an infrared ray sensor. Information obtained by the various sensors 111 is transmitted to the control device 110. The condition of weather, the condition of human and the like can be assessed on the basis of the information transmitted from the sensor 111 so that the electric power consumption device 105 can be controlled automatically to minimize the energy consumption. Furthermore, the control device 110 can transmit information about the house 101 to an external electric power company or the like through an internet.

Processing such as the branching of an electric power line and the direct current/alternate current conversion can be performed by means of the power hub 108. As the communication mode for the information network 112 to be connected to the control device 110, the following methods can be mentioned: a method using a communication interface such as UART (Universal Asynchronous Receiver-Transceiver: an asynchronous serial communication transmitter-receiver circuit), and a method using a sensor network by a wireless communication standard such as Bluetooth (registered tradename), ZigBee, Wi-Fi or the like. A Bluetooth (registered tradename) mode can be applied to multimedia communication, and enables point-to-multipoint communication. ZigBee utilizes a physical layer of IEEE (Institute of Electrical and Electronics Engineers) 802.15.4. IEEE802.15.4 is a name of a short range wireless network standard called PAN (Personal Area Network) or W (Wireless) PAN.

The control device 110 is connected to an external server 113. The server 113 may be managed by any one of the house 101, an electric power company and a service provider. Examples of the information transmitted from and received by the server 113 include information about a consumed electric power, information about life patterns, an electric power charge, weather information, natural disaster information, and information about electric power trading. These types of information may be transmitted from or received by an in-house electric power consumption device (e.g., a television receiver) or an out-house device (e.g., a mobile telephones). These types of information may be displayed on a device having a displaying function, such as a television receiver, a mobile telephone and a PDA (Personal Digital Assistant).

The control device (controller) 110 for controlling the units is composed of a CPU (Central Processing Unit) or a processor, a RAM (Random Access Memory), a ROM (Read Only Memory) and the like. In this example, the control device 110 is housed in the electrical storage device 103. The control device 110 is connected to the electrical storage device 103, the in-house electricity generating device 104, the electric power consumption device 105, the various sensors 111 and the server 113 through an information network 112, and has a function to control the usage amount of a commercial electric power and an electric power generated amount. The control device 110 may also have, for example, a function to perform an electric power trading on an electric power market.

As mentioned above, it is possible to store an electric power in a centralized electric power system 102 such as a thermal power generation 102a, a nuclear power generation 102b and a hydroelectric power generation 102c, and it also is possible to store an electric power generated by an in-house electricity generating device 104 (e.g., a solar power generation, a wind power generation) in the electrical storage device 103. Therefore, even when the electric power generated in the in-house electricity generating device 104 varies, it is possible to perform a control so as to keep an electric power amount to be transmitted to the outside at a constant level or a control so as to discharge as needed. For example, it is possible to store an electric power generated by a solar power generation in the electrical storage device 103, and it also is possible to store a midnight electric power that is inexpensive at night in the electrical storage device 103 and discharge the stored electric power stored in the electrical storage device 103 in the daytime during which electricity prices are expensive.

In this embodiment, an example in which the control device 110 is housed in the electrical storage device 103 is described. However, the control device 110 may be housed in the smart meter 107, or may be composed by itself. Furthermore, the electrical storage system 100 may be used in a plurality of homes in a multifamily apartment building, or may be used in a plurality of single-family houses.

In a seventh embodiment, an electric vehicle provided with the secondary battery according to the second embodiment, the third embodiment, or the fourth embodiment or the modification example thereof will be described.

Figure 11:
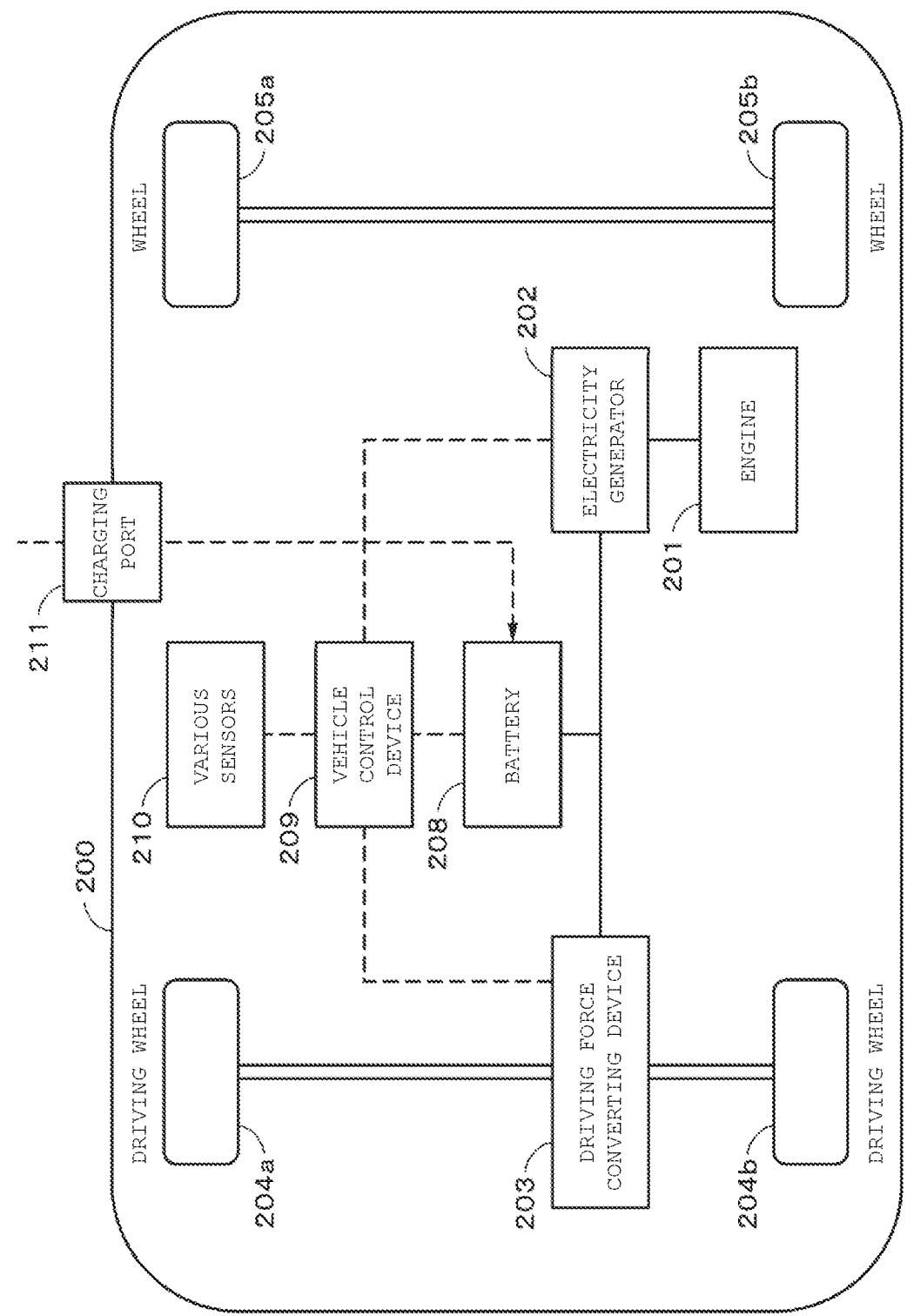
FIG. 11 is a schematic view showing one configuration example of an electric vehicle according to an embodiment of the present technology.

One configuration of an electric vehicle according to the seventh embodiment of the present technology will be described with reference to FIG. 11. The hybrid car 200 is one employing a series hybrid system. The series hybrid system is a car that can run by means of an electric power-driving force converting device 203 using an electric power generated by an electric power generator that can be driven by an engine or an electric power that is the aforementioned electric power stored in a battery.

The hybrid car 200 is provided with an engine 201, an electricity generator 202, an electric power-driving force converting device 203, a driving wheel 204a, a driving wheel 204b, a wheel 205a, a wheel 205b, a battery 208, a vehicle control device 209, various sensors 210 and a charging port 211. As the battery 208, the secondary battery according to the second embodiment, the third embodiment, or the fourth embodiment or the modification example thereof can be used.

The hybrid car 200 can run utilizing the electric power-driving force converting device 203 as a driving source. One example of the electric power-driving force converting device 203 is a motor. The electric power-driving force converting device 203 is operated by an electric power from the battery 208, and a rotative force from the electric power-driving force converting device 203 is transmitted to the driving wheels 204a and 204b. The electric power-driving force converting device 203 can be applied to an alternate current motor or a direct current motor by using a direct current-alternate current (DC-AC) conversion or reverse conversion (AC-DC conversion) at a necessary position. The various sensors 210 can control the rotation frequency of the engine through the vehicle control device 209 or the aperture of a throttle valve (not shown) (i.e., a throttle aperture). The various sensors 210 include a speed sensor, an acceleration rate sensor, an engine rotation frequency sensor and the like.

The rotative force of the engine 201 is transmitted to the electricity generator 202, and it is possible to store an electric power generated by the electricity generator 202 utilizing the rotative force in the battery 208.

When the hybrid car 200 is decelerated by a stabilizing mechanism that is not shown in the figure, a resistance force generated during the deceleration is applied as a rotative force to the electric power-driving force converting device 203, and a regenerative electric power generated by the power driving force converting device 203 utilizing the rotative force is stored in the battery 208.

The battery 208 can also be connected to an external power supply located outside of the hybrid car 200 through the charging port 211 to receive the supply of an electric power from the external power supply through the charging port 211 that serves as an inlet port, and the received electric power can be stored.

Although not shown in the figure, an information processing device which can perform the processing of information about the control of the vehicle on the basis of information about the secondary battery may also be provided. An example of the information processing device is one which can display a remaining battery level on the basis of information about the remaining level of the secondary battery.

As mentioned above, a series hybrid car which can run utilizing a motor using an electric power generated by an electric power generator that can be driven by means of an engine or an electric power that is the aforementioned electric power stored in a battery is described as an example. However, the present technology can also be effectively applied to a parallel hybrid car which can run utilizing each of an engine and a motor and can be appropriately switched among three modes, i.e., a mode running only by the engine, a mode running only by the motor and a mode running by both of the engine and the motor. The present technology can also be effectively applied to a so-called electric vehicle which can run by the driving using only a driving motor without needing to use an engine.

Hereinbelow, the present technology will be described concretely by way of examples. However, the present technology is not limited to these examples.

The first compounds used in Examples and Comparative Examples are compounds represented by formulae (1-1) to (1-4).

[Chemical formula 19]

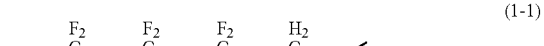
(1-1)

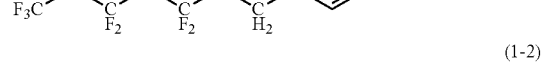
(1-2)

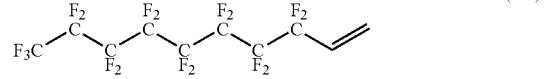
(1-3)

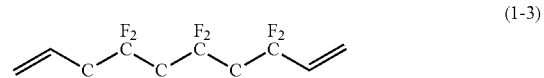
(1-4)

The second compounds used in Examples and Comparative Examples are compounds represented by formulae (2-1) to (2-7).

[Chemical formula 20]

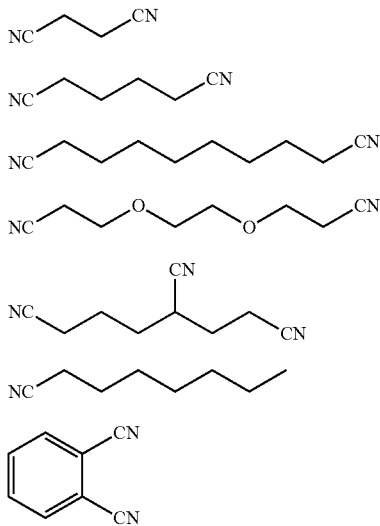

(2-1)
(2-2)
(2-3)
(2-4)
(2-5)
(2-6)
(2-7)

Hereinbelow, the compounds respectively represented by formulae (1-1), (1-2), . . . and (1-4) refer to compounds (1-1), (1-2), . . . and (1-4), respectively, and compounds respectively represented by formulae (2-1), (2-2), . . . and (2-7) refer to compounds (2-1), (2-2), . . . and (2-7), respectively.

(1) Examples and Comparative Examples each having following configuration: positive electrode: LCO, negative electrode: graphite, electrolyte: electrolytic solution, separator: separator having resin layer attached thereto.

Example 1-1

A positive electrode was produced in the following manner. Firstly, lithium carbonate ($Li_2CO_3$) and cobalt carbonate ($CoCO_3$) were mixed at a molar ratio of 0.5:1, and the resultant mixture was fired in an air atmosphere at 900° C. for 5 hours to produce a lithium cobalt composite oxide ($LiCoO_2$). Subsequently, 91 parts by mass of the lithium cobalt composite oxide that served as a positive electrode active material, 6 parts by mass of graphite that served as a conductive agent and 3 parts by mass of polyvinylidene fluoride that served as a binder were mixed together to prepare a positive electrode mix, and the positive electrode mix was dispersed in N-methyl-2-pyrrolidone to prepare a paste-like positive electrode mix slurry. Subsequently, the positive electrode mix slurry was uniformly applied onto both surfaces of a strip-like aluminum foil (a positive electrode current collector) having a thickness of 12 μm in such a manner that one end of the aluminum foil was exposed. Subsequently, the dispersion medium in the applied positive electrode mix slurry was dried and then the resultant product was compression-molded using a roll press to produce a positive electrode. Finally, the resultant positive electrode was cut into a shape having a width of 30 mm and a length of 80 mm.

A negative electrode was produced in the following manner. Firstly, 97% by mass of a granular graphite powder having an average particle diameter of 15 μm which served as a negative electrode active material, 1.5% by mass of a product of the modification of a styrene-butadiene copolymer with acrylic acid, 1.5% by mass of carboxy methyl cellulose and a proper amount of water were stirred together to prepare a negative electrode slurry. Subsequently, the negative electrode mix slurry was uniformly applied onto both surfaces of a strip-shaped copper foil (negative electrode current collector) having a thickness of 15 μm so that one end of the copper foil was exposed. Subsequently, the dispersion medium in the applied positive electrode mix slurry was dried, and the resultant product was compression-molded using a roll press to produce a negative electrode. Finally, the resultant negative electrode was cut in a size of 30 mm in width and 80 mm in length.

A separator having resin layers (surface layers) respectively arranged on both surfaces of a microporous polyethylene film (a substrate) was produced in the following manner. Firstly, polyvinylidene fluoride (PVdF) having a weight average molecular weight of 1,000,000 as measured by a gel permeation chromatography method was prepared as a polymeric material, and was then dissolved in N-methyl-2-pyrrolidone (NMP) to prepare a solution. Subsequently, the prepared solution was applied onto both surfaces of a microporous polyethylene film having a thickness of 16 μm using a table-top coater. In this instance, the application was performed to form the coating film having a thickness of 1 μm per one surface (2 μm in total on both surfaces). Subsequently, the resultant product was allowed to undergo phase separation in a water bath and was then dried to form resin layers on both surfaces of the polyethylene film.

An electrolytic solution was prepared in the following manner. Firstly, ethylene carbonate (EC) was mixed with ethyl methyl carbonate (EMC) at a ratio of EC:EMC=30:70 by mass to prepare a mixed solvent. Subsequently, lithium hexafluorophosphate ($LiPF_6$) that served as an electrolyte salt was dissolved at a concentration of 1.2 mol/kg in the mixed solvent to prepare an electrolytic solution (also referred to as a "base electrolytic solution", hereinafter). Subsequently, a first compound (1-1) and a second compound (2-1) were added as additives to the base electrolytic solution to prepare an additive-containing electrolytic solution (also simply referred to as an "electrolytic solution", hereinafter). The first compound (1-1) was added to the base electrolytic solution in such a manner the content of the first compound (1-1) in the electrolytic solution was 0.01% by mass. The second compound (2-1) was added to the base electrolytic solution in such a manner that the content of the second compound (2-1) in the electrolytic solution was 1% by mass.

In this regard, the term "content of the first compound in the electrolytic solution" refers to a percent by mass of the first compound relative to the whole mass of the electrolytic solution (i.e., the sum total of the masses of the base electrolytic solution, the first compound and the second compound). The term "content of the second compound in the electrolytic solution" refers to a percent by mass of the second compound relative to the whole mass of the electrolytic solution (i.e., the sum total of the masses of the base electrolytic solution, the first compound and the second compound).

A stacked electrode body was produced in the following manner. Firstly, a polypropylene-made microporous film having a thickness of 25 μm was cut into a rectangular piece, and the piece was used as a separator. Subsequently, 9 negative electrodes, 8 positive electrodes and 16 separators which were produced in the above-mentioned manner were laminated in the following order: a negative electrode, a separator, a positive electrode, . . . , a positive electrode, a separator, a negative electrode. In this manner, a stacked electrode body was produced, in which 16 basic laminate units each composed of a positive electrode active material layer, a separator and a negative electrode active material layer were enclosed. Each of the upper outermost layer and the lower outermost layer in the electrode body served as a negative electrode active material layer. However, this part did not face a positive electrode, and therefore did not contribute to a battery reaction. In the lamination operation, the relative positional relationship between the negative electrode and the positive electrode was controlled so that the projection plane of the positive electrode active material layer was able to fit inside of the projection plane of the negative electrode active material layer as observed in the lamination direction.

Subsequently, 8 positive electrode current collector exposed parts were ultrasonic-welded to an aluminum-made positive electrode lead simultaneously. In the same manner, 9 negative electrode current collector exposed parts were ultrasonic-welded to a nickel-made negative electrode lead simultaneously. Subsequently, the electrode body was impregnated with the prepared electrolytic solution, and then an opening was thermal-fusion-bonded under a reduced pressure using an exterior material made from an aluminum laminate film composed of a resin layer, an aluminum layer and a resin layer to seal the electrode body. In this instance, the positive and negative electrode leads were arranged outside of the exterior member through the thermal-fusion-bonded part, and the outside parts were employed as positive and negative electrode terminals. In this manner, a desired laminate-film-type battery was produced. The laminate-film-type battery was designed in such a manner that the amount of the positive electrode active material and the amount of the negative electrode active material were controlled so that the open circuit voltage (i.e., the battery voltage) in a completely charged state was 4.45 V as shown in Table 1-1.

The same procedure as in Example 1-1 was carried out, except that the composition of the electrolytic solution was changed as shown in Tables 1-1 to 1-5. In this manner, laminate-film-type batteries were produced.

(2) Examples and Comparative Examples each having following configuration: positive electrode: LCO, negative electrode: silicon+graphite, electrolyte: electrolytic solution, separator: separator having resin layer attached thereto.

Examples 2-1 to 2-172 and Comparative Examples 2-1 to 2-12

As a negative electrode active material, a silicon-containing negative electrode was produced in the following manner. Firstly, as a negative electrode active material, a silicon powder having an average particle diameter of 5 µm was prepared, then 90 parts by mass of the silicon powder, 5 parts by mass of a graphite powder and 5 parts by mass of a polyimide precursor that served as a binder were mixed together, and then N-methyl-2-pyrrolidone was added to the mixture to prepare a negative electrode mix slurry. Subsequently, the negative electrode mix slurry was uniformly applied on both surfaces of a strip-shaped copper foil (a negative electrode current collector) having a thickness of 15 µm and dried, and the resultant product was compression-molded and then heated under a vacuum atmosphere at 400° C. for 12 hours to form a negative electrode active material layer. Except this point, the same procedures as in Examples 1-1 to 1-72 and Comparative Examples 1-1 to 1-12 were carried out to produce laminate-film-type batteries.

(3) Examples and Comparative Examples each having following configuration: positive electrode: LCO, negative electrode: graphite, electrolyte: electrolytic solution, separator: separator having heat-resistant insulating layer attached thereto.

Examples 3-1 to 3-172

As a separator, a separator having a heat-resistant insulating layer attached thereto, in which a heat-resistant insulating layer was formed on both surfaces of a substrate, was produced in the following manner. Firstly, alumina particles that served as ceramic particles (inorganic particles) and polyvinylidene fluoride were dispersed at a ratio of polyvinylidene fluoride:alumina particles=20:80 in N-methyl-2-pyrrolidone to prepare a solution. Subsequently, a microporous polyethylene separator having a thickness of 12 µm was immersed in the solution. Subsequently, N-methyl-2-pyrrolidone was removed from the separator with water and then the resultant product was dried with hot air at 80° C. to form heat-resistant insulating layers having a total thickness of 5 µm on both surfaces of the microporous polyethylene separator, to produce a separator having a heat-resistant insulating layer attached thereto. Except this point, the same procedures as in Examples 1-1 to 1-72 and Comparative Examples 1-1 to 1-12 were carried out to produce laminate-film-type batteries.

(4) Examples and Comparative Examples each having following configuration: positive electrode: LCO, negative electrode: graphite, electrolyte: gel electrolyte, separator: separator having resin layer attached thereto.

Examples 4-1 to 4-25

Gel electrolyte layers that served as electrolytes were respectively formed on both surfaces of a positive electrode and a negative electrode in the following manner. Firstly, ethylene carbonate (EC) and propylene carbonate (PC) were mixed together at a ratio of EC:PC=50:50 by mass to prepare a mixed solvent. Subsequently, lithium hexafluorophosphate ($LiPF_6$) that served as an electrolyte salt was dissolved in the mixed solvent at a concentration of 1 mol/kg to prepare a base electrolytic solution. Subsequently, a first compound and a second compound were added as additives to the base electrolytic solution as shown in Table 4-1 to prepare an electrolytic solution.

Subsequently, polyvinylidene fluoride that was copolymerized with hexafluoropropylene at a ratio of 6.9% by mass, an alumina particle powder having an average particle diameter of 0.3 µm, the prepared electrolytic solution and dimethyl carbonate were mixed, stirred and dissolved together to produce a sol-like electrolyte solution. Subsequently, the resultant sol-like electrolyte solution was uniformly applied onto both surfaces of the positive electrode and the negative electrode. Subsequently, the resultant product was dried to remove dimethyl carbonate, thereby forming a gel electrolyte layer on both surfaces of the positive electrode and the negative electrode.

The same procedures as in Examples 1-1 to 1-25 and Comparative Examples 1-1 to 1-12 were carried out, except that an electrode body was produced in the same manner as mentioned above using a positive electrode and a negative electrode each having a gel electrolyte layer formed on both surfaces thereof. In this manner, laminate-film-type batteries were produced.

(5) Examples and Comparative Examples each having following configuration: positive electrode: NCA, negative electrode: graphite, electrolyte: electrolytic solution, separator: separator having resin layer attached thereto.

Examples 5-1 to 5-25

A positive electrode using a lithium nickel composite oxide having a high nickel content ($LiNi_{0.82}Co_{0.15}Al_{0.03}O_2$) as a positive electrode active material was produced in the following manner. Firstly, 92 parts by mass of a lithium nickel composite oxide ($LiNi_{0.82}Co_{0.15}Al_{0.03}O_2$) that served as a positive electrode active material, 3 parts by mass of Ketjen black that served as a conductive material and 5 parts by mass of polyvinylidene fluoride (PVdF) that served as a binder were mixed together to prepare a positive electrode mix, and the positive electrode mix was dispersed in N-methyl-2-pyrrolidone (NMP) that served as a dispersion medium to prepare a positive electrode mix slurry. The positive electrode mix slurry was applied onto both surfaces of a strip-shaped aluminum foil (a positive electrode current collector) having a thickness of 10 μm in such a manner that one end of the aluminum foil was exposed. Subsequently, the dispersion medium in the applied positive electrode mix slurry was dried to produce a positive electrode. Finally, the resultant product was cut into a size of 30 mm in width and 80 mm in length.

A negative electrode was produced in the following manner. Firstly, 97 parts by mass of mesocarbon microbeads (MCMB)-type graphite that served as a negative electrode active material and 3 parts by mass of polyvinylidene fluoride (PVdF) that served as a binder were mixed together to prepare a negative electrode mix, and then the negative electrode mix was dispersed in N-methyl-2-pyrrolidone (NMP) that served as a dispersion medium to prepare a negative electrode mix slurry. The negative electrode mix slurry was applied onto both surfaces of a strip-shaped copper foil (a negative electrode current collector) having a thickness of 10 μm in such a manner that one end of the copper foil was exposed. Subsequently, the dispersion medium in the applied negative electrode mix slurry was dried to produce a negative electrode. Finally, the negative electrode was cut into a size of 30 cm in width and 80 mm in length.

An electrolytic solution was prepared in the following manner. Firstly, ethylene carbonate (EC), propylene carbonate (PC), ethyl methyl carbonate (EMC) and diethyl carbonate (DEC) were mixed together at a mixing ratio of EC:PC:EMC:DEC=20:10:40:30 by mass to prepare a mixed solvent. Subsequently, lithium hexafluorophosphate ($LiPF_6$) that served as an electrolyte salt was dissolved in the mixed solvent at a concentration of 1.2 mol/kg to prepare a base electrolytic solution. Subsequently, a first compound and a second compound were added as additives to the base electrolytic solution as shown in Table 5-1. In this manner, electrolytic solutions were prepared.

The same procedures as in Examples 1-1 to 1-25 and Comparative Examples 1-1 to 1-1 to 1-12 except the above-mentioned step were carried out. In this manner, laminate-film-type batteries were produced.

The cycle properties of each of the above-produced laminate-film-type batteries were evaluated in the following manner. Firstly, 3 cycles of charging/discharging were carried out at 50° C. Subsequently, the battery was charged at 20° C. and a constant current density of 1 mA/cm² until the battery voltage reached a predetermined voltage, and was then subjected to such a 4th charging/discharging procedure that the battery was further charged at a predetermined constant voltage until the current density reached 0.02 mA/cm² and was then discharged at 50° C. Subsequently, 300 cycles of charging/discharging procedures were carried out under the same charging/discharging conditions as those employed in the 4th cycle, and the discharge capacity retention rate (%) in the 304th cycle was determined, provided that the discharge capacity in the 4th cycle was defined as 100.

(1) Examples and Comparative Examples each having following configuration: positive electrode: LCO, negative electrode: graphite, electrolyte: electrolytic solution, separator: separator having resin layer attached thereto.

Tables 1-1 to 1-5 show the compositions of electrolytic solutions and the results of evaluation of the laminate-film-type batteries of Examples 1-1 to 1-172 and Comparative Examples 1-1 to 1-12.

TABLE 1-1

| | Charging voltage (V) | First compound Type | First compound Content (mass %) | Second compound Type | Second compound Content (mass %) | Discharge capacity retention rate (%) |
|---|---|---|---|---|---|---|
| Example 1-1 | 4.45 | (1-1) | 0.01 | (2-1) | 0.1 | 46 |
| Example 1-2 | | | | | 1 | 49 |
| Example 1-3 | | | | | 3 | 51 |
| Example 1-4 | | | | | 5 | 49 |
| Example 1-5 | | | | | 10 | 44 |
| Example 1-6 | | (1-1) | 0.1 | (2-1) | 0.1 | 48 |
| Example 1-7 | | | | | 1 | 50 |
| Example 1-8 | | | | | 3 | 53 |
| Example 1-9 | | | | | 5 | 51 |
| Example 1-10 | | | | | 10 | 46 |
| Example 1-11 | | (1-1) | 1 | (2-1) | 0.1 | 48 |
| Example 1-12 | | | | | 1 | 51 |
| Example 1-13 | | | | | 3 | 54 |
| Example 1-14 | | | | | 5 | 53 |
| Example 1-15 | | | | | 10 | 47 |
| Example 1-16 | | (1-1) | 3 | (2-1) | 0.1 | 47 |
| Example 1-17 | | | | | 1 | 50 |
| Example 1-18 | | | | | 3 | 53 |
| Example 1-19 | | | | | 5 | 51 |
| Example 1-20 | | | | | 10 | 45 |
| Example 1-21 | | (1-1) | 5 | (2-1) | 0.1 | 45 |
| Example 1-22 | | | | | 1 | 48 |
| Example 1-23 | | | | | 3 | 50 |

TABLE 1-1-continued

|  | Charging voltage (V) | First compound Type | First compound Content (mass %) | Second compound Type | Second compound Content (mass %) | Discharge capacity retention rate (%) |
|---|---|---|---|---|---|---|
| Example 1-24 |  |  |  |  | 5 | 48 |
| Example 1-25 |  |  |  |  | 10 | 43 |
| Example 1-26 |  | (1-1) | 0.1 | (2-2) | 3 | 54 |
| Example 1-27 |  |  | 1 |  | 3 | 56 |
| Example 1-28 |  |  | 3 |  | 3 | 55 |
| Example 1-29 |  | (1-1) | 0.1 | (2-3) | 3 | 55 |
| Example 1-30 |  |  | 1 |  | 3 | 60 |
| Example 1-31 |  |  | 3 |  | 3 | 57 |
| Example 1-32 |  | (1-1) | 0.1 | (2-4) | 3 | 54 |
| Example 1-33 |  |  | 1 |  | 3 | 58 |
| Example 1-34 |  |  | 3 |  | 3 | 55 |
| Example 1-35 |  | (1-1) | 0.1 | (2-5) | 3 | 47 |
| Example 1-36 |  |  | 1 |  | 3 | 51 |
| Example 1-37 |  |  | 3 |  | 3 | 48 |
| Example 1-38 |  | (1-1) | 0.1 | (2-6) | 3 | 51 |
| Example 1-39 |  |  | 1 |  | 3 | 54 |
| Example 1-40 |  |  | 3 |  | 3 | 52 |
| Example 1-41 |  | (1-1) | 0.1 | (2-7) | 3 | 45 |
| Example 1-42 |  |  | 1 |  | 3 | 50 |
| Example 1-43 |  |  | 3 |  | 3 | 46 |

TABLE 1-2

|  | Charging voltage (V) | First compound Type | First compound Content (mass %) | Second compound Type | Second compound Content (mass %) | Discharge capacity retention rate (%) |
|---|---|---|---|---|---|---|
| Example 1-44 | 4.45 | (1-2) | 0.01 | (2-1) | 0.1 | 48 |
| Example 1-45 |  |  |  |  | 1 | 51 |
| Example 1-46 |  |  |  |  | 3 | 53 |
| Example 1-47 |  |  |  |  | 5 | 51 |
| Example 1-48 |  |  |  |  | 10 | 47 |
| Example 1-49 |  | (1-2) | 0.1 | (2-1) | 0.1 | 49 |
| Example 1-50 |  |  |  |  | 1 | 52 |
| Example 1-51 |  |  |  |  | 3 | 55 |
| Example 1-52 |  |  |  |  | 5 | 53 |
| Example 1-53 |  |  |  |  | 10 | 48 |
| Example 1-54 |  | (1-2) | 1 | (2-1) | 0.1 | 50 |
| Example 1-55 |  |  |  |  | 1 | 54 |
| Example 1-56 |  |  |  |  | 3 | 57 |
| Example 1-57 |  |  |  |  | 5 | 55 |
| Example 1-58 |  |  |  |  | 10 | 49 |
| Example 1-59 |  | (1-2) | 3 | (2-1) | 0.1 | 49 |
| Example 1-60 |  |  |  |  | 1 | 51 |
| Example 1-61 |  |  |  |  | 3 | 55 |
| Example 1-62 |  |  |  |  | 5 | 53 |
| Example 1-63 |  |  |  |  | 10 | 48 |
| Example 1-64 |  | (1-2) | 5 | (2-1) | 0.1 | 47 |
| Example 1-65 |  |  |  |  | 1 | 50 |
| Example 1-66 |  |  |  |  | 3 | 52 |
| Example 1-67 |  |  |  |  | 5 | 50 |
| Example 1-68 |  |  |  |  | 10 | 45 |
| Example 1-69 |  | (1-2) | 0.1 | (2-2) | 3 | 56 |
| Example 1-70 |  |  | 1 |  | 3 | 59 |
| Example 1-71 |  |  | 3 |  | 3 | 57 |
| Example 1-72 |  | (1-2) | 0.1 | (2-3) | 3 | 57 |
| Example 1-73 |  |  | 1 |  | 3 | 61 |
| Example 1-74 |  |  | 3 |  | 3 | 59 |
| Example 1-75 |  | (1-2) | 0.1 | (2-4) | 3 | 57 |
| Example 1-76 |  |  | 1 |  | 3 | 60 |
| Example 1-77 |  |  | 3 |  | 3 | 57 |
| Example 1-78 |  | (1-2) | 0.1 | (2-5) | 3 | 50 |
| Example 1-79 |  |  | 1 |  | 3 | 55 |
| Example 1-80 |  |  | 3 |  | 3 | 51 |
| Example 1-81 |  | (1-2) | 0.1 | (2-6) | 3 | 54 |
| Example 1-82 |  |  | 1 |  | 3 | 57 |
| Example 1-83 |  |  | 3 |  | 3 | 55 |
| Example 1-84 |  | (1-2) | 0.1 | (2-7) | 3 | 49 |
| Example 1-85 |  |  | 1 |  | 3 | 53 |
| Example 1-86 |  |  | 3 |  | 3 | 50 |

TABLE 1-3

| | Charging voltage (V) | First compound Type | First compound Content (mass %) | Second compound Type | Second compound Content (mass %) | Discharge capacity retention rate (%) |
|---|---|---|---|---|---|---|
| Example 1-87 | 4.45 | (1-3) | 0.01 | (2-1) | 0.1 | 52 |
| Example 1-88 | | | | | 1 | 55 |
| Example 1-89 | | | | | 3 | 58 |
| Example 1-90 | | | | | 5 | 55 |
| Example 1-91 | | | | | 10 | 50 |
| Example 1-92 | | (1-3) | 0.1 | (2-1) | 0.1 | 53 |
| Example 1-93 | | | | | 1 | 57 |
| Example 1-94 | | | | | 3 | 59 |
| Example 1-95 | | | | | 5 | 57 |
| Example 1-96 | | | | | 10 | 52 |
| Example 1-97 | | (1-3) | 1 | (2-1) | 0.1 | 54 |
| Example 1-98 | | | | | 1 | 60 |
| Example 1-99 | | | | | 3 | 62 |
| Example 1-100 | | | | | 5 | 60 |
| Example 1-101 | | | | | 10 | 53 |
| Example 1-102 | | (1-3) | 3 | (2-1) | 0.1 | 53 |
| Example 1-103 | | | | | 1 | 56 |
| Example 1-104 | | | | | 3 | 59 |
| Example 1-105 | | | | | 5 | 57 |
| Example 1-106 | | | | | 10 | 51 |
| Example 1-107 | | (1-3) | 5 | (2-1) | 0.1 | 51 |
| Example 1-108 | | | | | 1 | 53 |
| Example 1-109 | | | | | 3 | 56 |
| Example 1-110 | | | | | 5 | 54 |
| Example 1-111 | | | | | 10 | 48 |
| Example 1-112 | | (1-3) | 0.1 | (2-2) | 3 | 60 |
| Example 1-113 | | | 1 | | 3 | 63 |
| Example 1-114 | | | 3 | | 3 | 61 |
| Example 1-115 | | (1-3) | 0.1 | (2-3) | 3 | 62 |
| Example 1-116 | | | 1 | | 3 | 66 |
| Example 1-117 | | | 3 | | 3 | 64 |
| Example 1-118 | | (1-3) | 0.1 | (2-4) | 3 | 61 |
| Example 1-119 | | | 1 | | 3 | 65 |
| Example 1-120 | | | 3 | | 3 | 61 |
| Example 1-121 | | (1-3) | 0.1 | (2-5) | 3 | 55 |
| Example 1-122 | | | 1 | | 3 | 59 |
| Example 1-123 | | | 3 | | 3 | 55 |
| Example 1-124 | | (1-3) | 0.1 | (2-6) | 3 | 57 |
| Example 1-125 | | | 1 | | 3 | 62 |
| Example 1-126 | | | 3 | | 3 | 59 |
| Example 1-127 | | (1-3) | 0.1 | (2-7) | 3 | 53 |
| Example 1-128 | | | 1 | | 3 | 57 |
| Example 1-129 | | | 3 | | 3 | 54 |

TABLE 1-4

| | Charging voltage (V) | First compound Type | First compound Content (mass %) | Second compound Type | Second compound Content (mass %) | Discharge capacity retention rate (%) |
|---|---|---|---|---|---|---|
| Example 1-130 | 4.45 | (1-4) | 0.01 | (2-1) | 0.1 | 49 |
| Example 1-131 | | | | | 1 | 52 |
| Example 1-132 | | | | | 3 | 54 |
| Example 1-133 | | | | | 5 | 53 |
| Example 1-134 | | | | | 10 | 47 |
| Example 1-135 | | (1-4) | 0.1 | (2-1) | 0.1 | 51 |
| Example 1-136 | | | | | 1 | 55 |
| Example 1-137 | | | | | 3 | 57 |
| Example 1-138 | | | | | 5 | 54 |
| Example 1-139 | | | | | 10 | 48 |
| Example 1-140 | | (1-4) | 1 | (2-1) | 0.1 | 52 |
| Example 1-141 | | | | | 1 | 56 |
| Example 1-142 | | | | | 3 | 58 |
| Example 1-143 | | | | | 5 | 56 |
| Example 1-144 | | | | | 10 | 50 |
| Example 1-145 | | (1-4) | 3 | (2-1) | 0.1 | 50 |
| Example 1-146 | | | | | 1 | 53 |
| Example 1-147 | | | | | 3 | 57 |
| Example 1-148 | | | | | 5 | 54 |
| Example 1-149 | | | | | 10 | 48 |

TABLE 1-4-continued

|  | Charging voltage (V) | First compound Type | First compound Content (mass %) | Second compound Type | Second compound Content (mass %) | Discharge capacity retention rate (%) |
|---|---|---|---|---|---|---|
| Example 1-150 |  | (1-4) | 5 | (2-1) | 0.1 | 48 |
| Example 1-151 |  |  |  |  | 1 | 51 |
| Example 1-152 |  |  |  |  | 3 | 53 |
| Example 1-153 |  |  |  |  | 5 | 52 |
| Example 1-154 |  |  |  |  | 10 | 46 |
| Example 1-155 |  | (1-4) | 0.1 | (2-2) | 3 | 58 |
| Example 1-156 |  |  | 1 |  | 3 | 61 |
| Example 1-157 |  |  | 3 |  | 3 | 59 |
| Example 1-158 |  | (1-4) | 0.1 | (2-3) | 3 | 59 |
| Example 1-159 |  |  | 1 |  | 3 | 64 |
| Example 1-160 |  |  | 3 |  | 3 | 59 |
| Example 1-161 |  | (1-4) | 0.1 | (2-4) | 3 | 58 |
| Example 1-162 |  |  | 1 |  | 3 | 62 |
| Example 1-163 |  |  | 3 |  | 3 | 58 |
| Example 1-164 |  | (1-4) | 0.1 | (2-5) | 3 | 51 |
| Example 1-165 |  |  | 1 |  | 3 | 57 |
| Example 1-166 |  |  | 3 |  | 3 | 52 |
| Example 1-167 |  | (1-4) | 0.1 | (2-6) | 3 | 55 |
| Example 1-168 |  |  | 1 |  | 3 | 59 |
| Example 1-169 |  |  | 3 |  | 3 | 56 |
| Example 1-170 |  | (1-4) | 0.1 | (2-7) | 3 | 50 |
| Example 1-171 |  |  | 1 |  | 3 | 55 |
| Example 1-172 |  |  | 3 |  | 3 | 50 |

TABLE 1-5

|  | Charging voltage (V) | First compound Type | First compound Content (mass %) | Second compound Type | Second compound Content (mass %) | Discharge capacity retention rate (%) |
|---|---|---|---|---|---|---|
| Comparative Example 1-1 | 4.45 | None | — | None | — | 42 |
| Comparative Example 1-2 |  | (1-1) | 1 | None | — | 37 |
| Comparative Example 1-3 |  | (1-2) | 1 | None | — | 39 |
| Comparative Example 1-4 |  | (1-3) | 1 | None | — | 41 |
| Comparative Example 1-5 |  | (1-4) | 1 | None | — | 40 |
| Comparative Example 1-6 |  | None | — | (2-1) | 3 | 36 |
| Comparative Example 1-7 |  | None | — | (2-2) | 3 | 40 |
| Comparative Example 1-8 |  | None | — | (2-3) | 3 | 42 |
| Comparative Example 1-9 |  | None | — | (2-4) | 3 | 41 |
| Comparative Example 1-10 |  | None | — | (2-5) | 3 | 35 |
| Comparative Example 1-11 |  | None | — | (2-6) | 3 | 40 |
| Comparative Example 1-12 |  | None | — | (2-7) | 3 | 34 |

(2) Examples and Comparative Examples each having following configuration: positive electrode: LCO, negative electrode: silicon+graphite, electrolyte: electrolytic solution, separator: separator having resin layer attached thereto.

Tables 2-1 to 2-5 show the compositions of electrolytic solutions and the results of evaluation of the laminate-film-type batteries of Examples 2-1 to 2-172 and Comparative Examples 2-1 to 2-12.

TABLE 2-1

|  | Charging voltage (V) | First compound Type | First compound Content (mass %) | Second compound Type | Second compound Content (mass %) | Discharge capacity retention rate (%) |
|---|---|---|---|---|---|---|
| Example 2-1 | 4.45 | (1-1) | 0.01 | (2-1) | 0.1 | 40 |
| Example 2-2 |  |  |  |  | 1 | 46 |

TABLE 2-1-continued

|  | Charging voltage (V) | First compound Type | First compound Content (mass %) | Second compound Type | Second compound Content (mass %) | Discharge capacity retention rate (%) |
|---|---|---|---|---|---|---|
| Example 2-3 |  |  |  |  | 3 | 50 |
| Example 2-4 |  |  |  |  | 5 | 47 |
| Example 2-5 |  |  |  |  | 10 | 39 |
| Example 2-6 |  | (1-1) | 0.1 | (2-1) | 0.1 | 41 |
| Example 2-7 |  |  |  |  | 1 | 48 |
| Example 2-8 |  |  |  |  | 3 | 51 |
| Example 2-9 |  |  |  |  | 5 | 49 |
| Example 2-10 |  |  |  |  | 10 | 40 |
| Example 2-11 |  | (1-1) | 1 | (2-1) | 0.1 | 41 |
| Example 2-12 |  |  |  |  | 1 | 48 |
| Example 2-13 |  |  |  |  | 3 | 52 |
| Example 2-14 |  |  |  |  | 5 | 50 |
| Example 2-15 |  |  |  |  | 10 | 41 |
| Example 2-16 |  | (1-1) | 3 | (2-1) | 0.1 | 41 |
| Example 2-17 |  |  |  |  | 1 | 48 |
| Example 2-18 |  |  |  |  | 3 | 51 |
| Example 2-19 |  |  |  |  | 5 | 49 |
| Example 2-20 |  |  |  |  | 10 | 41 |
| Example 2-21 |  | (1-1) | 5 | (2-1) | 0.1 | 38 |
| Example 2-22 |  |  |  |  | 1 | 44 |
| Example 2-23 |  |  |  |  | 3 | 46 |
| Example 2-24 |  |  |  |  | 5 | 44 |
| Example 2-25 |  |  |  |  | 10 | 35 |
| Example 2-26 |  | (1-1) | 0.1 | (2-2) | 3 | 51 |
| Example 2-27 |  |  | 1 |  | 3 | 53 |
| Example 2-28 |  |  | 3 |  | 3 | 52 |
| Example 2-29 |  | (1-1) | 0.1 | (2-3) | 3 | 52 |
| Example 2-30 |  |  | 1 |  | 3 | 55 |
| Example 2-31 |  |  | 3 |  | 3 | 53 |
| Example 2-32 |  | (1-1) | 0.1 | (2-4) | 3 | 51 |
| Example 2-33 |  |  | 1 |  | 3 | 54 |
| Example 2-34 |  |  | 3 |  | 3 | 52 |
| Example 2-35 |  | (1-1) | 0.1 | (2-5) | 3 | 46 |
| Example 2-36 |  |  | 1 |  | 3 | 49 |
| Example 2-37 |  |  | 3 |  | 3 | 47 |
| Example 2-38 |  |  | 0.1 |  | 3 | 48 |
| Example 2-39 |  | (1-1) | 1 | (2-6) | 3 | 52 |
| Example 2-40 |  |  | 3 |  | 3 | 50 |
| Example 2-41 |  | (1-1) | 0.1 | (2-7) | 3 | 43 |
| Example 2-42 |  |  | 1 |  | 3 | 47 |
| Example 2-43 |  |  | 3 |  | 3 | 44 |

TABLE 2-2

|  | Charging voltage (V) | First compound Type | First compound Content (mass %) | Second compound Type | Second compound Content (mass %) | Discharge capacity retention rate (%) |
|---|---|---|---|---|---|---|
| Example 2-44 | 4.45 | (1-2) | 0.01 | (2-1) | 0.1 | 42 |
| Example 2-45 |  |  |  |  | 1 | 47 |
| Example 2-46 |  |  |  |  | 3 | 51 |
| Example 2-47 |  |  |  |  | 5 | 47 |
| Example 2-48 |  |  |  |  | 10 | 41 |
| Example 2-49 |  | (1-2) | 0.1 | (2-1) | 0.1 | 43 |
| Example 2-50 |  |  |  |  | 1 | 50 |
| Example 2-51 |  |  |  |  | 3 | 52 |
| Example 2-52 |  |  |  |  | 5 | 50 |
| Example 2-53 |  |  |  |  | 10 | 41 |
| Example 2-54 |  | (1-2) | 1 | (2-1) | 0.1 | 43 |
| Example 2-55 |  |  |  |  | 1 | 51 |
| Example 2-56 |  |  |  |  | 3 | 54 |
| Example 2-57 |  |  |  |  | 5 | 50 |
| Example 2-58 |  |  |  |  | 10 | 42 |
| Example 2-59 |  | (1-2) | 3 | (2-1) | 0.1 | 43 |
| Example 2-60 |  |  |  |  | 1 | 50 |
| Example 2-61 |  |  |  |  | 3 | 53 |
| Example 2-62 |  |  |  |  | 5 | 51 |
| Example 2-63 |  |  |  |  | 10 | 41 |
| Example 2-64 |  | (1-2) | 5 | (2-1) | 0.1 | 41 |
| Example 2-65 |  |  |  |  | 1 | 46 |

TABLE 2-2-continued

|  | Charging voltage (V) | First compound Type | First compound Content (mass %) | Second compound Type | Second compound Content (mass %) | Discharge capacity retention rate (%) |
|---|---|---|---|---|---|---|
| Example 2-66 |  |  |  |  | 3 | 49 |
| Example 2-67 |  |  |  |  | 5 | 46 |
| Example 2-68 |  |  |  |  | 10 | 39 |
| Example 2-69 |  | (1-2) | 0.1 | (2-2) | 3 | 53 |
| Example 2-70 |  |  | 1 |  | 3 | 55 |
| Example 2-71 |  |  | 3 |  | 3 | 53 |
| Example 2-72 |  | (1-2) | 0.1 | (2-3) | 3 | 54 |
| Example 2-73 |  |  | 1 |  | 3 | 57 |
| Example 2-74 |  |  | 3 |  | 3 | 55 |
| Example 2-75 |  | (1-2) | 0.1 | (2-4) | 3 | 52 |
| Example 2-76 |  |  | 1 |  | 3 | 54 |
| Example 2-77 |  |  | 3 |  | 3 | 51 |
| Example 2-78 |  | (1-2) | 0.1 | (2-5) | 3 | 47 |
| Example 2-79 |  |  | 1 |  | 3 | 50 |
| Example 2-80 |  |  | 3 |  | 3 | 47 |
| Example 2-81 |  | (1-2) | 0.1 | (2-6) | 3 | 50 |
| Example 2-82 |  |  | 1 |  | 3 | 53 |
| Example 2-83 |  |  | 3 |  | 3 | 49 |
| Example 2-84 |  | (1-2) | 0.1 | (2-7) | 3 | 46 |
| Example 2-85 |  |  | 1 |  | 3 | 49 |
| Example 2-86 |  |  | 3 |  | 3 | 45 |

TABLE 2-3

|  | Charging voltage (V) | First compound Type | First compound Content (mass %) | Second compound Type | Second compound Content (mass %) | Discharge capacity retention rate (%) |
|---|---|---|---|---|---|---|
| Example 2-87 | 4.45 | (1-3) | 0.01 | (2-1) | 0.1 | 46 |
| Example 2-88 |  |  |  |  | 1 | 50 |
| Example 2-89 |  |  |  |  | 3 | 55 |
| Example 2-90 |  |  |  |  | 5 | 50 |
| Example 2-91 |  |  |  |  | 10 | 45 |
| Example 2-92 |  | (1-3) | 0.1 | (2-1) | 0.1 | 49 |
| Example 2-93 |  |  |  |  | 1 | 52 |
| Example 2-94 |  |  |  |  | 3 | 56 |
| Example 2-95 |  |  |  |  | 5 | 53 |
| Example 2-96 |  |  |  |  | 10 | 47 |
| Example 2-97 |  | (1-3) | 1 | (2-1) | 0.1 | 47 |
| Example 2-98 |  |  |  |  | 1 | 54 |
| Example 2-99 |  |  |  |  | 3 | 57 |
| Example 2-100 |  |  |  |  | 5 | 53 |
| Example 2-101 |  |  |  |  | 10 | 46 |
| Example 2-102 |  | (1-3) | 3 | (2-1) | 0.1 | 46 |
| Example 2-103 |  |  |  |  | 1 | 54 |
| Example 2-104 |  |  |  |  | 3 | 57 |
| Example 2-105 |  |  |  |  | 5 | 53 |
| Example 2-106 |  |  |  |  | 10 | 46 |
| Example 2-107 |  | (1-3) | 5 | (2-1) | 0.1 | 43 |
| Example 2-108 |  |  |  |  | 1 | 48 |
| Example 2-109 |  |  |  |  | 3 | 51 |
| Example 2-110 |  |  |  |  | 5 | 47 |
| Example 2-111 |  |  |  |  | 10 | 41 |
| Example 2-112 |  | (1-3) | 0.1 | (2-2) | 3 | 56 |
| Example 2-113 |  |  | 1 |  | 3 | 57 |
| Example 2-114 |  |  | 3 |  | 3 | 57 |
| Example 2-115 |  | (1-3) | 0.1 | (2-3) | 3 | 57 |
| Example 2-116 |  |  | 1 |  | 3 | 59 |
| Example 2-117 |  |  | 3 |  | 3 | 56 |
| Example 2-118 |  | (1-3) | 0.1 | (2-4) | 3 | 55 |
| Example 2-119 |  |  | 1 |  | 3 | 57 |
| Example 2-120 |  |  | 3 |  | 3 | 54 |
| Example 2-121 |  | (1-3) | 0.1 | (2-5) | 3 | 49 |
| Example 2-122 |  |  | 1 |  | 3 | 52 |
| Example 2-123 |  |  | 3 |  | 3 | 48 |
| Example 2-124 |  | (1-3) | 0.1 | (2-6) | 3 | 52 |
| Example 2-125 |  |  | 1 |  | 3 | 56 |
| Example 2-126 |  |  | 3 |  | 3 | 51 |

TABLE 2-3-continued

|  | Charging voltage (V) | First compound Type | First compound Content (mass %) | Second compound Type | Second compound Content (mass %) | Discharge capacity retention rate (%) |
|---|---|---|---|---|---|---|
| Example 2-127 |  | (1-3) | 0.1 | (2-7) | 3 | 47 |
| Example 2-128 |  |  | 1 |  | 3 | 50 |
| Example 2-129 |  |  | 3 |  | 3 | 48 |

TABLE 2-4

|  | Charging voltage (V) | First compound Type | First compound Content (mass %) | Second compound Type | Second compound Content (mass %) | Discharge capacity retention rate (%) |
|---|---|---|---|---|---|---|
| Example 2-130 | 4.45 | (1-4) | 0.01 | (2-1) | 0.1 | 44 |
| Example 2-131 |  |  |  |  | 1 | 48 |
| Example 2-132 |  |  |  |  | 3 | 53 |
| Example 2-133 |  |  |  |  | 5 | 49 |
| Example 2-134 |  |  |  |  | 10 | 43 |
| Example 2-135 |  | (1-4) | 0.1 | (2-1) | 0.1 | 45 |
| Example 2-136 |  |  |  |  | 1 | 51 |
| Example 2-137 |  |  |  |  | 3 | 54 |
| Example 2-138 |  |  |  |  | 5 | 52 |
| Example 2-139 |  |  |  |  | 10 | 44 |
| Example 2-140 |  | (1-4) | 1 | (2-1) | 0.1 | 45 |
| Example 2-141 |  |  |  |  | 1 | 52 |
| Example 2-142 |  |  |  |  | 3 | 55 |
| Example 2-143 |  |  |  |  | 5 | 53 |
| Example 2-144 |  |  |  |  | 10 | 44 |
| Example 2-145 |  | (1-4) | 3 | (2-1) | 0.1 | 44 |
| Example 2-146 |  |  |  |  | 1 | 52 |
| Example 2-147 |  |  |  |  | 3 | 54 |
| Example 2-148 |  |  |  |  | 6 | 51 |
| Example 2-149 |  |  |  |  | 10 | 44 |
| Example 2-150 |  | (1-4) | 5 | (2-1) | 0.1 | 42 |
| Example 2-151 |  |  |  |  | 1 | 47 |
| Example 2-152 |  |  |  |  | 3 | 50 |
| Example 2-153 |  |  |  |  | 5 | 46 |
| Example 2-154 |  |  |  |  | 10 | 40 |
| Example 2-155 |  | (1-4) | 0.1 | (2-2) | 3 | 54 |
| Example 2-156 |  |  | 1 |  | 3 | 56 |
| Example 2-157 |  |  | 3 |  | 3 | 54 |
| Example 2-158 |  | (1-4) | 0.1 | (2-3) | 3 | 55 |
| Example 2-159 |  |  | 1 |  | 3 | 57 |
| Example 2-160 |  |  | 3 |  | 3 | 55 |
| Example 2-161 |  | (1-4) | 0.1 | (2-4) | 3 | 53 |
| Example 2-162 |  |  | 1 |  | 3 | 55 |
| Example 2-163 |  |  | 3 |  | 3 | 53 |
| Example 2-164 |  | (1-4) | 0.1 | (2-5) | 3 | 48 |
| Example 2-165 |  |  | 1 |  | 3 | 51 |
| Example 2-166 |  |  | 3 |  | 3 | 48 |
| Example 2-167 |  | (1-4) | 0.1 | (2-6) | 3 | 51 |
| Example 2-168 |  |  | 1 |  | 3 | 54 |
| Example 2-169 |  |  | 3 |  | 3 | 51 |
| Example 2-170 |  | (1-4) | 0.1 | (2-7) | 3 | 47 |
| Example 2-171 |  |  | 1 |  | 3 | 49 |
| Example 2-172 |  |  | 3 |  | 3 | 47 |

TABLE 2-5

|  | Charging voltage (V) | First compound Type | First compound Content (mass %) | Second compound Type | Second compound Content (mass %) | Discharge capacity retention rate (%) |
|---|---|---|---|---|---|---|
| Comparative Example 2-1 | 4.45 | None | — | None | — | 15 |
| Comparative Example 2-2 |  | (1-1) | 1 | None | — | 10 |

TABLE 2-5-continued

|  | Charging voltage (V) | First compound Type | First compound Content (mass %) | Second compound Type | Second compound Content (mass %) | Discharge capacity retention rate (%) |
|---|---|---|---|---|---|---|
| Comparative Example 2-3 |  | (1-2) | 1 | None | — | 13 |
| Comparative Example 2-4 |  | (1-3) | 1 | None | — | 15 |
| Comparative Example 2-5 |  | (1-4) | 1 | None | — | 14 |
| Comparative Example 2-6 |  | None | — | (2-1) | 3 | 10 |
| Comparative Example 2-7 |  | None | — | (2-2) | 3 | 13 |
| Comparative Example 2-8 |  | None | — | (2-3) | 3 | 14 |
| Comparative Example 2-9 |  | None | — | (2-4) | 3 | 14 |
| Comparative Example 2-10 |  | None | — | (2-5) | 3 | 9 |
| Comparative Example 2-11 |  | None | — | (2-6) | 3 | 12 |
| Comparative Example 2-12 |  | None | — | (2-7) | 3 | 9 |

(3) Examples and Comparative Examples each having following configuration: positive electrode: LCO, negative electrode: graphite, electrolyte: electrolytic solution, separator: separator having heat-resistant insulating layer attached thereto.

Tables 3-1 to 3-5 show the compositions of electrolytic solutions and the results of evaluation of the laminate-film-type batteries of Examples 3-1 to 3-172 and Comparative Examples 1-1 to 1-12, 3-1 to 3-12.

TABLE 3-1

|  | Charging voltage (V) | First compound Type | First compound Content (mass %) | Second compound Type | Second compound Content (mass %) | Presence or absence of insulating layer | Discharge capacity retention rate (%) |
|---|---|---|---|---|---|---|---|
| Example 3-1 | 4.45 | (1-1) | 0.01 | (2-1) | 0.1 | present | 48 |
| Example 3-2 |  |  |  |  | 1 |  | 52 |
| Example 3-3 |  |  |  |  | 3 |  | 53 |
| Example 3-4 |  |  |  |  | 5 |  | 51 |
| Example 3-5 |  |  |  |  | 10 |  | 47 |
| Example 3-6 |  | (1-1) | 0.1 | (2-1) | 0.1 | present | 52 |
| Example 3-7 |  |  |  |  | 1 |  | 55 |
| Example 3-8 |  |  |  |  | 3 |  | 57 |
| Example 3-9 |  |  |  |  | 5 |  | 56 |
| Example 3-10 |  |  |  |  | 10 |  | 50 |
| Example 3-11 |  | (1-1) | 1 | (2-1) | 0.1 | present | 53 |
| Example 3-12 |  |  |  |  | 1 |  | 56 |
| Example 3-13 |  |  |  |  | 3 |  | 58 |
| Example 3-14 |  |  |  |  | 5 |  | 56 |
| Example 3-15 |  |  |  |  | 10 |  | 52 |
| Example 3-16 |  | (1-1) | 3 | (2-1) | 0.1 | present | 52 |
| Example 3-17 |  |  |  |  | 1 |  | 55 |
| Example 3-18 |  |  |  |  | 3 |  | 57 |
| Example 3-19 |  |  |  |  | 5 |  | 55 |
| Example 3-20 |  |  |  |  | 10 |  | 51 |
| Example 3-21 |  | (1-1) | 5 | (2-1) | 0.1 | present | 47 |
| Example 3-22 |  |  |  |  | 1 |  | 51 |
| Example 3-23 |  |  |  |  | 3 |  | 52 |
| Example 3-24 |  |  |  |  | 5 |  | 50 |
| Example 3-25 |  |  |  |  | 10 |  | 46 |
| Example 3-26 |  | (1-1) | 0.1 | (2-2) | 3 | present | 58 |
| Example 3-27 |  |  | 1 |  | 3 |  | 60 |
| Example 3-28 |  |  | 3 |  | 3 |  | 58 |
| Example 3-29 |  | (1-1) | 0.1 | (2-3) | 3 | present | 59 |
| Example 3-30 |  |  | 1 |  | 3 |  | 60 |
| Example 3-31 |  |  | 3 |  | 3 |  | 59 |

TABLE 3-1-continued

| | Charging voltage (V) | First compound Type | First compound Content (mass %) | Second compound Type | Second compound Content (mass %) | Presence or absence of insulating layer | Discharge capacity retention rate (%) |
|---|---|---|---|---|---|---|---|
| Example 3-32 | | (1-1) | 0.1 | (2-4) | 3 | present | 58 |
| Example 3-33 | | | 1 | | 3 | | 59 |
| Example 3-34 | | | 3 | | 3 | | 57 |
| Example 3-35 | | (1-1) | 0.1 | (2-5) | 3 | present | 53 |
| Example 3-36 | | | 1 | | 3 | | 55 |
| Example 3-37 | | | 3 | | 3 | | 54 |
| Example 3-38 | | (1-1) | 0.1 | (2-6) | 3 | present | 55 |
| Example 3-39 | | | 1 | | 3 | | 56 |
| Example 3-40 | | | 3 | | 3 | | 55 |
| Example 3-41 | | (1-1) | 0.1 | (2-7) | 3 | present | 50 |
| Example 3-42 | | | 1 | | 3 | | 52 |
| Example 3-43 | | | 3 | | 3 | | 51 |

TABLE 3-2

| | Charging voltage (V) | First compound Type | First compound Content (mass %) | Second compound Type | Second compound Content (mass %) | Presence or absence of insulating layer | Discharge capacity retention rate (%) |
|---|---|---|---|---|---|---|---|
| Example 3-44 | 4.45 | (1-2) | 0.01 | (2-1) | 0.1 | present | 49 |
| Example 3-45 | | | | | 1 | | 53 |
| Example 3-46 | | | | | 3 | | 55 |
| Example 3-47 | | | | | 5 | | 52 |
| Example 3-48 | | | | | 10 | | 48 |
| Example 3-49 | | (1-2) | 0.1 | (2-1) | 0.1 | present | 53 |
| Example 3-50 | | | | | 1 | | 57 |
| Example 3-51 | | | | | 3 | | 59 |
| Example 3-52 | | | | | 5 | | 58 |
| Example 3-53 | | | | | 10 | | 51 |
| Example 3-54 | | (1-2) | 1 | (2-1) | 0.1 | present | 54 |
| Example 3-55 | | | | | 1 | | 58 |
| Example 3-56 | | | | | 3 | | 60 |
| Example 3-57 | | | | | 5 | | 58 |
| Example 3-58 | | | | | 10 | | 52 |
| Example 3-59 | | (1-2) | 3 | (2-1) | 0.1 | present | 53 |
| Example 3-60 | | | | | 1 | | 56 |
| Example 3-61 | | | | | 3 | | 58 |
| Example 3-62 | | | | | 5 | | 57 |
| Example 3-63 | | | | | 10 | | 51 |
| Example 3-64 | | (1-2) | 5 | (2-1) | 0.1 | present | 48 |
| Example 3-65 | | | | | 1 | | 52 |
| Example 3-66 | | | | | 3 | | 53 |
| Example 3-67 | | | | | 5 | | 51 |
| Example 3-68 | | | | | 10 | | 47 |
| Example 3-69 | | (1-2) | 0.1 | (2-2) | 3 | present | 59 |
| Example 3-70 | | | 1 | | 3 | | 61 |
| Example 3-71 | | | 3 | | 3 | | 59 |
| Example 3-72 | | (1-2) | 0.1 | (2-3) | 3 | present | 60 |
| Example 3-73 | | | 1 | | 3 | | 61 |
| Example 3-74 | | | 3 | | 3 | | 59 |
| Example 3-75 | | (1-2) | 0.1 | (2-4) | 3 | present | 59 |
| Example 3-76 | | | 1 | | 3 | | 60 |
| Example 3-77 | | | 3 | | 2 | | 58 |
| Example 3-78 | | (1-2) | 0.1 | (2-5) | 3 | present | 54 |
| Example 3-79 | | | 1 | | 3 | | 56 |
| Example 3-80 | | | 3 | | 3 | | 54 |
| Example 3-81 | | (1-2) | 0.1 | (2-6) | 3 | present | 56 |
| Example 3-82 | | | 1 | | 3 | | 57 |
| Example 3-83 | | | 3 | | 3 | | 56 |
| Example 3-84 | | (1-2) | 0.1 | (2-7) | 3 | present | 51 |
| Example 3-85 | | | 1 | | 3 | | 53 |
| Example 3-86 | | | 3 | | 3 | | 52 |

TABLE 3-3

| | Charging voltage (V) | First compound Type | First compound Content (mass %) | Second compound Type | Second compound Content (mass %) | Presence or absence of insulating layer | Discharge capacity retention rate (%) |
|---|---|---|---|---|---|---|---|
| Example 3-87 | 4.45 | (1-3) | 0.01 | (2-1) | 0.1 | present | 51 |
| Example 3-88 | | | | | 1 | | 55 |
| Example 3-89 | | | | | 3 | | 57 |
| Example 3-90 | | | | | 5 | | 55 |
| Example 3-91 | | | | | 10 | | 49 |
| Example 3-92 | | (1-3) | 0.1 | (2-1) | 0.1 | present | 56 |
| Example 3-93 | | | | | 1 | | 60 |
| Example 3-94 | | | | | 3 | | 62 |
| Example 3-95 | | | | | 5 | | 61 |
| Example 3-96 | | | | | 10 | | 52 |
| Example 3-97 | | (1-3) | 1 | (2-1) | 0.1 | present | 57 |
| Example 3-98 | | | | | 1 | | 61 |
| Example 3-99 | | | | | 3 | | 63 |
| Example 3-100 | | | | | 5 | | 60 |
| Example 3-101 | | | | | 10 | | 53 |
| Example 3-102 | | (1-3) | 3 | (2-1) | 0.1 | present | 56 |
| Example 3-103 | | | | | 1 | | 59 |
| Example 3-104 | | | | | 3 | | 61 |
| Example 3-105 | | | | | 5 | | 59 |
| Example 3-106 | | | | | 10 | | 52 |
| Example 3-107 | | (1-3) | 5 | (2-1) | 0.1 | present | 49 |
| Example 3-108 | | | | | 1 | | 54 |
| Example 3-109 | | | | | 3 | | 55 |
| Example 3-110 | | | | | 5 | | 54 |
| Example 3-111 | | | | | 10 | | 48 |
| Example 3-112 | | (1-3) | 0.1 | (2-2) | 3 | present | 63 |
| Example 3-113 | | | 1 | | 3 | | 64 |
| Example 3-114 | | | 3 | | 3 | | 63 |
| Example 3-115 | | (1-3) | 0.1 | (2-3) | 3 | present | 64 |
| Example 3-116 | | | 1 | | 3 | | 65 |
| Example 3-117 | | | 3 | | 3 | | 63 |
| Example 3-118 | | (1-3) | 0.1 | (2-4) | 3 | present | 62 |
| Example 3-119 | | | 1 | | 3 | | 64 |
| Example 3-120 | | | 3 | | 3 | | 62 |
| Example 3-121 | | (1-3) | 0.1 | (2-5) | 3 | present | 56 |
| Example 3-122 | | | 1 | | 3 | | 58 |
| Example 3-123 | | | 3 | | 3 | | 55 |
| Example 3-124 | | (1-3) | 0.1 | (2-6) | 3 | present | 57 |
| Example 3-125 | | | 1 | | 3 | | 58 |
| Example 3-126 | | | 3 | | 3 | | 57 |
| Example 3-127 | | (1-3) | 0.1 | (2-7) | 3 | present | 54 |
| Example 3-128 | | | 1 | | 3 | | 55 |
| Example 3-129 | | | 3 | | 3 | | 53 |

TABLE 3-4

| | Charging voltage (V) | First compound Type | First compound Content (mass %) | Second compound Type | Second compound Content (mass %) | Presence or absence of insulating layer | Discharge capacity retention rate (%) |
|---|---|---|---|---|---|---|---|
| Example 3-130 | 4.45 | (1-4) | 0.01 | (2-1) | 0.1 | present | 50 |
| Example 3-131 | | | | | 1 | | 54 |
| Example 3-132 | | | | | 3 | | 55 |
| Example 3-133 | | | | | 5 | | 54 |
| Example 3-134 | | | | | 10 | | 49 |
| Example 3-135 | | (1-4) | 0.1 | (2-1) | 0.1 | present | 53 |
| Example 3-136 | | | | | 1 | | 59 |
| Example 3-137 | | | | | 3 | | 61 |
| Example 3-138 | | | | | 5 | | 60 |
| Example 3-139 | | | | | 10 | | 52 |
| Example 3-140 | | (1-4) | 1 | (2-1) | 0.1 | present | 55 |
| Example 3-141 | | | | | 1 | | 60 |
| Example 3-142 | | | | | 3 | | 62 |
| Example 3-143 | | | | | 5 | | 60 |
| Example 3-144 | | | | | 10 | | 53 |
| Example 3-145 | | (1-4) | 3 | (2-1) | 0.1 | present | 54 |
| Example 3-146 | | | | | 1 | | 59 |
| Example 3-147 | | | | | 3 | | 60 |

TABLE 3-4-continued

| | Charging voltage (V) | First compound Type | First compound Content (mass %) | Second compound Type | Second compound Content (mass %) | Presence or absence of insulating layer | Discharge capacity retention rate (%) |
|---|---|---|---|---|---|---|---|
| Example 3-148 | | | | | 5 | | 58 |
| Example 3-149 | | | | | 10 | | 52 |
| Example 3-150 | | (1-4) | 5 | (2-1) | 0.1 | present | 48 |
| Example 3-151 | | | | | 1 | | 52 |
| Example 3-152 | | | | | 3 | | 53 |
| Example 3-153 | | | | | 5 | | 52 |
| Example 3-154 | | | | | 10 | | 47 |
| Example 3-155 | | (1-4) | 0.1 | (2-2) | 3 | present | 62 |
| Example 3-156 | | | 1 | | 3 | | 63 |
| Example 3-157 | | | 3 | | 3 | | 61 |
| Example 3-158 | | (1-4) | 0.1 | (2-3) | 3 | present | 63 |
| Example 3-159 | | | 1 | | 3 | | 64 |
| Example 3-160 | | | 3 | | 3 | | 63 |
| Example 3-161 | | (1-4) | 0.1 | (2-4) | 3 | present | 62 |
| Example 3-162 | | | 1 | | 3 | | 63 |
| Example 3-163 | | | 3 | | 3 | | 61 |
| Example 3-164 | | (1-4) | 0.1 | (2-5) | 3 | present | 55 |
| Example 3-165 | | | 1 | | 3 | | 57 |
| Example 3-166 | | | 3 | | 3 | | 55 |
| Example 3-167 | | (1-4) | 0.1 | (2-6) | 3 | present | 56 |
| Example 3-168 | | | 1 | | 3 | | 57 |
| Example 3-169 | | | 3 | | 3 | | 56 |
| Example 3-170 | | (1-4) | 0.1 | (2-7) | 3 | present | 52 |
| Example 3-171 | | | 1 | | 3 | | 53 |
| Example 3-172 | | | 3 | | 3 | | 51 |

TABLE 3-5

| | Charging voltage (V) | First compound Type | First compound Content (mass %) | Second compound Type | Second compound Content (mass %) | Presence or absence of insulating layer | Discharge capacity retention rate (%) |
|---|---|---|---|---|---|---|---|
| Comparative Example 1-1 | 4.45 | absent | — | absent | — | absent | 42 |
| Comparative Example 1-2 | | (1-1) | 1 | absent | — | absent | 37 |
| Comparative Example 1-3 | | (1-2) | 1 | absent | — | absent | 39 |
| Comparative Example 1-4 | | (1-3) | 1 | absent | — | absent | 41 |
| Comparative Example 1-5 | | (1-4) | 1 | absent | — | absent | 40 |
| Comparative Example 1-6 | | absent | — | (2-1) | 3 | absent | 36 |
| Comparative Example 1-7 | | absent | — | (2-2) | 3 | absent | 40 |
| Comparative Example 1-8 | | absent | — | (2-3) | 3 | absent | 42 |
| Comparative Example 1-9 | | absent | — | (2-4) | 3 | absent | 41 |
| Comparative Example 1-10 | | absent | — | (2-5) | 3 | absent | 35 |
| Comparative Example 1-11 | | absent | — | (2-6) | 3 | absent | 40 |
| Comparative Example 1-12 | | absent | — | (2-7) | 3 | absent | 34 |
| Comparative Example 3-1 | 4.45 | absent | — | absent | — | present | 41 |
| Comparative Example 3-2 | | (1-1) | 1 | absent | — | present | 37 |
| Comparative Example 3-3 | | (1-2) | 1 | absent | — | present | 38 |
| Comparative Example 3-4 | | (1-3) | 1 | absent | — | present | 41 |
| Comparative Example 3-5 | | (1-4) | 1 | absent | — | present | 40 |
| Comparative Example 3-6 | | absent | — | (2-1) | 3 | present | 35 |

TABLE 3-5-continued

|  | Charging voltage (V) | First compound Type | First compound Content (mass %) | Second compound Type | Second compound Content (mass %) | Presence or absence of insulating layer | Discharge capacity retention rate (%) |
|---|---|---|---|---|---|---|---|
| Comparative Example 3-7 |  | absent | — | (2-2) | 3 | present | 39 |
| Comparative Example 3-8 |  | absent | — | (2-3) | 3 | present | 41 |
| Comparative Example 3-9 |  | absent | — | (2-4) | 3 | present | 41 |
| Comparative Example 3-10 |  | absent | — | (2-5) | 3 | present | 34 |
| Comparative Example 3-11 |  | absent | — | (2-6) | 3 | present | 39 |
| Comparative Example 3-12 |  | absent | — | (2-7) | 3 | present | 33 |

(4) Examples and Comparative Examples each having following configuration: positive electrode: LCO, negative electrode: graphite, electrolyte: gel electrolyte, separator: separator having resin layer attached thereto.

Table 4-1 shows the compositions of electrolytic solutions and the results of evaluation of the laminate-film-type batteries of Examples 4-1 to 4-25 and Comparative Examples 4-1 to 4-12.

TABLE 4-1

|  | Charging voltage (V) | First compound Type | First compound Content (mass %) | Second compound Type | Second compound Content (mass %) | Discharge capacity retention rate (%) |
|---|---|---|---|---|---|---|
| Example 4-1 | 4.45 | (1-4) | 0.01 | (2-1) | 0.1 | 46 |
| Example 4-2 |  |  |  |  | 1 | 49 |
| Example 4-3 |  |  |  |  | 3 | 50 |
| Example 4-4 |  |  |  |  | 5 | 49 |
| Example 4-5 |  |  |  |  | 10 | 45 |
| Example 4-6 |  | (1-4) | 0.1 | (2-1) | 0.1 | 49 |
| Example 4-7 |  |  |  |  | 1 | 52 |
| Example 4-8 |  |  |  |  | 3 | 54 |
| Example 4-9 |  |  |  |  | 5 | 52 |
| Example 4-10 |  |  |  |  | 10 | 47 |
| Example 4-11 |  | (1-4) | 1 | (2-1) | 0.1 | 50 |
| Example 4-12 |  |  |  |  | 1 | 54 |
| Example 4-13 |  |  |  |  | 3 | 55 |
| Example 4-14 |  |  |  |  | 5 | 53 |
| Example 4-15 |  |  |  |  | 10 | 48 |
| Example 4-16 |  | (1-4) | 3 | (2-1) | 0.1 | 49 |
| Example 4-17 |  |  |  |  | 1 | 52 |
| Example 4-18 |  |  |  |  | 3 | 53 |
| Example 4-19 |  |  |  |  | 5 | 52 |
| Example 4-20 |  |  |  |  | 10 | 47 |
| Example 4-21 |  | (1-4) | 5 | (2-1) | 0.1 | 44 |
| Example 4-22 |  |  |  |  | 1 | 47 |
| Example 4-23 |  |  |  |  | 3 | 48 |
| Example 4-24 |  |  |  |  | 5 | 47 |
| Example 4-25 |  |  |  |  | 10 | 42 |
| Comparative Example 4-1 | 4.45 | None | — | None | — | 33 |
| Comparative Example 4-2 |  | (1-1) | 1 | None | — | 28 |
| Comparative Example 4-3 |  | (1-2) | 1 | None | — | 30 |
| Comparative Example 4-4 |  | (1-3) | 1 | None | — | 31 |
| Comparative Example 4-5 |  | (1-4) | 1 | None | — | 31 |
| Comparative Example 4-6 |  | None | — | (2-1) | 3 | 26 |
| Comparative Example 4-7 |  | None | — | (2-2) | 3 | 31 |
| Comparative Example 4-8 |  | None | — | (2-3) | 3 | 32 |
| Comparative Example 4-9 |  | None | — | (2-4) | 3 | 31 |
| Comparative Example 4-10 |  | None | — | (2-5) | 3 | 27 |

TABLE 4-1-continued

| | Charging voltage (V) | First compound Type | First compound Content (mass %) | Second compound Type | Second compound Content (mass %) | Discharge capacity retention rate (%) |
|---|---|---|---|---|---|---|
| Comparative Example 4-11 | | None | — | (2-6) | 3 | 30 |
| Comparative Example 4-12 | | None | — | (2-7) | 3 | 25 |

(5) Examples and Comparative Examples each having following configuration: positive electrode: NCA, negative electrode: graphite, electrolyte: electrolytic solution, separator: separator having resin layer attached thereto.

Table 5-1 shows the compositions of electrolytic solutions and the results of evaluation of the laminate-film-type batteries of Examples 5-1 to 5-25 and Comparative Examples 5-1 to 5-12.

TABLE 5-1

| | Charging voltage (V) | First compound Type | First compound Content (mass %) | Second compound Type | Second compound Content (mass %) | Discharge capacity retention rate (%) |
|---|---|---|---|---|---|---|
| Example 5-1 | 4.2 | (1-4) | 0.01 | (2-1) | 0.1 | 78 |
| Example 5-2 | | | | | 1 | 82 |
| Example 5-3 | | | | | 3 | 83 |
| Example 5-4 | | | | | 5 | 82 |
| Example 5-5 | | | | | 10 | 77 |
| Example 5-6 | | (1-4) | 0.1 | (2-1) | 0.1 | 81 |
| Example 5-7 | | | | | 1 | 84 |
| Example 5-8 | | | | | 3 | 85 |
| Example 5-9 | | | | | 5 | 84 |
| Example 5-10 | | | | | 10 | 79 |
| Example 5-11 | | (1-4) | 1 | (2-1) | 0.1 | 82 |
| Example 5-12 | | | | | 1 | 85 |
| Example 5-13 | | | | | 3 | 87 |
| Example 5-14 | | | | | 5 | 85 |
| Example 5-15 | | | | | 10 | 80 |
| Example 5-16 | | (1-4) | 3 | (2-1) | 0.1 | 81 |
| Example 5-17 | | | | | 1 | 83 |
| Example 5-18 | | | | | 3 | 84 |
| Example 5-19 | | | | | 5 | 82 |
| Example 5-20 | | | | | 10 | 78 |
| Example 5-21 | | (1-4) | 5 | (2-1) | 0.1 | 77 |
| Example 5-22 | | | | | 1 | 79 |
| Example 5-23 | | | | | 3 | 80 |
| Example 5-24 | | | | | 5 | 79 |
| Example 5-25 | | | | | 10 | 76 |
| Comparative Example 5-1 | 4.2 | None | — | None | — | 75 |
| Comparative Example 5-2 | | (1-1) | 1 | None | — | 70 |
| Comparative Example 5-3 | | (1-2) | 1 | None | — | 73 |
| Comparative Example 5-4 | | (1-3) | 1 | None | — | 73 |
| Comparative Example 5-5 | | (1-4) | 1 | None | — | 72 |
| Comparative Example 5-6 | | None | — | (2-1) | 3 | 68 |
| Comparative Example 5-7 | | None | — | (2-2) | 3 | 70 |
| Comparative Example 5-8 | | None | — | (2-3) | 3 | 71 |
| Comparative Example 5-9 | | None | — | (2-4) | 3 | 71 |
| Comparative Example 5-10 | | None | — | (2-5) | 3 | 69 |
| Comparative Example 5-11 | | None | — | (2-6) | 3 | 70 |
| Comparative Example 5-12 | | None | — | (2-7) | 3 | 65 |

From the above-mentioned evaluation, the following results are demonstrated.

When the electrolytic solution contains the first compound and the second compound, the cycle properties can be improved (Examples 1-1 to 1-172 and Comparative Examples 1-1 to 1-12).

In a battery in which either one of graphite and silicon is used as the negative electrode active material, when the electrolytic solution contains the first compound and the second compound, the cycle properties can be improved (Examples 1-1 to 1-172, 2-1 to 2-172 and Comparative Examples 1-1 to 1-12, 2-1 to 2-12).

In a battery in which either one of a separator having a resin layer attached thereto and a separator having a heat-resistant insulating layer attached thereto is used as the separator, when the electrolytic solution contains the first compound and the second compound, the cycle properties can be improved (Examples 1-1 to 1-172, 3-1 to 3-172 and Comparative Examples 1-1 to 1-12, 3-1 to 3-12).

In a battery in which either one of an electrolytic solution and a gel-like electrolyte is used as the electrolyte, when the electrolyte contains the first compound and the second compound, the cycle properties can be improved (Examples 1-1 to 1-172, 4-1 to 4-25 and Comparative Examples 1-1 to 1-12, 4-1 to 4-12).

In a battery in which either one of LCO and NCA is used as the positive electrode active material, when the electrolytic solution contains the first compound and the second compound, the cycle properties can be improved (Examples 1-1 to 1-172, 5-1 to 5-25 and Comparative Examples 1-1 to 1-12, 5-1 to 5-12).

Consequently, when the electrolytic solution contains the first compound and the second compound, the cycle properties can be improved regardless of the types of the positive electrode active material, the negative electrode active material, the electrolyte and the separator.

The content of the first compound is preferably 0.01 to 5% by mass inclusive, more preferably 0.1 to 3% by mass inclusive, from the viewpoint of the improvement in cycle properties.

The content of the second compound is preferably 0.1 to 10% by mass inclusive, more preferably 0.1 to 5% by mass inclusive, from the viewpoint of the improvement in cycle properties.

In the batteries in each of which a compound (1-1) wherein a moiety between both ends X and Y is composed of only $CF_2$ chains is used (Examples 1-1 to 1-43), the cycle properties can be improved compared with the batteries in each of which a compound (1-2) wherein a moiety between both ends X and Y is composed of a $CF_2$ chain and a $CH_2$ chain is used (Examples 1-44 to 1-86).

In the batteries in each of which a compound (1-3) wherein each of both ends X and Y is a vinyl group is used (Examples 1-87 to 1-129), the cycle properties can be improved compared with the batteries in each of which a compound (1-1) or (1-2) wherein one terminal X is a fluorine group and the other end Y is a vinyl group is used (Examples 1-1 to 1-86) and the batteries in each of which a compound (1-4) wherein each of the ends X and Y is an ethynyl group is used (Examples 1-130 to 1-172).

In the batteries in each of which a compound (1-4) wherein each of ends X and Y is an ethynyl group is used (Examples 1-130 to 1-172), the cycle properties can be improved compared with the batteries in each of which one end X is a fluorine group and the other end Y is a vinyl group (Examples 1-1 to 1-86).

In the batteries in each of which a compound (2-1), (2-2) or (2-3) wherein the number of carbon atoms between nitrile groups located at both ends is 2 to 8 is used (Examples 1-1 to 1-31), the cycle properties can be improved with the increase in the number of the carbon atoms.

In the batteries in each of which a compound (2-3) containing no oxygen atom is used (Examples 1-29 to 1-31, and so on), the cycle properties can be improved compared with the batteries in each of which a compound (2-4) containing an oxygen atom is used (Examples 1-32 to 1-34, and so on).

In the batteries in each of which any one of compounds (2-1) to (2-6) each containing no alkenylene group (a group containing an unsaturated bond) is used (Examples 1-1 to 1-40, and so on), the cycle properties can be improved compared with the batteries in each of which a compound (2-7) containing an alkenylene (a group having an unsaturated bond) is used (Examples 1-41 to 1-43, and so on).

As stated above, the embodiments and examples of the present technology are described specifically. However, the present technology is not limited to the above-mentioned embodiments and examples, and various modifications are possible based on the technical ideas of the present technology.

For example, the configurations, methods, steps, shapes, materials, numerical values and the like in the above-mentioned embodiments and examples are only illustrative, and other configurations, methods, steps, shapes, materials, numerical values and the like may be employed.

In addition, the configurations, methods, steps, shapes, materials, numerical values and the like in the above-mentioned embodiments and examples may be combined with each other without departing from the spirit of the present technology.

In the above-mentioned embodiments and examples, examples in which the present technology is applied to a cylindrical or laminate-film-type secondary battery are described. However, the shape of the battery is not particularly limited. For example, the present technology can be applied to a square or coin-shaped secondary battery, or the present technology can also be applied to a flexible battery to be mounted in a wearable terminal such as a smart watch, a head mounted display, and iGlass (registered tradename).

Furthermore, in the above-mentioned embodiments and examples, examples in which the present technology is applied to a wound or stacked secondary battery are described. However, the structure of the battery is not limited thereto, and the present technology can be applied to, for example, a secondary battery having such a structure that a positive electrode and a negative electrode are folded and the like.

Furthermore, in the above-mentioned embodiments and examples, examples each having such a configuration that an electrode is provide with a current collector and an active material layer are described. However, the configuration of the electrode is not limited thereto. For example, the electrode may have a configuration composed only of active material layers.

The present technology is described below in a further detail according to an embodiment.

(1)

A battery provided with a positive electrode, a negative electrode and an electrolyte, wherein a first compound represented by formula (1) and a second compound represented by formula (2) are contained in the battery:

[formula 1]

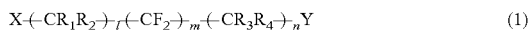

(wherein X represents a hydrogen group, a fluorine group, a vinyl group or an ethynyl group; Y represents a vinyl group or an ethynyl group; $R_1$, $R_2$, $R_3$ and $R_4$ independently represent a hydrogen group, an alkyl group having 1 to 4 carbon atoms, an alkenyl group having 1 to 4 carbon atoms or an alkynyl group having 1 to 4 carbon atoms, wherein each of the alkyl group, the alkenyl group and the alkynyl group may have a substituent; l represents an integer of 0 to 16; m represents an integer of 1 to 18; and n represents an integer of 0 to 16);

[formula 2]

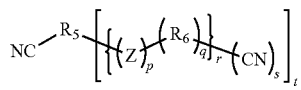

(wherein $R_5$ an $R_6$ independently represent an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms or an alkynylene group having 2 to 18 carbon atoms, wherein each of the alkyl group, the alkenyl group, the alkynyl group, the alkylene group, the alkenylene group and the alkynylene group may have a substituent, or may have a cyclic structure, or may have a branched structure, or may have a substituent and a cyclic structure, or may have a substituent and a branched structure; Z represents a linking group selected from oxygen (O), sulfur (S), nitrogen (N), phosphorus (P) and $SO_2$; p represents an integer of 0 to 2; q represents a numerical value obtained by subtracting 1 from the numerical value of the valency of Z; r represents an integer of 0 or more; s represents a numerical value obtained by subtracting 1 from the numerical value of the valency of $R_6$; and t represents a numerical value obtained by subtracting 1 from the numerical value of the valency of $R_5$).

(2)
  The battery according to (1), wherein the electrolyte contains an electrolytic solution, and the content of the first compound in the electrolytic solution is 0.01 to 5% by mass inclusive.

(3)
  The battery according to (1) or (2), wherein the electrolyte contains an electrolytic solution and the content of the second compound in the electrolytic solution is 0.1 to 10% by mass inclusive.

(4)
  The battery according to any one of (1) to (3), wherein X represents a vinyl group or an ethynyl group.

(5)
  The battery according to any one of (1) to (3), wherein each of X and Y represents a vinyl group.

(6)
  The battery according to any one of (1) to (5), wherein $R_5$ and $R_6$ independently represent an alkyl group or an alkylene group.

(7)
  The battery according to claim 1,
  wherein, in formula (2),
  each of the alkyl group, the alkenyl group, the alkynyl group, the alkylene group, the alkenylene group and the alkynylene group which correspond to $R_5$ has a substituent, and the substituent may have a cyano group, an alkyl group having a cyano group, a substituent represented by formula (3) or the like, and
  each of the alkyl group, the alkenyl group, the alkynyl group, the alkylene group, the alkenylene group and the alkynylene group which correspond to $R_6$ has a substituent, and the substituent may have a cyano group, an alkyl group having a cyano group or the like:

[formula 3]

(wherein $R_7$ represents an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms or an alkynylene group having 2 to 18 carbon atoms, wherein each of the alkyl group, the alkenyl group, the alkynyl group, the alkylene group, the alkenylene group and the alkynylene group may have a substituent, or may have a cyclic structure, or may have a branched structure, or may have a substituent and a cyclic structure, or may have a substituent and a branched structure; Y represents a linking group selected from oxygen (O), sulfur (S), nitrogen (N), phosphorus (P) and $SO_2$; u represents an integer of 0 to 2; v represents a numerical value obtained by subtracting 1 from the numerical value of the valency of Y; w represents an integer of 0 or more; and x represents a numerical value obtained by subtracting 1 from the valency of $R_7$).

(8)
  The battery according to any one of (1) to (7), wherein the negative electrode contains a metal element or a metalloid element as a negative electrode active material.

(9)
  The battery according to (8), wherein the metal element or the metalloid element contains at least one of silicon and tin.

(10)
  The battery according to any one of (1) to (9), wherein the battery is further provided with a separator that has a substrate and a surface layer arranged on at least one surface of the substrate and containing inorganic particles.

(11)
  The battery according to any one of (1) to (10), wherein the electrolyte contains an electrolytic solution and a polymeric compound retaining the electrolytic solution.

(12)
  The battery according to any one of (1) to (11), wherein the open circuit voltage per a pair composed of the positive electrodes and the negative electrode in a completely charged state is 4.4 to 6.00 V inclusive.

(13)
  An electrolytic solution containing a first compound represented by formula (1) and a second compound represented by formula (2):

[formula 1]

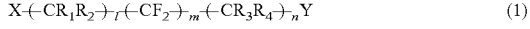

(wherein X represents a hydrogen group, a fluorine group, a vinyl group or an ethynyl group; Y represents a vinyl group or an ethynyl group; $R_1$, $R_2$, $R_3$ and $R_4$ independently represent a hydrogen group, an alkyl group having 1 to 4 carbon atoms, an alkenyl group having 1 to 4 carbon atoms or an alkynyl group having 1 to 4 carbon atoms, wherein each of the alkyl group, the alkenyl group and the alkynyl group may have a substituent; l represents an integer of 0 to 16; m represents an integer of 1 to 18; and n represents an integer of 0 to 16).

[formula 2]

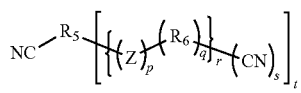
(2)

(wherein $R_5$ an $R_6$ independently represent an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms or an alkynylene group having 2 to 18 carbon atoms, wherein each of the alkyl group, the alkenyl group, the alkynyl group, the alkylene group, the alkenylene group and the alkynylene group may have a substituent, or may have a cyclic structure, or may have a branched structure, or may have a substituent and a cyclic structure, or may have a substituent and a branched structure; Z represents a linking group selected from oxygen (O), sulfur (S), nitrogen (N), phosphorus (P) and $SO_2$; p represents an integer of 0 to 2; q represents a numerical value obtained by subtracting 1 from the numerical value of the valency of Z; r represents an integer of 0 or more; s represents a numerical value obtained by subtracting 1 from the numerical value of the valency of $R_6$; and t represents a numerical value obtained by subtracting 1 from the numerical value of the valency of $R_5$).

(14)
A battery pack provided with:
a battery as recited in any one of (1) to (12); and
a control unit for controlling the battery.

(15)
An electronic device provided with a battery as recited in any one of (1) to (12), wherein the electronic device can receive an electric power supplied from the battery.

(16)
An electric vehicle provided with:
a battery as recited in any one of (1) to (12);
a conversion device that can receive an electric power supplied from the battery and can convert the electric power to a driving power for the vehicle; and
a control device that can execute information processing associated with the control of the vehicle on the basis of information about the battery.

(17)
An electrical storage device provided with a battery as recited in any one of (1) to (12), wherein the electrical storage device can supply an electric power to an electronic device connected to the battery.

(18)
The electrical storage device according to (17), wherein the electrical storage device is further provided with an electric power information control device that can receive/transmit a signal from/to another device through a network, and can also perform the control of the charging/discharging of the battery on the basis of information received by the electric power information control device.

(19)
An electric power system provided with a battery as recited in any one of (1) to (12), wherein the electric power system can receive an electric power supplied from the battery.

(20)
The electric power system according to (19), wherein an electric power is supplied to the battery from an electricity generating device or an electric power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A battery comprising:
a positive electrode, a negative electrode and an electrolyte,
wherein the electrolyte includes a first compound represented by formula (1) and a second compound represented by formula (2) being contained in the battery:

[formula 1]

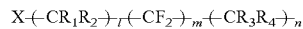
(1)

(wherein X represents a hydrogen group, a fluorine group, a vinyl group, an ethynyl group or combinations thereof; Y represents a vinyl group or an ethynyl group; $R_1$, $R_2$, $R_3$ and $R_4$ independently represent a hydrogen group, an alkyl group having 1 to 4 carbon atoms, an alkenyl group having 1 to 4 carbon atoms, an alkynyl group having 1 to 4 carbon atoms or combinations thereof, and wherein each of the alkyl group, the alkenyl group and the alkynyl group includes a first substituent; and wherein l represents an integer of 0 to 16; m represents an integer of 1 to 18; and n represents an integer of 0 to 16);

[formula 2]

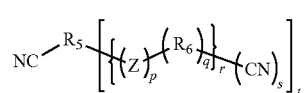
(2)

(wherein $R_5$ an $R_6$ independently represent an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms, an alkynylene group having 2 to 18 carbon atoms or combinations thereof, wherein each of the alkyl group, the alkenyl group, the alkynyl group, the alkylene group, the alkenylene group and the alkynylene group includes a second substituent, a cyclic structure, a branched structure, or combinations thereof; and wherein Z represents a linking group selected from oxygen (O), sulfur (S), nitrogen (N), phosphorus (P), $SO_2$, and combinations thereof; p represents an integer of 0 to 2; q represents a numerical value obtained by subtracting 1 from a numerical value of a valency of Z; r represents an integer of 0 or more; s represents a numerical value obtained by subtracting 1 from a numerical value of a valency of $R_6$; and t represents a numerical value obtained by subtracting 1 from a numerical value of a valency of $R_5$).

2. The battery according to claim 1, wherein the electrolyte includes an electrolytic solution, and a content of the first compound in the electrolytic solution is from 0.01% to 5% by mass.

3. The battery according to claim 1, wherein the electrolyte includes an electrolytic solution and a content of the second compound in the electrolytic solution is from 0.1% to 10% by mass.

4. The battery according to claim 1, wherein X represents a vinyl group or an ethynyl group.

5. The battery according to claim 1, wherein each of X and Y represents a vinyl group.

6. The battery according to claim 1, wherein $R_5$ represents an alkyl group or an alkylene group, and wherein $R_6$ represents an alkyl group or an alkylene group.

7. The battery according to claim 1,
wherein, in formula (2),
each of the alkyl group, the alkenyl group, the alkynyl group, the alkylene group, the alkenylene group and the alkynylene group which correspond to $R_5$ has a third substituent, and the third substituent includes a cyano group or an alkyl group having a cyano group,
wherein the third substituent represented by formula (3), and
wherein each of the alkyl group, the alkenyl group, the alkynyl group, the alkylene group, the alkenylene group and the alkynylene group which correspond to $R_6$ includes the third substituent:

[formula 3]

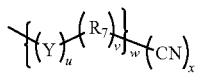

(wherein $R_7$ represents an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms, an alkynylene group having 2 to 18 carbon atoms or combinations thereof, wherein each of the alkyl group, the alkenyl group, the alkynyl group, the alkylene group, the alkenylene group and the alkynylene group includes a fourth substituent, a cyclic structure, a branched structure, or combinations thereof; Y represents a linking group selected from oxygen (O), sulfur (S), nitrogen (N), phosphorus (P), $SO_2$, and combinations thereof; u represents an integer of 0 to 2; v represents a numerical value obtained by subtracting 1 from a numerical value of a valency of Y; w represents an integer of 0 or more; and x represents a numerical value obtained by subtracting 1 from a valency of $R_7$).

8. The battery according to claim 1, wherein the negative electrode includes one or both of a metal element and a metalloid element.

9. The battery according to claim 8, wherein the metal element or the metalloid element includes at least one of silicon and tin.

10. The battery according to claim 8, wherein the battery further comprises a separator, wherein the separator includes a substrate and a surface layer arranged on at least one surface of the substrate, and the separator includes inorganic particles.

11. The battery according to claim 1, wherein the electrolyte includes an electrolytic solution and a polymeric compound retaining the electrolytic solution.

12. The battery according to claim 1, wherein an open circuit voltage of the battery in a completely charged state is from 4.4 to 6.00 V.

13. An electrolytic solution including a first compound represented by formula (1) and a second compound represented by formula (2):

[formula 1]

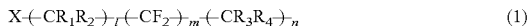

(wherein X represents a hydrogen group, a fluorine group, a vinyl group or an ethynyl group; Y represents a vinyl group, an ethynyl group or combinations thereof; $R_1$, $R_2$, $R_3$ and $R_4$ independently represent a hydrogen group, an alkyl group having 1 to 4 carbon atoms, an alkenyl group having 1 to 4 carbon atoms, an alkynyl group having 1 to 4 carbon atoms, or combinations thereof, wherein each of the alkyl group, the alkenyl group and the alkynyl group includes a first substituent; and wherein 1 represents an integer of 0 to 16; m represents an integer of 1 to 18; and n represents an integer of 0 to 16),

[formula 2]

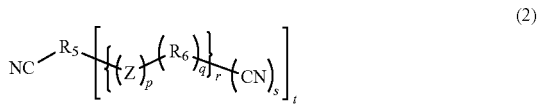

(wherein $R_5$ an $R_6$ independently represent an alkyl group having 1 to 18 carbon atoms, an alkenyl group having 1 to 18 carbon atoms, an alkynyl group having 1 to 18 carbon atoms, an alkylene group having 2 to 18 carbon atoms, an alkenylene group having 2 to 18 carbon atoms, an alkynylene group having 2 to 18 carbon atoms, or combinations thereof, wherein each of the alkyl group, the alkenyl group, the alkynyl group, the alkylene group, the alkenylene group and the alkynylene group includes a second substituent, a cyclic structure, a branched structure, or combinations thereof; and wherein Z represents a linking group selected from oxygen (O), sulfur (S), nitrogen (N), phosphorus (P), $SO_2$, and combinations thereof; p represents an integer of 0 to 2; q represents a numerical value obtained by subtracting 1 from a numerical value of a valency of Z; r represents an integer of 0 or more; s represents a numerical value obtained by subtracting 1 from a numerical value of a valency of $R_6$; and t represents a numerical value obtained by subtracting 1 from a numerical value of a valency of $R_5$).

14. A battery pack comprising
the battery according to claim 1; and
a controller configured to control the battery.

15. An electronic device comprising the battery according to claim 1, wherein the electronic device is configured to receive an electric power supplied from the battery.

16. An electric vehicle comprising
the battery according to claim 1;
a conversion device configured to receive an electric power supplied from the battery and convert the electric power to a driving power for the electric vehicle; and
a controller configured to execute information processing associated with control of the electric vehicle on the basis of information about the battery.

17. An electrical storage device comprising the battery according to claim 1, wherein the electrical storage device is configured to supply an electric power to an electronic device connected to the battery.

18. The electrical storage device according to claim 17, wherein the electrical storage device further includes an electric power information control device configured to receive/transmit a signal from/to a device through a network, and perform control of charging/discharging of the battery on the basis of information received by the electric power information control device.

19. An electric power system comprising a battery according to claim 1, the electric power system is configured to receive an electric power supplied from the battery.

20. The electric power system according to claim 19, wherein an electric power is supplied to the battery from an electricity generating device or an electric power network.

21. The battery according to claim 10, wherein the inorganic particles are supported on a resin material having a three-dimensional network structure to keep a dispersed state while avoiding mutual connection.

22. The battery according to claim 10, wherein the surface layer includes a resin material binding the inorganic particles to the surface or the inorganic particles to each other without being fibrillated.

23. The battery according to claim 10, wherein the inorganic particles contain at least one component selected from a metal oxide, a metal nitride, a metal carbide, a metal sulfide, and mixtures thereof.

24. The battery according to claim 23, wherein the metal oxide is selected from the group consisting of aluminum oxide (alumina, Al2O3), boehmite (hydrated aluminum oxide), magnesium oxide (magnesia, MgO), titanium oxide (titania, TiO2), zirconium oxide (zirconia, ZrO2), silicon oxide (silica, SiO2), yttrium oxide (yttria, Y2O3), and mixtures thereof.

25. The battery according to claim 23, wherein the metal nitride is selected from the group consisting of silicon nitride (Si3N4), aluminum nitride (AlN), boron nitride (BN), titanium nitride (TiN), and mixtures thereof.

26. The battery according to claim 23, wherein the metal carbide is selected from the group consisting of silicon carbide (SiC), boron carbide (B4C) or the like can be used preferably.

27. The battery according to claim 10, wherein the inorganic particles comprise at least one of barium sulfate (BaSO4), a porous aluminosilicate salt, a layered silicate salt, and barium titanate (BaTiO3), strontium titanate (SrTiO3).

* * * * *